(12) United States Patent
Wells

(10) Patent No.: US 9,310,027 B2
(45) Date of Patent: *Apr. 12, 2016

(54) LIGHTING SYSTEM FOR GROWING PLANTS

(71) Applicant: Kevin T. Wells, San Rafael, CA (US)

(72) Inventor: Kevin T. Wells, San Rafael, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/662,465

(22) Filed: Oct. 27, 2012

(65) Prior Publication Data
US 2013/0293156 A1 Nov. 7, 2013

Related U.S. Application Data

(63) Continuation-in-part of application No. 12/509,380, filed on Jul. 24, 2009, now Pat. No. 8,297,782.

(60) Provisional application No. 61/083,499, filed on Jul. 24, 2008.

(51) Int. Cl.
| | |
|---|---|
| *F21V 9/00* | (2006.01) |
| *F21K 99/00* | (2010.01) |
| *A01G 7/04* | (2006.01) |
| *A01G 9/26* | (2006.01) |
| *F21V 29/02* | (2006.01) |
| *F21V 23/04* | (2006.01) |
| *H05B 33/08* | (2006.01) |
| *H05B 37/02* | (2006.01) |
| *F21V 29/00* | (2015.01) |
| *F21S 2/00* | (2006.01) |
| *F21W 131/40* | (2006.01) |
| *F21Y 101/02* | (2006.01) |

(Continued)

(52) U.S. Cl.
CPC . *F21K 9/00* (2013.01); *A01G 7/045* (2013.01); *A01G 9/26* (2013.01); *F21V 23/0435* (2013.01); *F21V 23/0457* (2013.01); *F21V 29/02* (2013.01); *H05B 33/0803* (2013.01); *H05B 33/086* (2013.01); *H05B 37/0272* (2013.01); *F21S 2/00* (2013.01); *F21V 29/20* (2013.01); *F21W 2131/40* (2013.01); *F21Y 2101/02* (2013.01); *F21Y 2105/003* (2013.01); *F21Y 2113/005* (2013.01)

(58) Field of Classification Search
USPC .......................... 362/231, 249.02, 253, 234, 1
See application file for complete search history.

(56) References Cited

U.S. PATENT DOCUMENTS

| | | |
|---|---|---|
| 5,012,609 A | 5/1991 | Ignatius et al. |
| 5,278,432 A | 1/1994 | Ignatius et al. |

(Continued)

FOREIGN PATENT DOCUMENTS

WO 2007147242 A1 12/2007

OTHER PUBLICATIONS

Linear Technology, "3A, DC/DC Converter with Dual Rail-to-Rail Current Sense", Data Sheet, pp. 1-16, LT3477, Linear Technology, Milpitas, California.

*Primary Examiner* — Laura Tso
(74) *Attorney, Agent, or Firm* — Greg L. Martinez

(57) ABSTRACT

A lighting system network includes first and second lighting systems in communication with each other. The first lighting system includes an LED controller, and an LED array which includes first and second LED sub-arrays, wherein the LED array is operatively coupled to the LED controller. The first and second wavelength spectrums provided by the first and second LED sub-arrays, respectively, are adjustable in response to adjusting an input signal provided to the antenna.

19 Claims, 56 Drawing Sheets

(51) Int. Cl.
*F21Y 105/00* (2006.01)
*F21Y 113/00* (2006.01)

(56) References Cited

U.S. PATENT DOCUMENTS

| | | | |
|---|---|---|---|
| 6,474,838 | B2 | 11/2002 | Fang et al. |
| 6,602,275 | B1 | 8/2003 | Sullivan |
| 6,688,759 | B1 | 2/2004 | Hadjimichael |
| 6,921,182 | B2 | 7/2005 | Anderson, Jr. et al. |
| 8,297,782 | B2 | 10/2012 | Bafetti et al. |
| 2004/0189555 | A1 | 9/2004 | Capen et al. |
| 2005/0030538 | A1 | 2/2005 | Jaffar et al. |
| 2007/0058368 | A1 | 3/2007 | Partee et al. |
| 2008/0068597 | A1 | 3/2008 | Liu et al. |
| 2008/0094857 | A1* | 4/2008 | Smith et al. ............ 362/649 |
| 2008/0170387 | A1 | 7/2008 | Fluss et al. |
| 2009/0174331 | A1 | 7/2009 | Tanaka |
| 2010/0020536 | A1 | 1/2010 | Bafetti et al. |
| 2011/0121734 | A1* | 5/2011 | Pape ........................ 315/86 |
| 2011/0204819 | A1* | 8/2011 | Isely ....................... 315/294 |
| 2012/0147604 | A1* | 6/2012 | Farmer ................ 362/249.03 |

\* cited by examiner

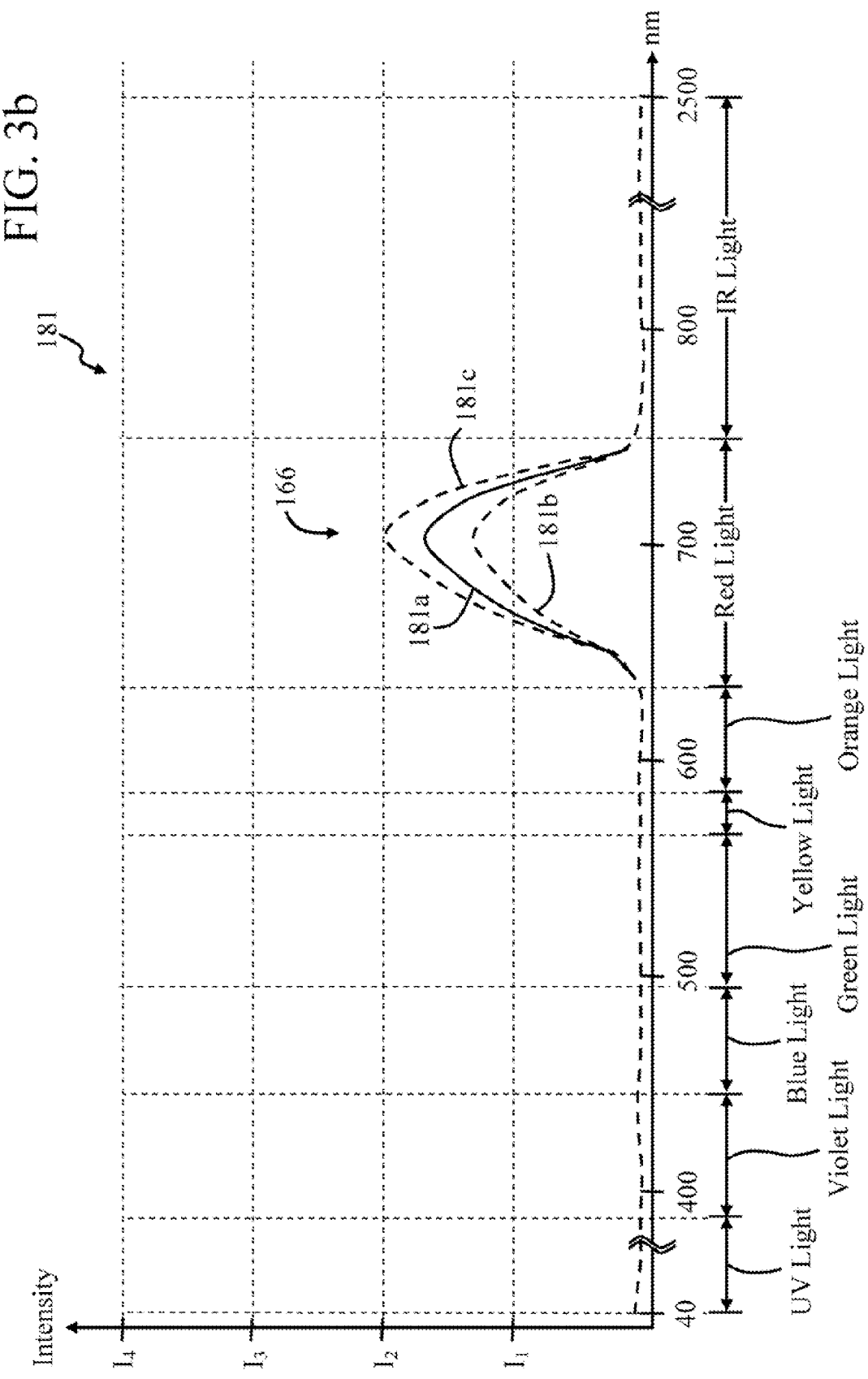

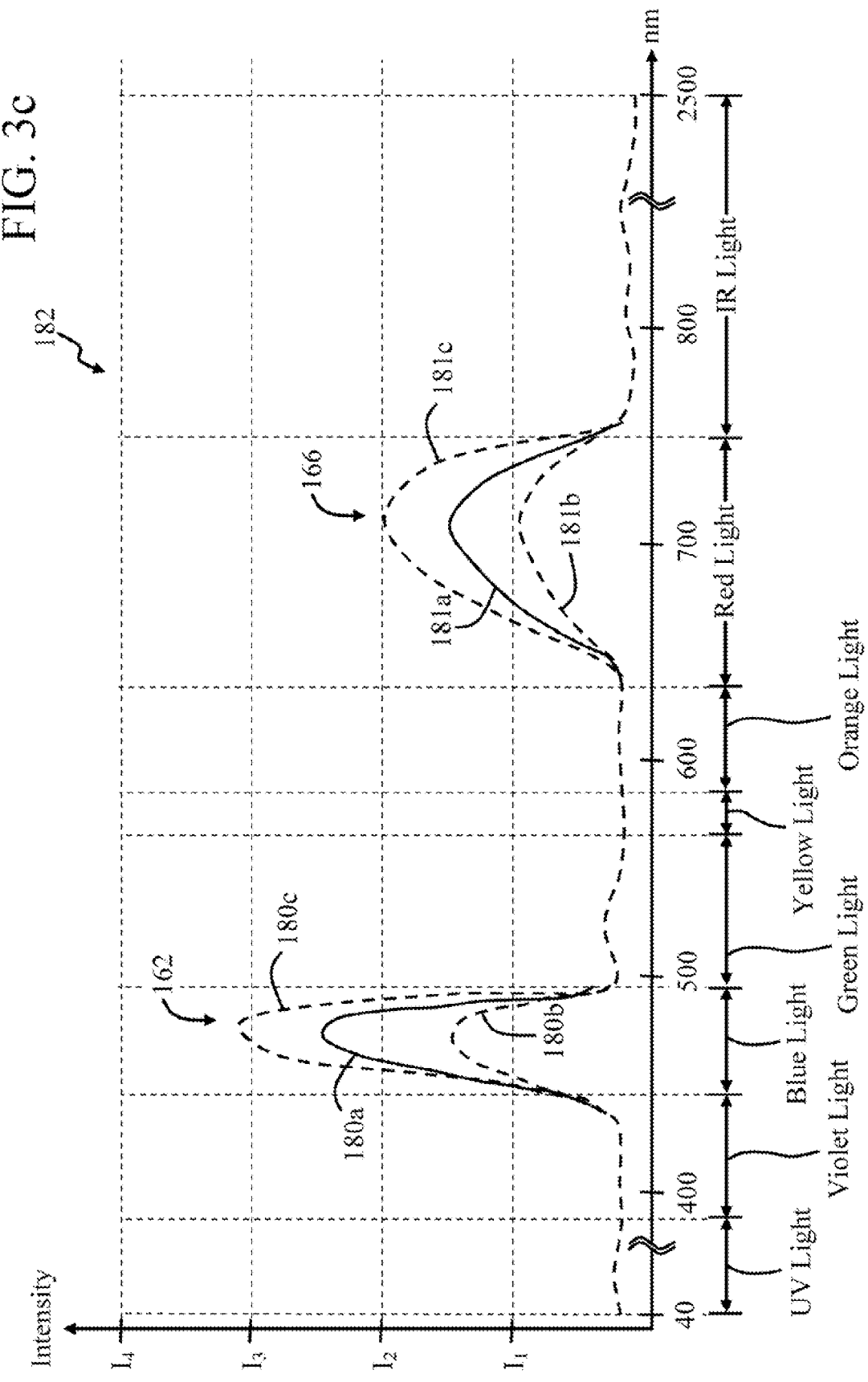

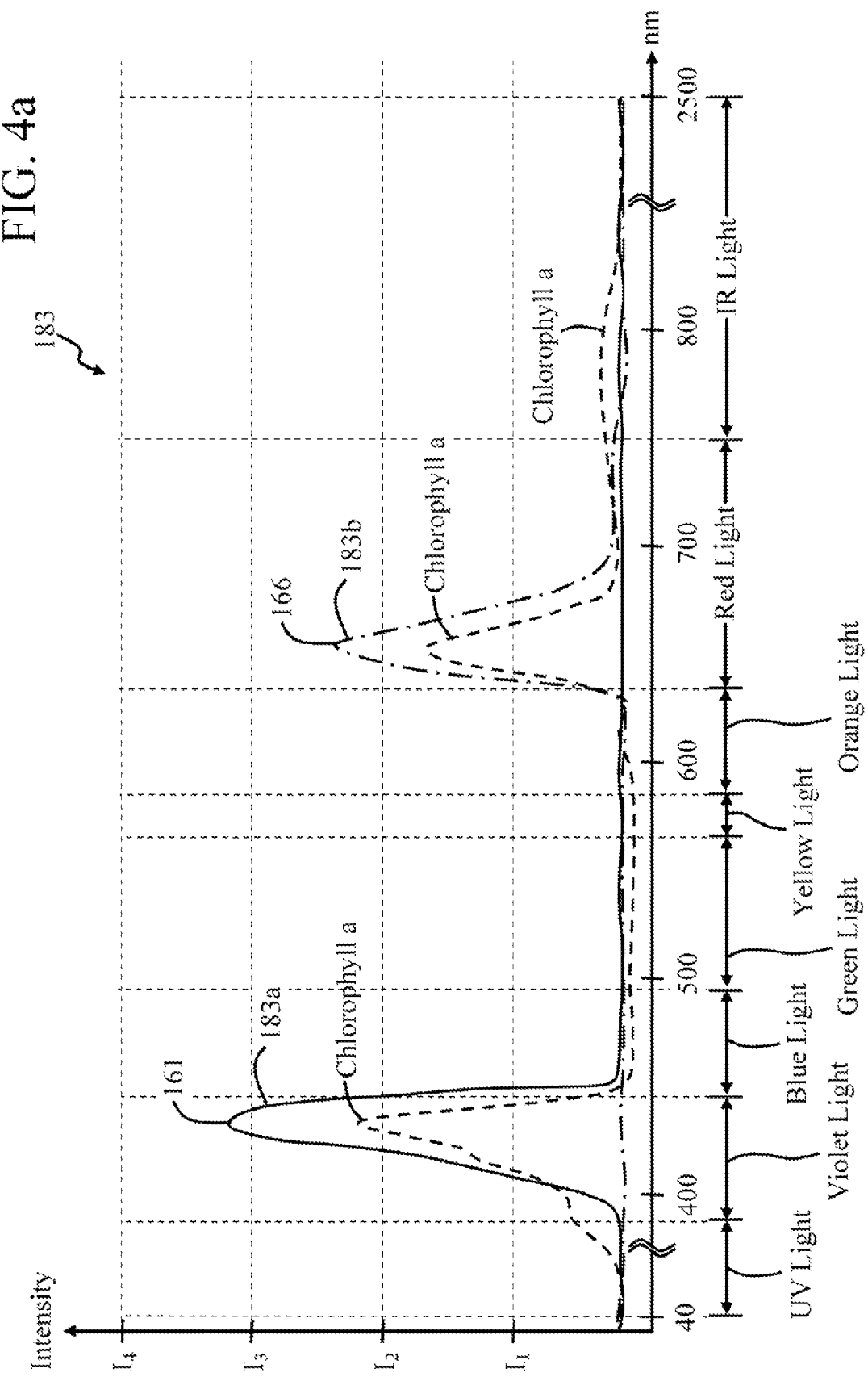

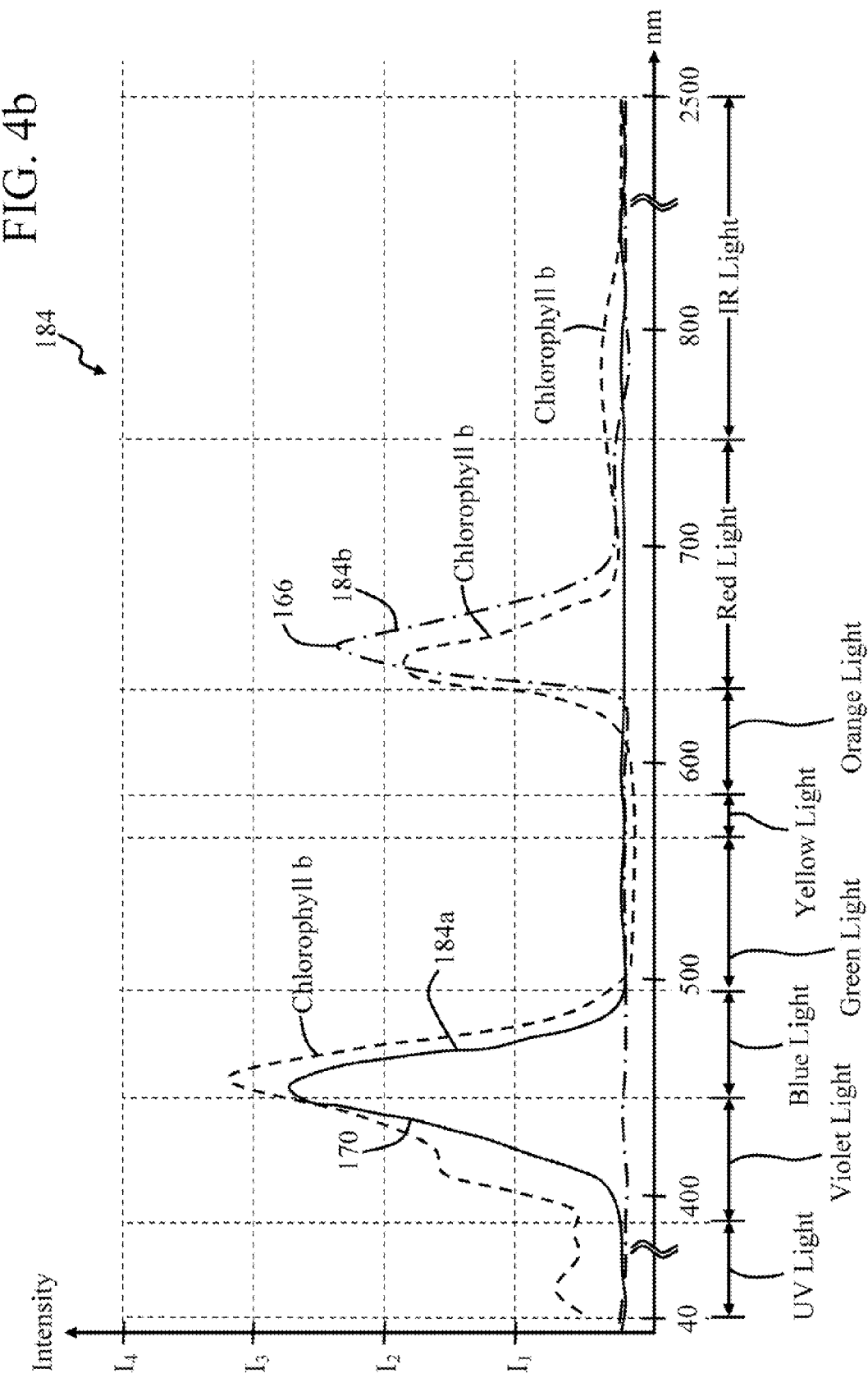

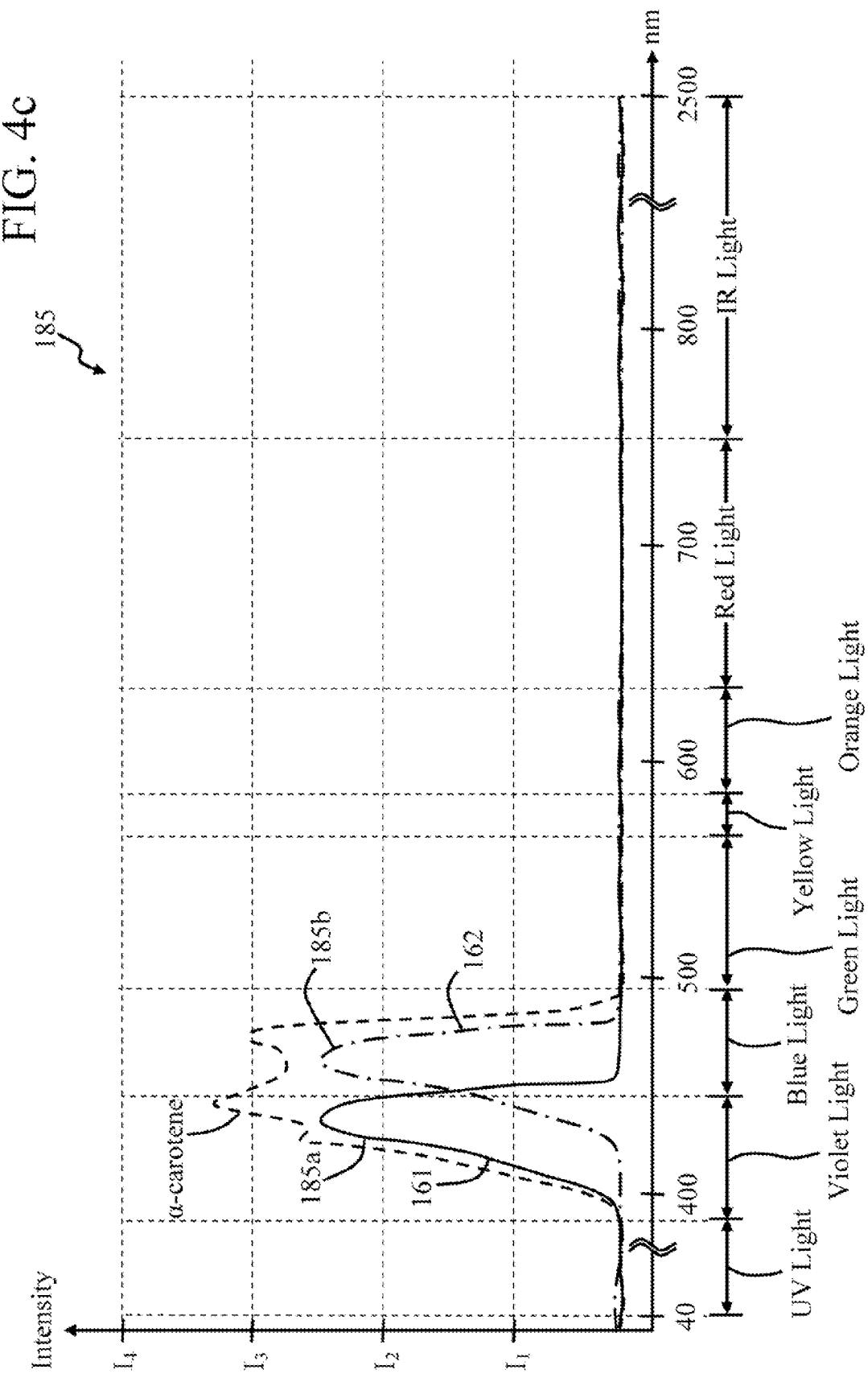

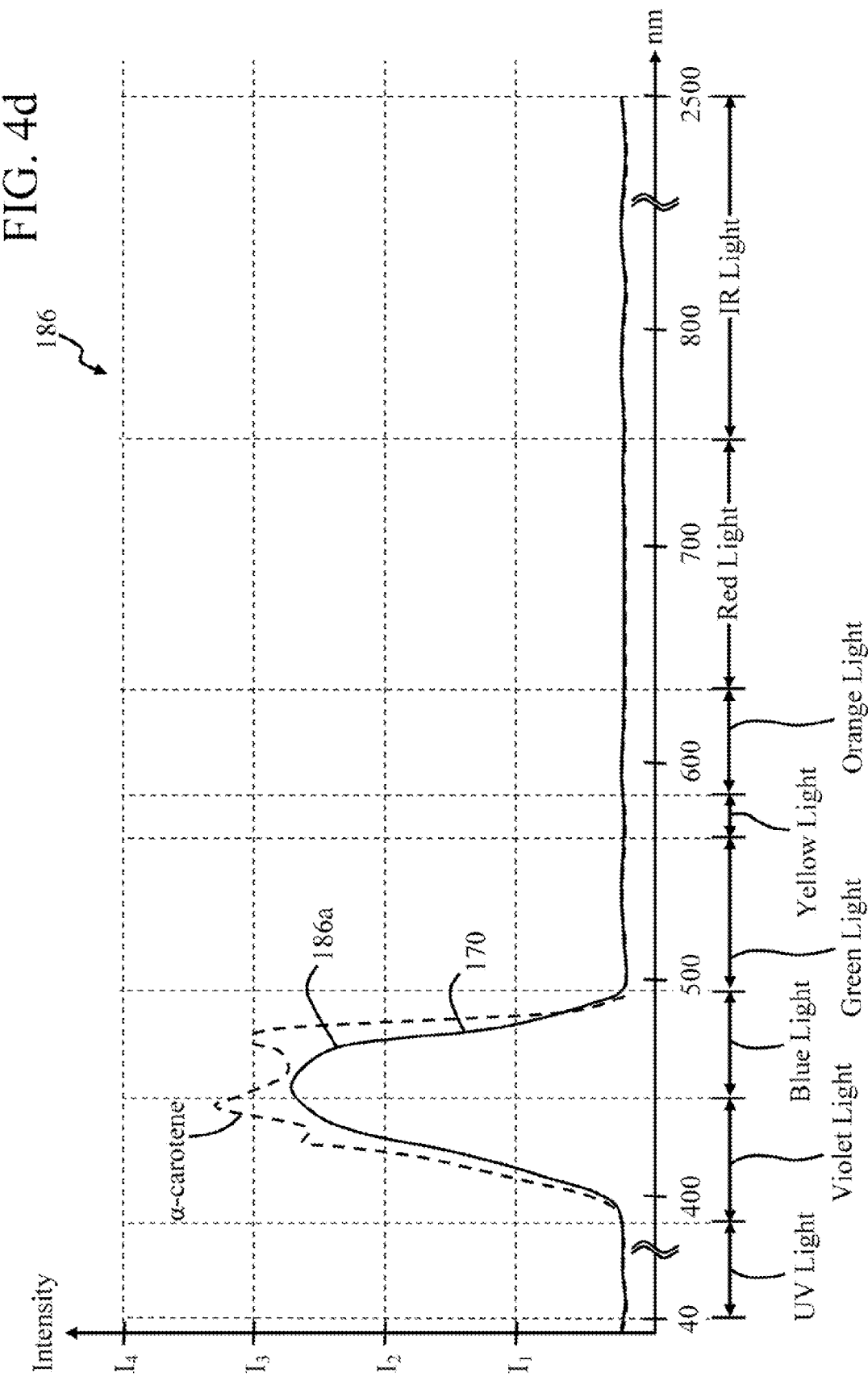

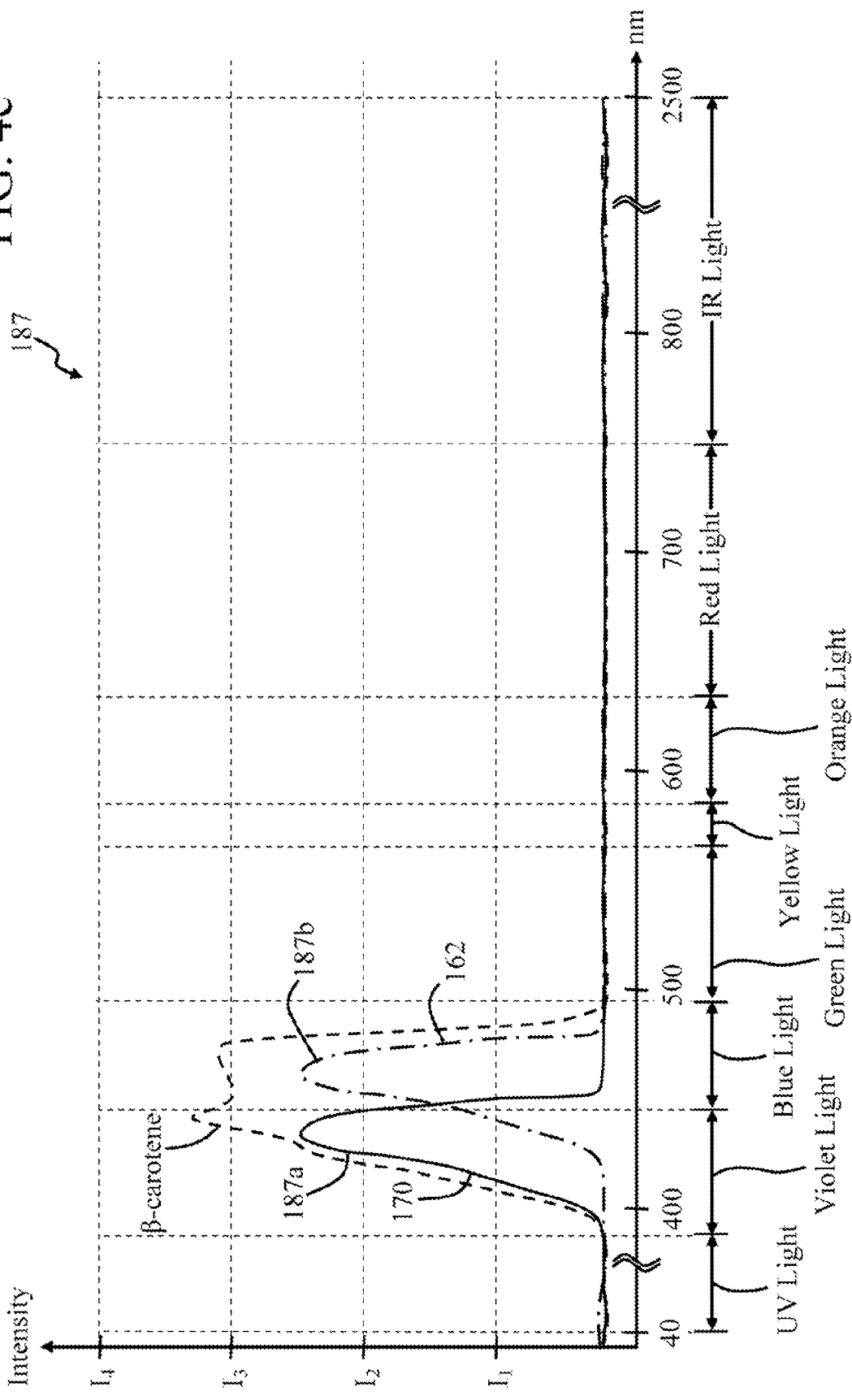

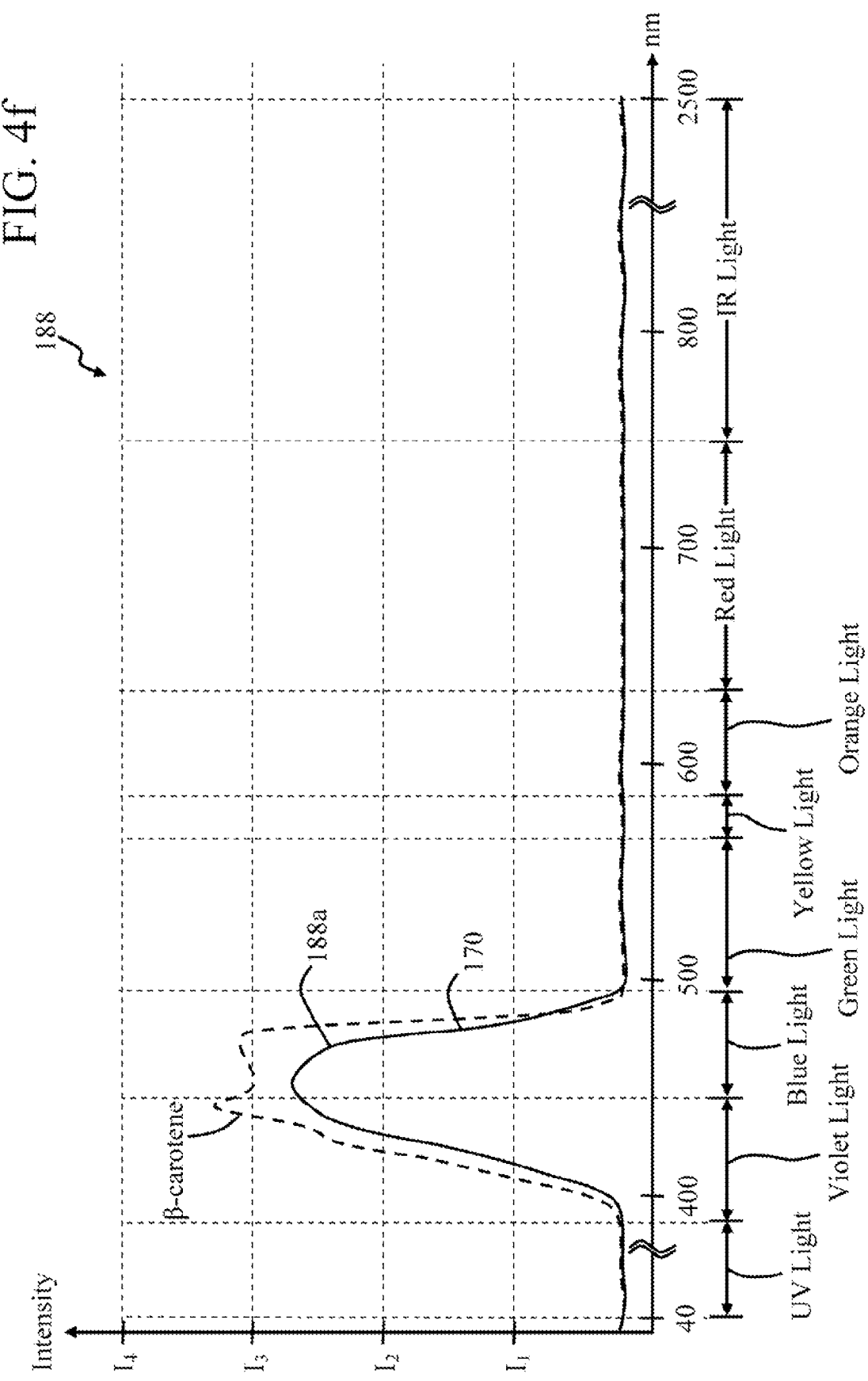

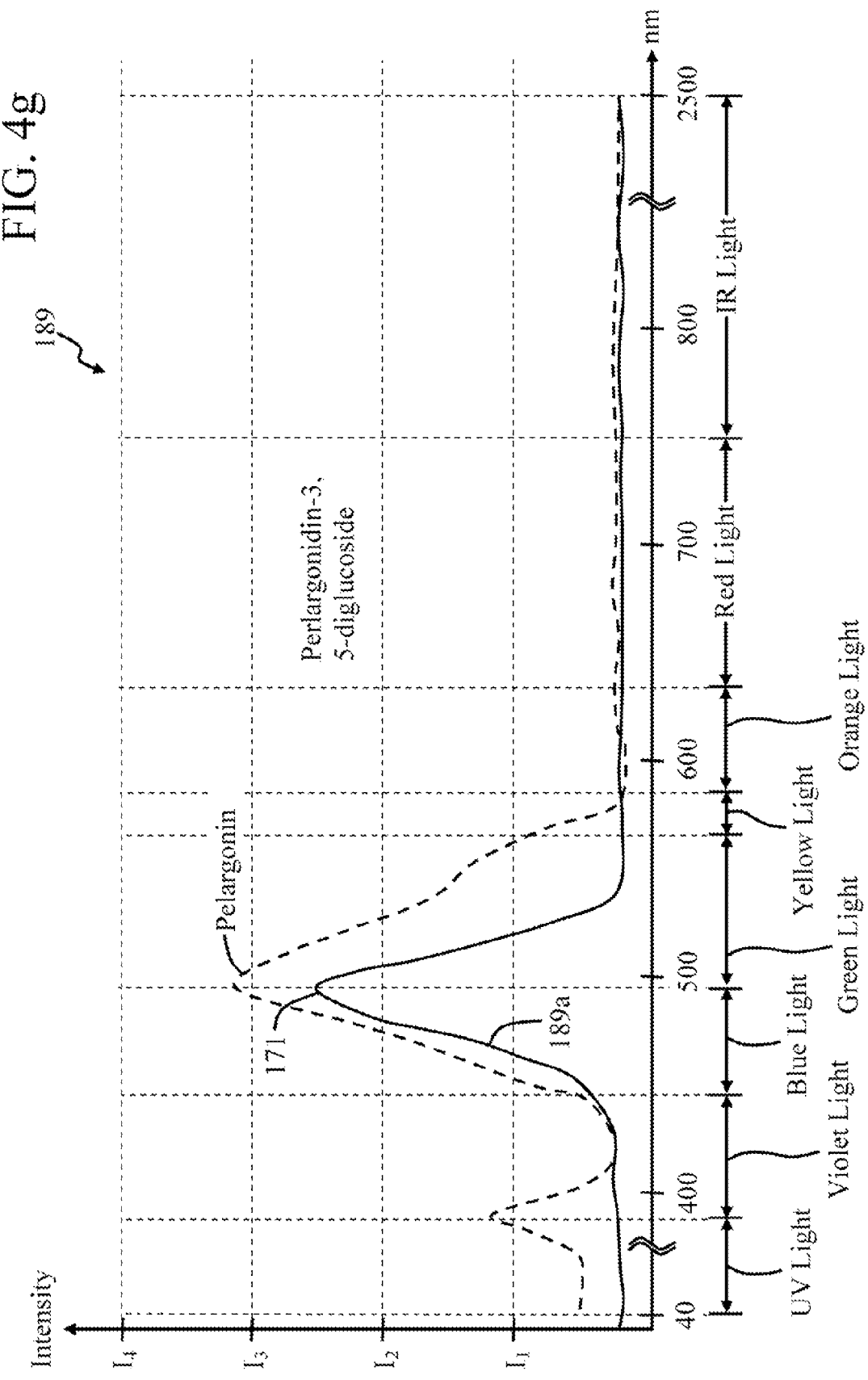

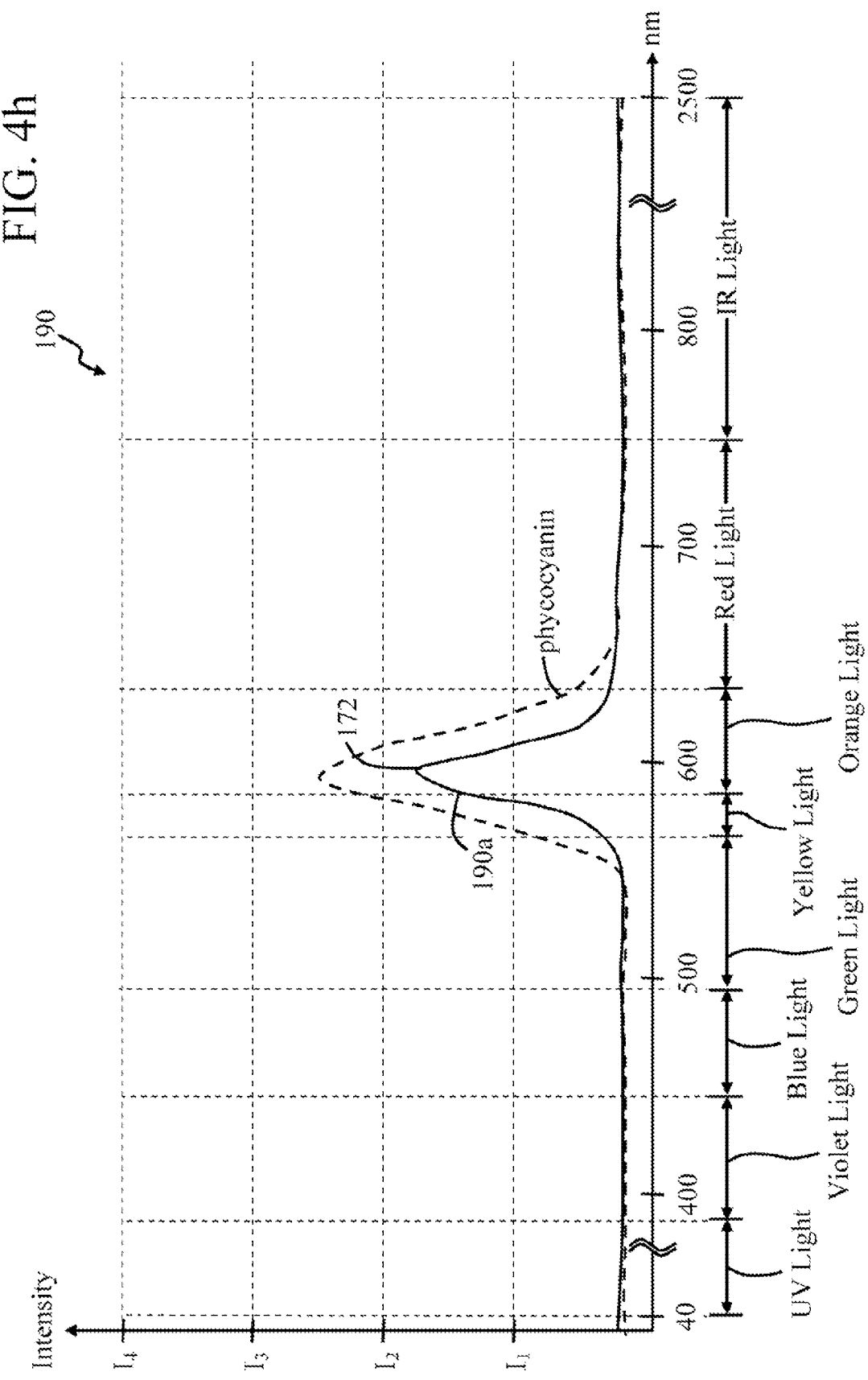

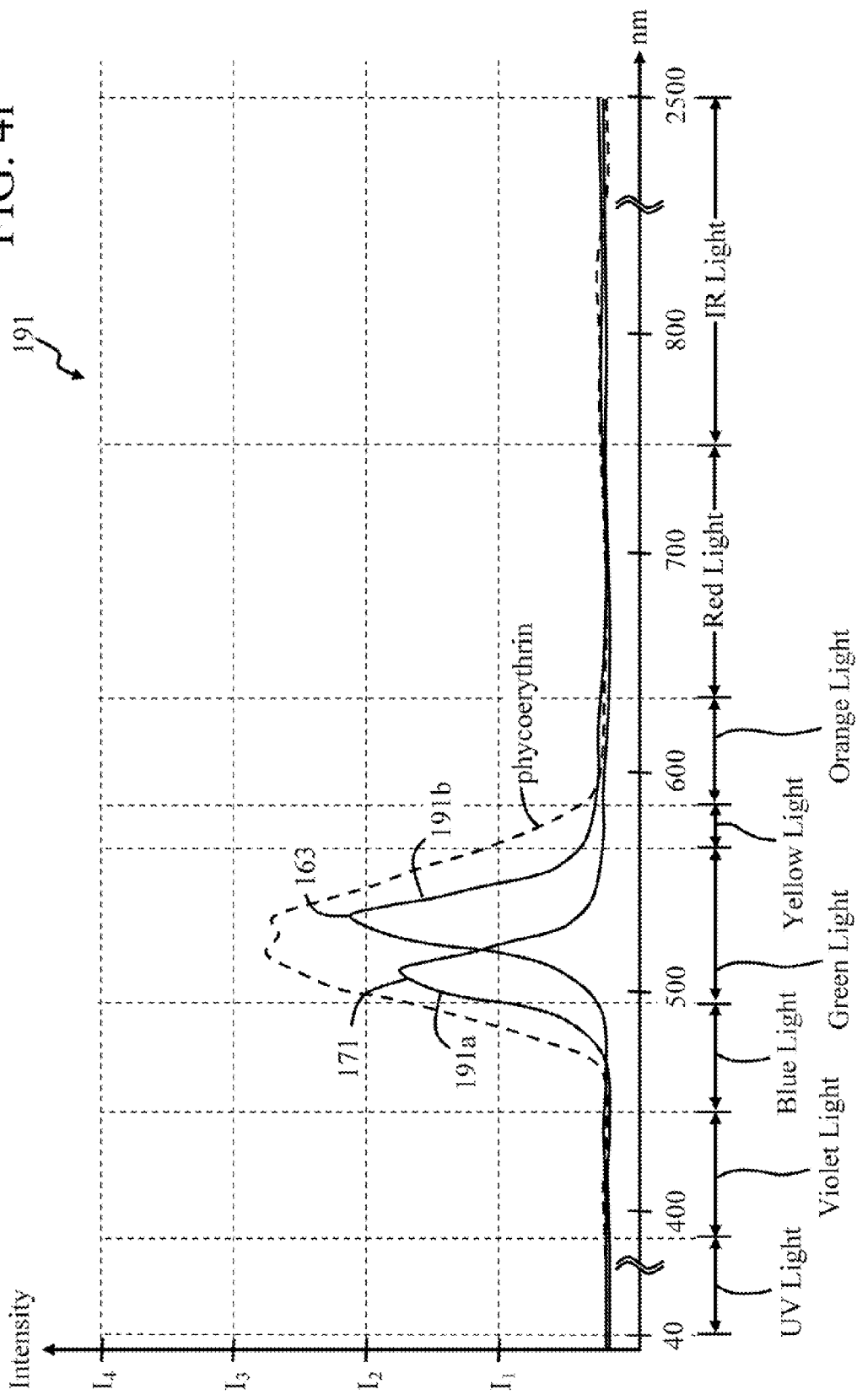

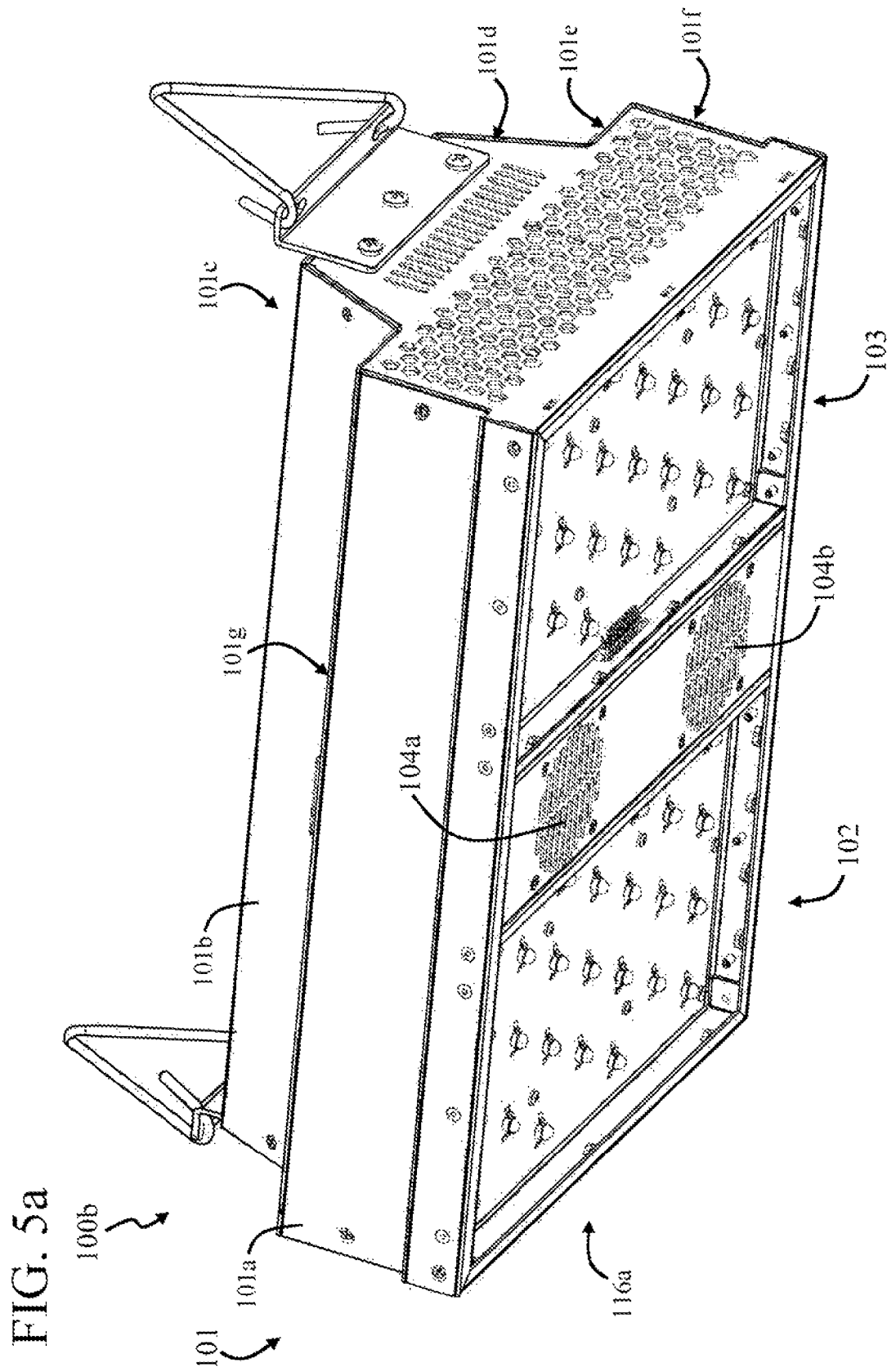

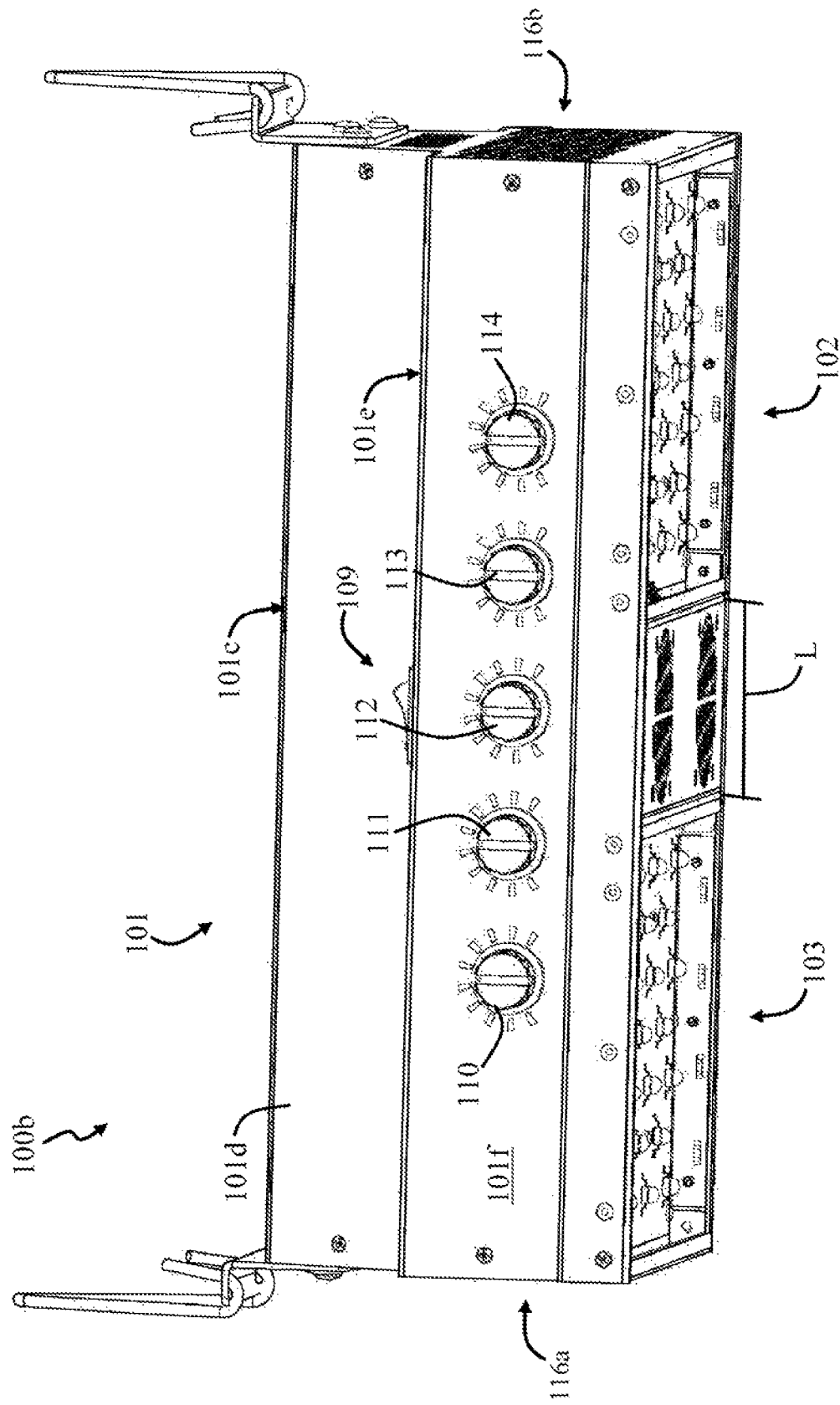

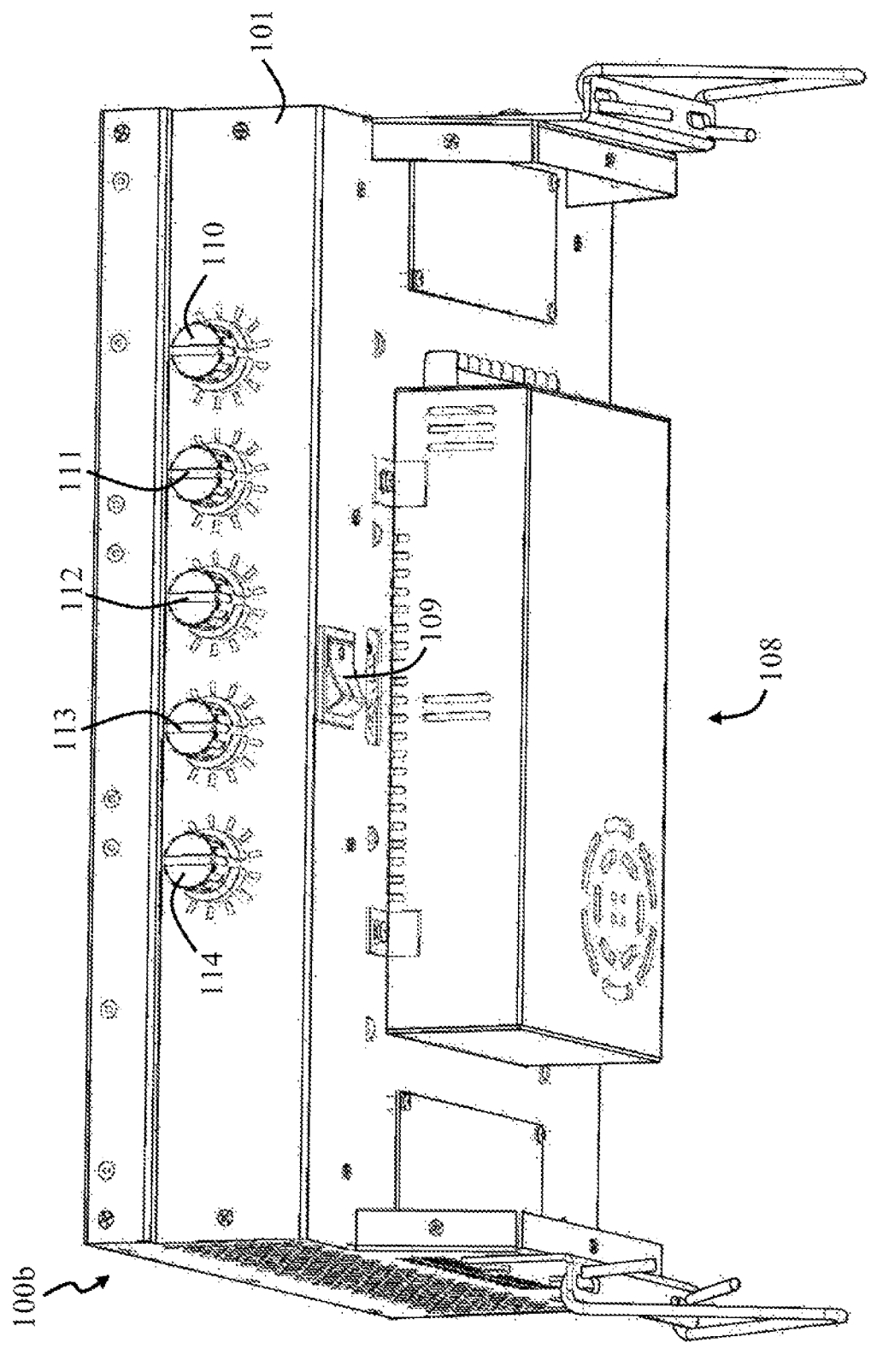

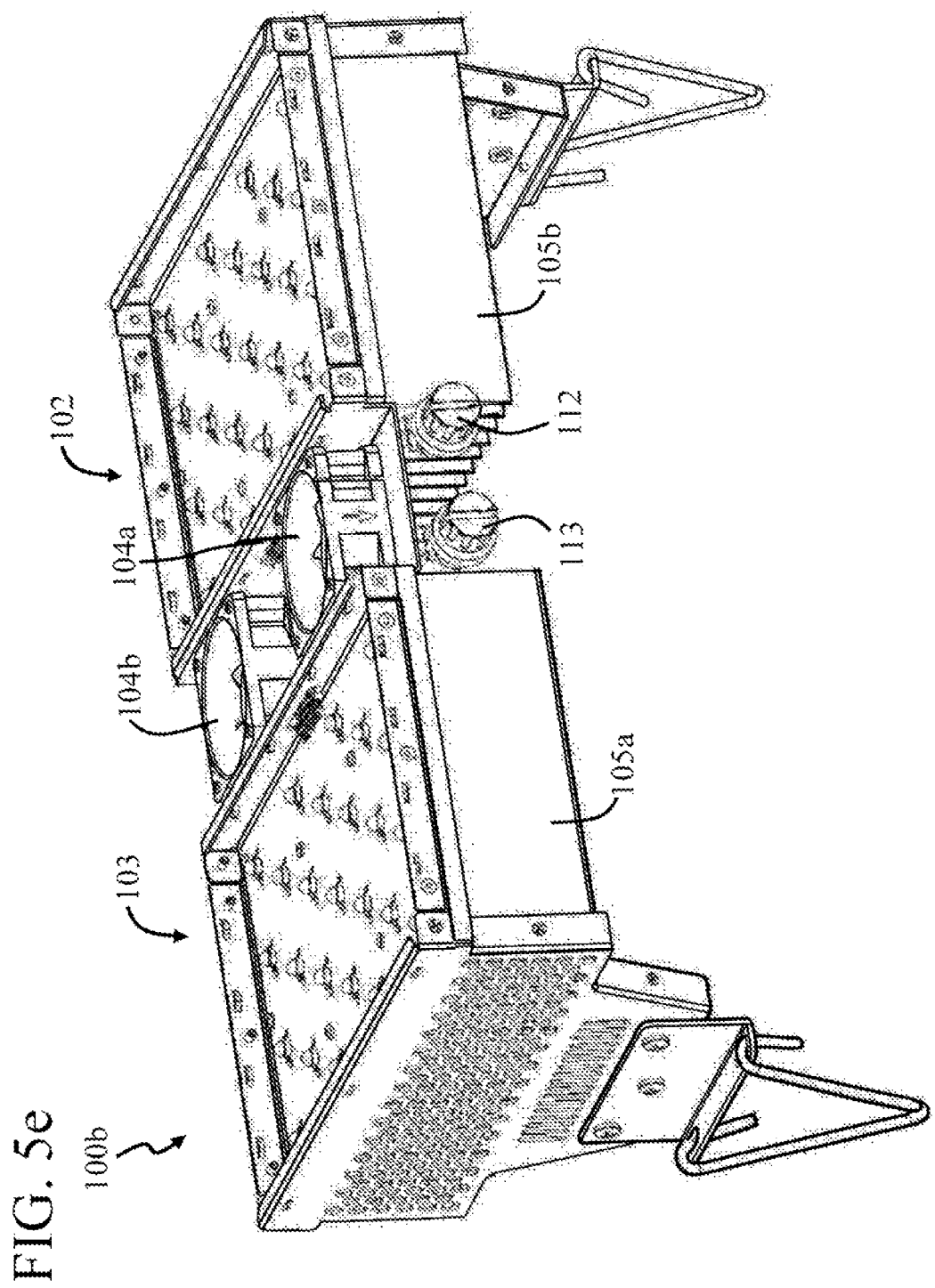

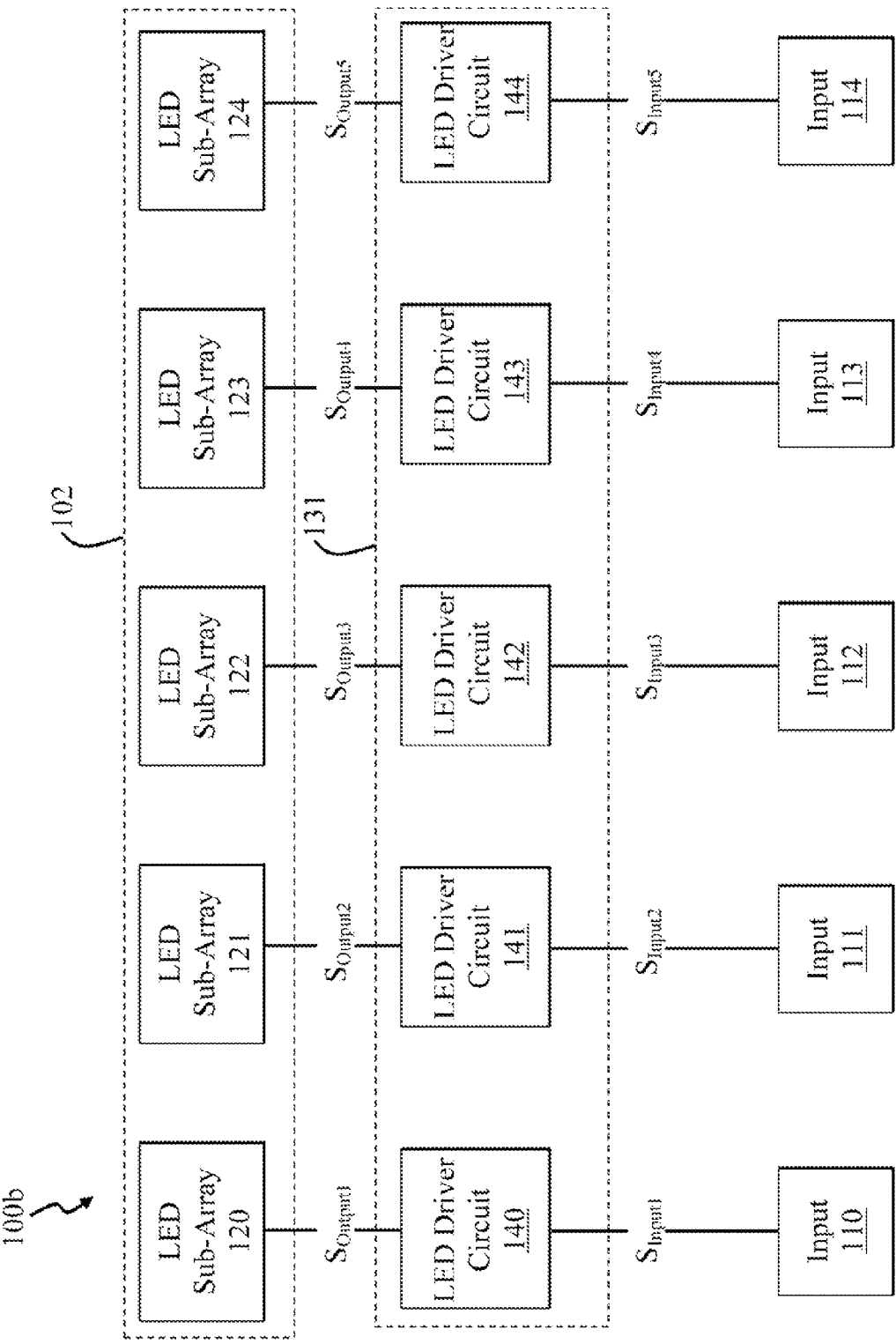

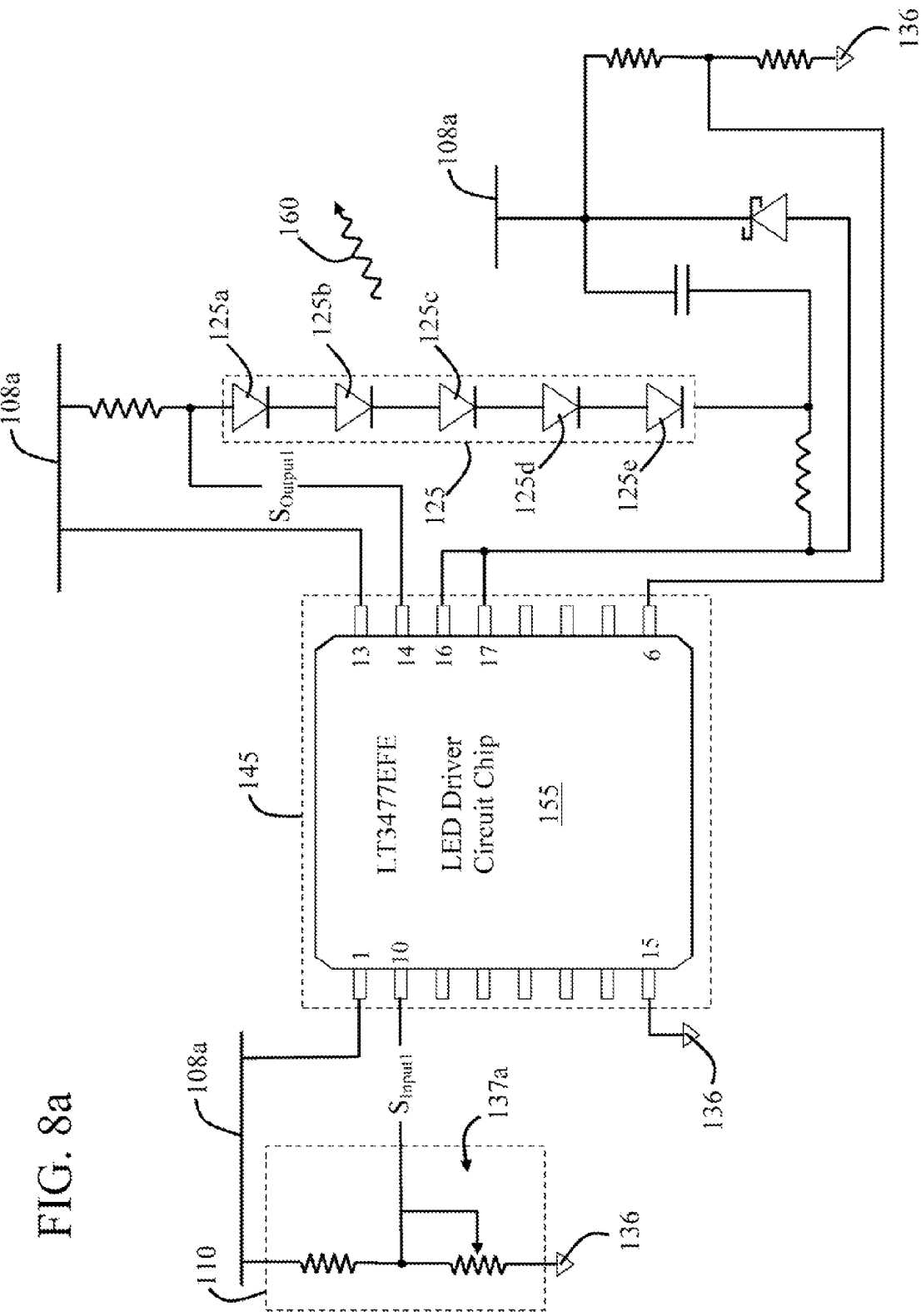

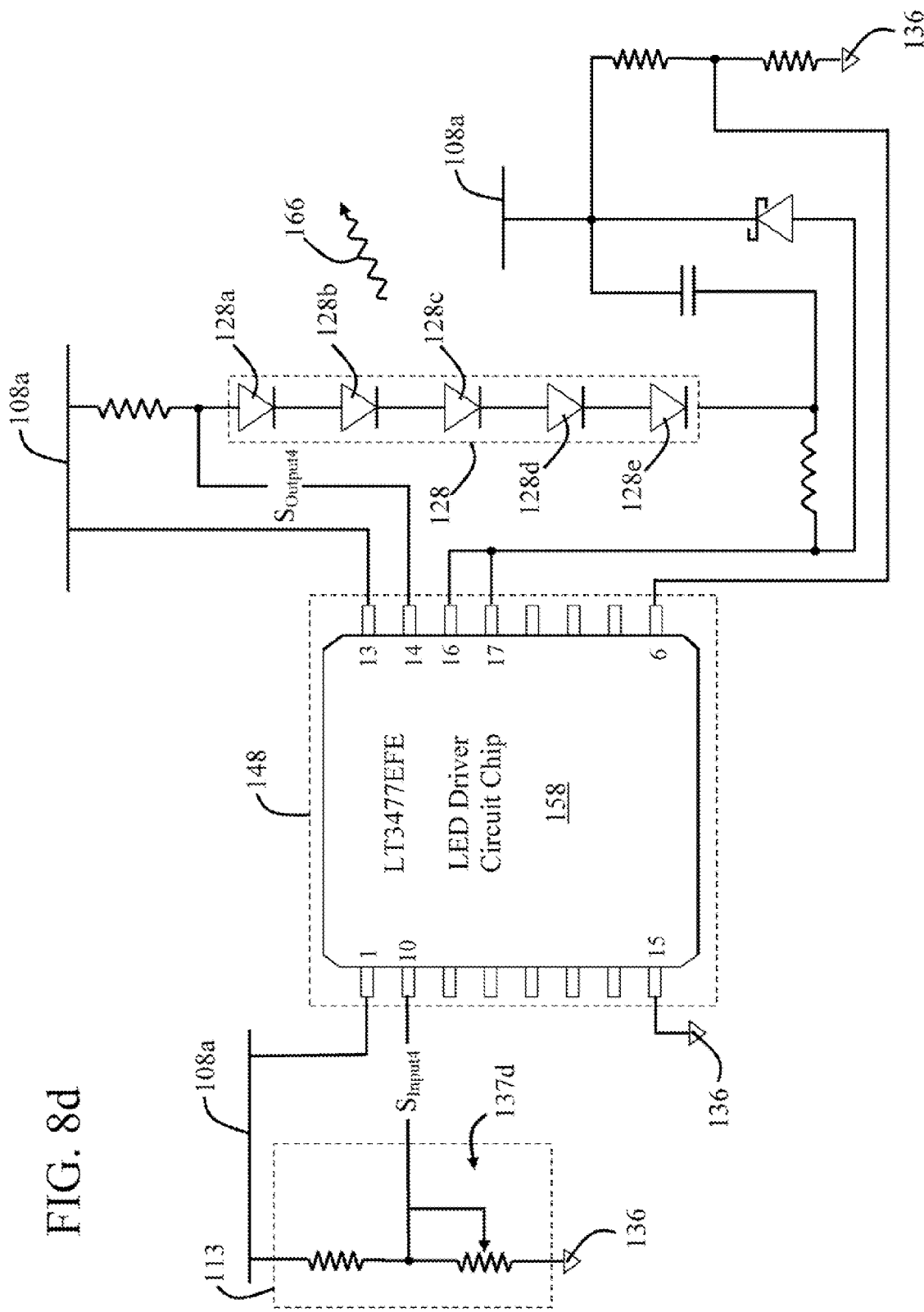

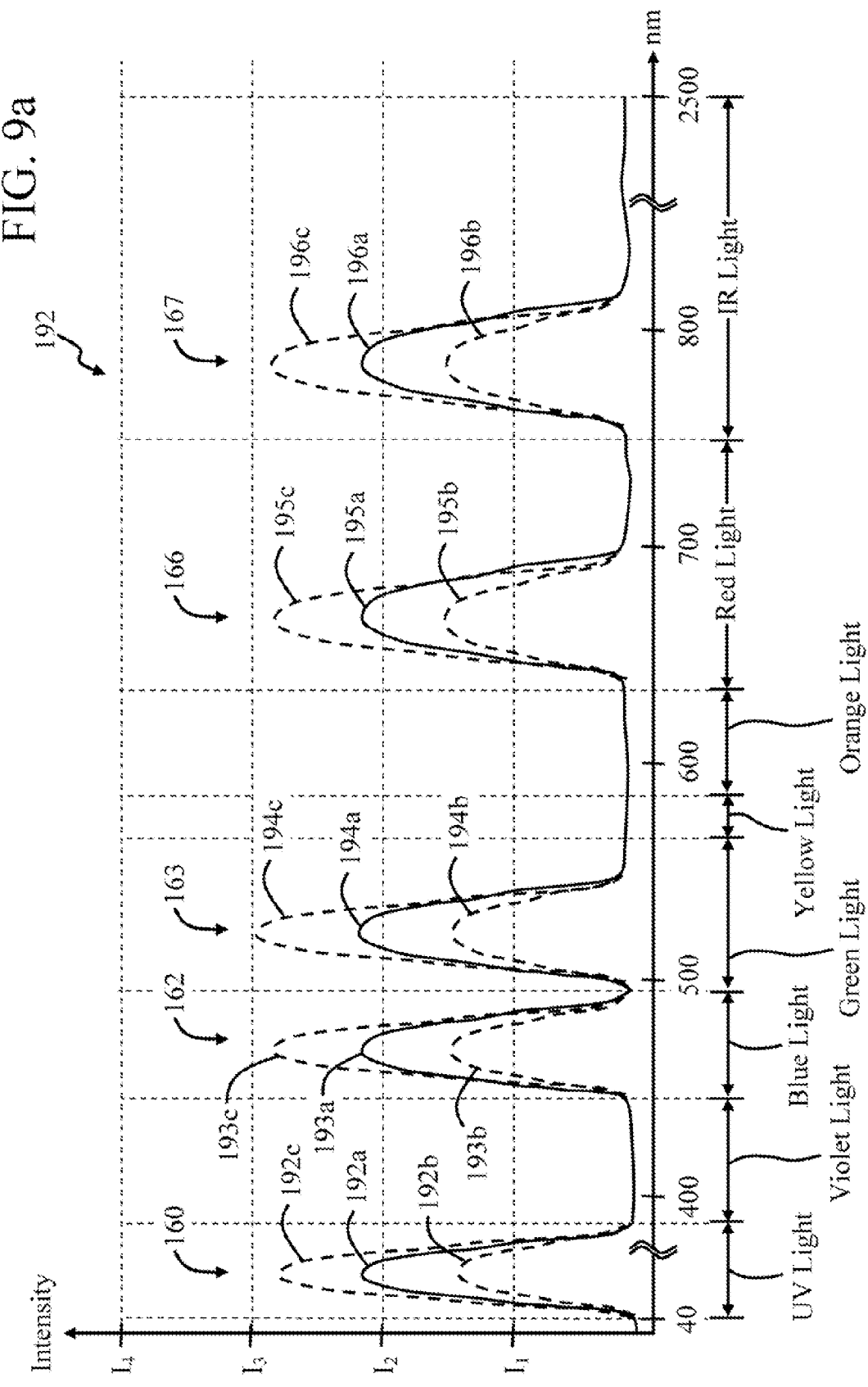

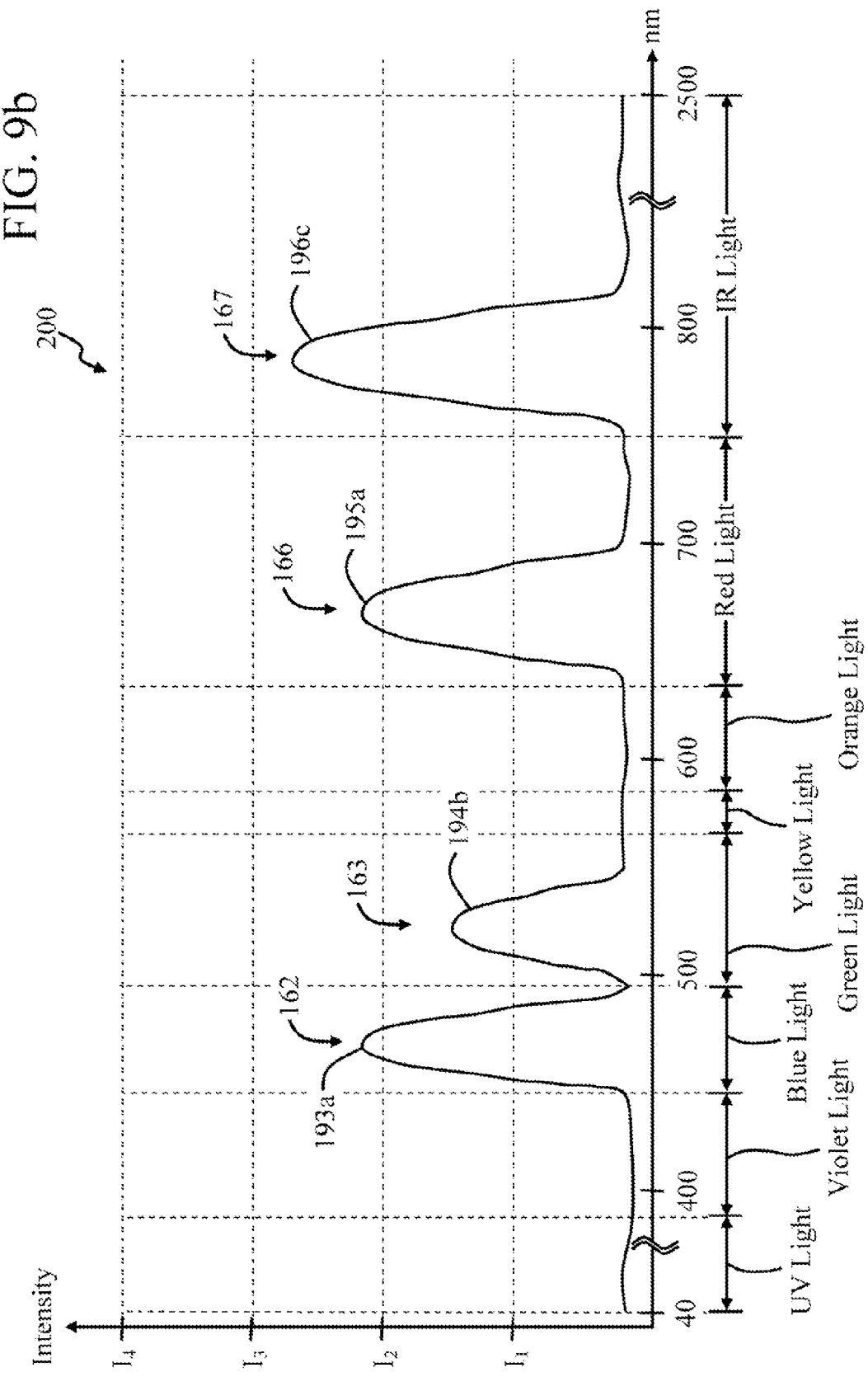

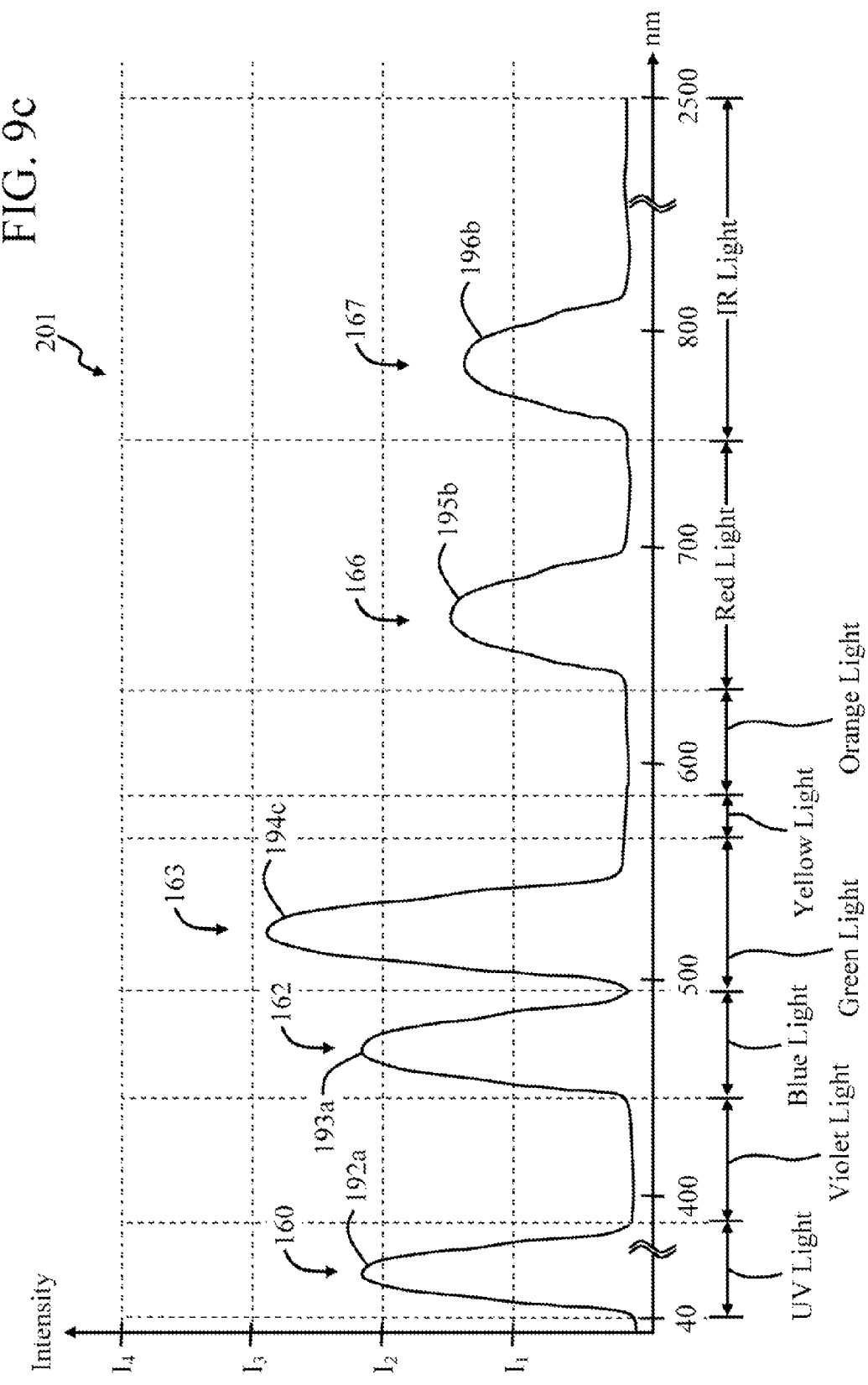

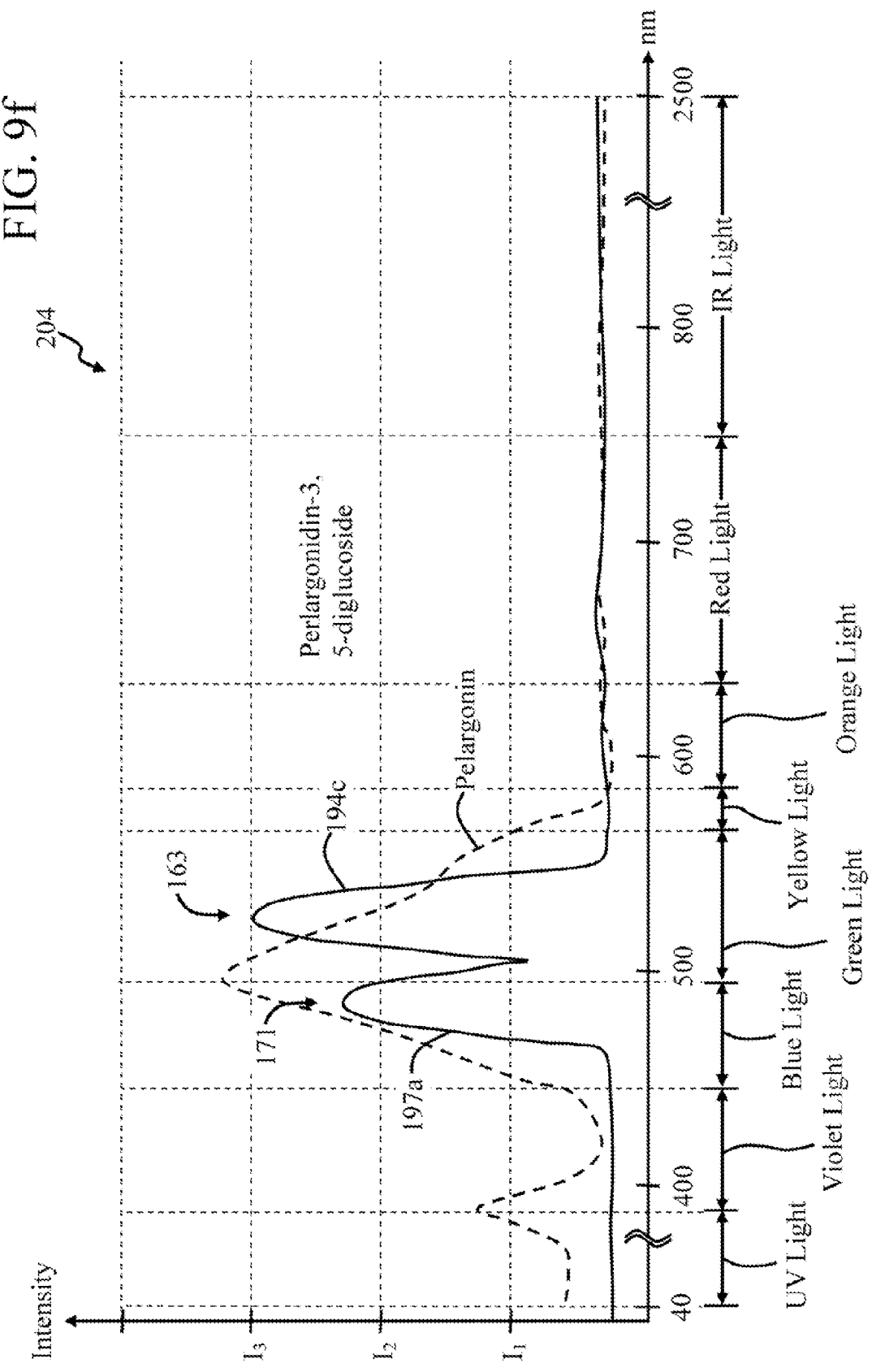

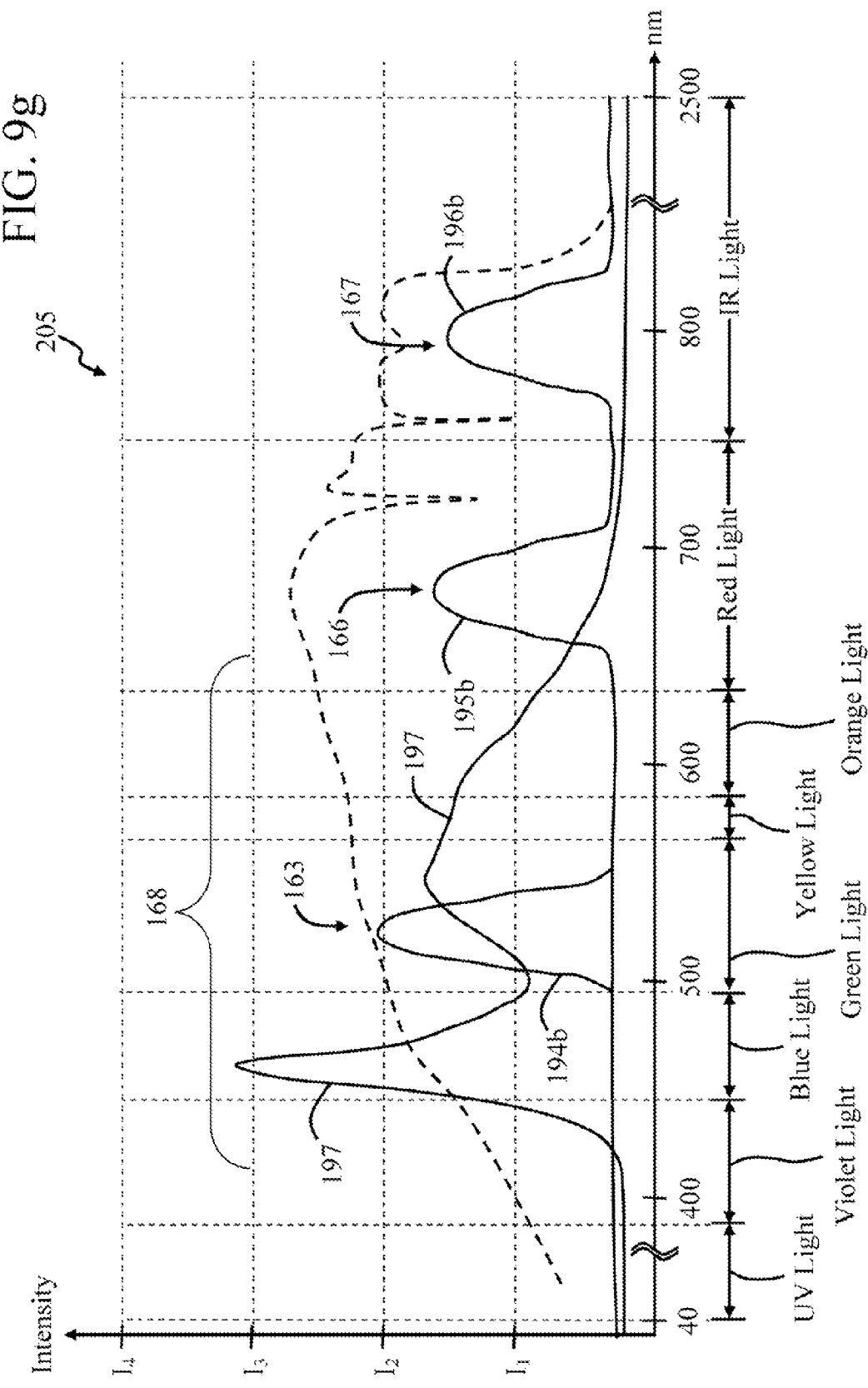

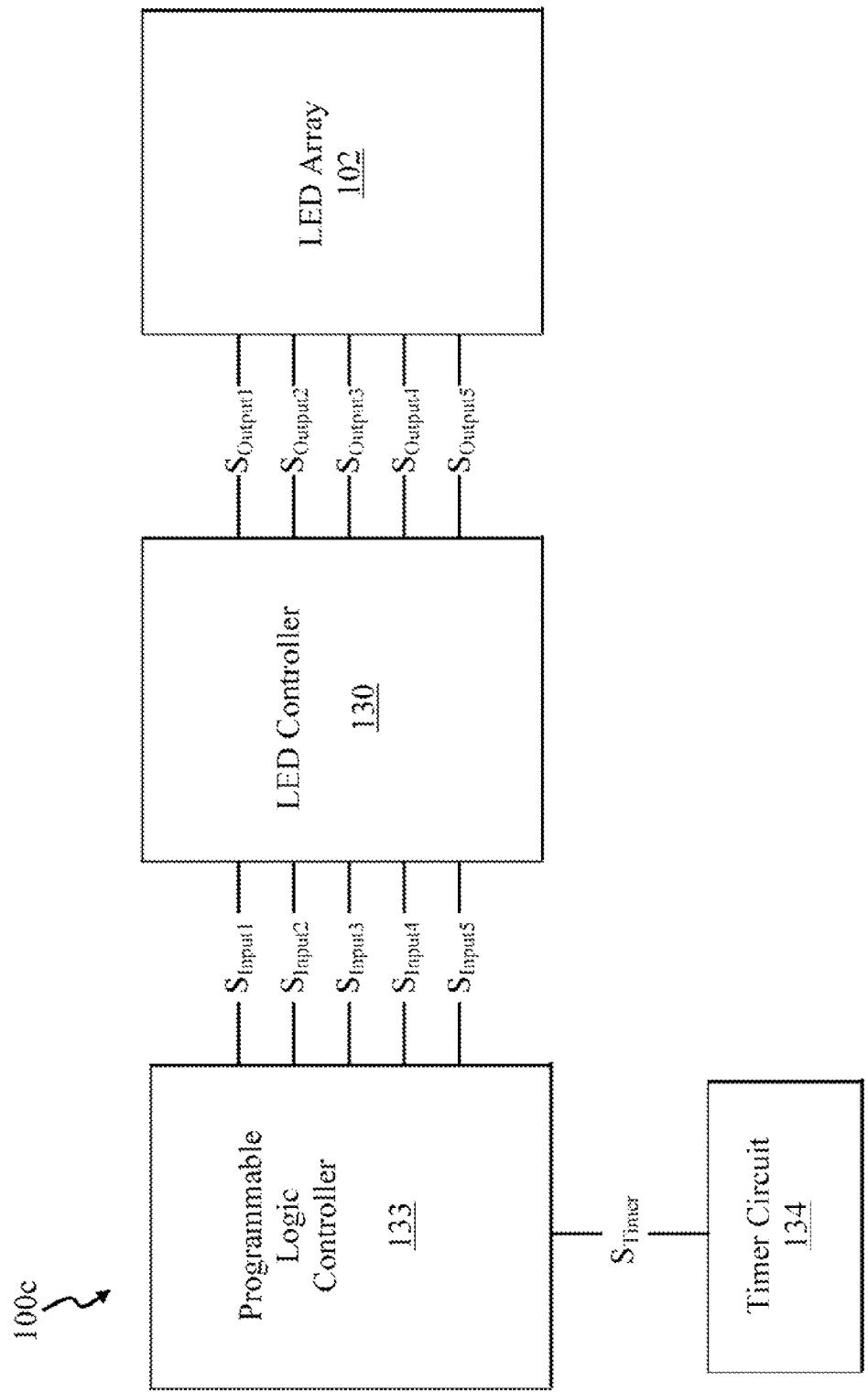

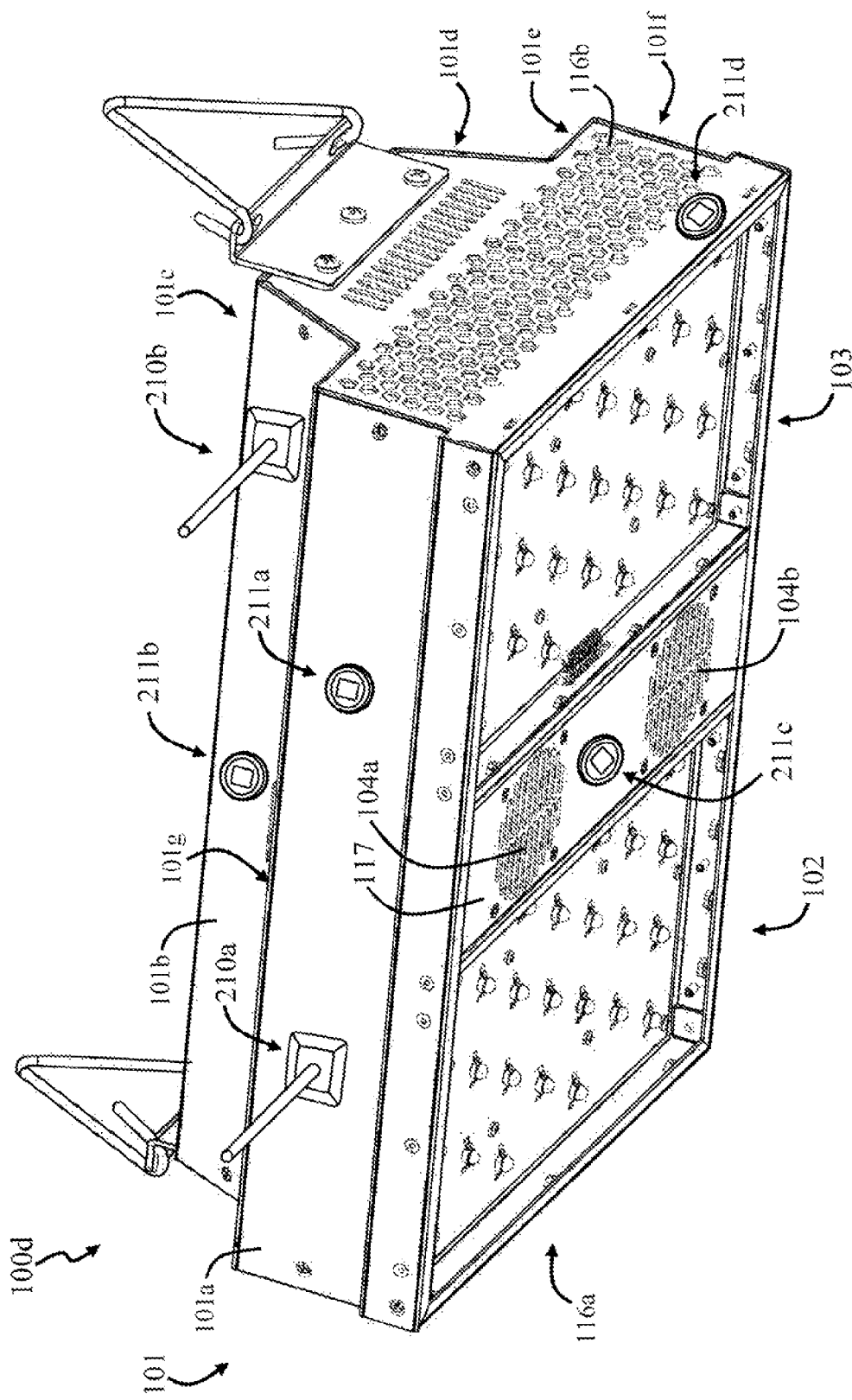

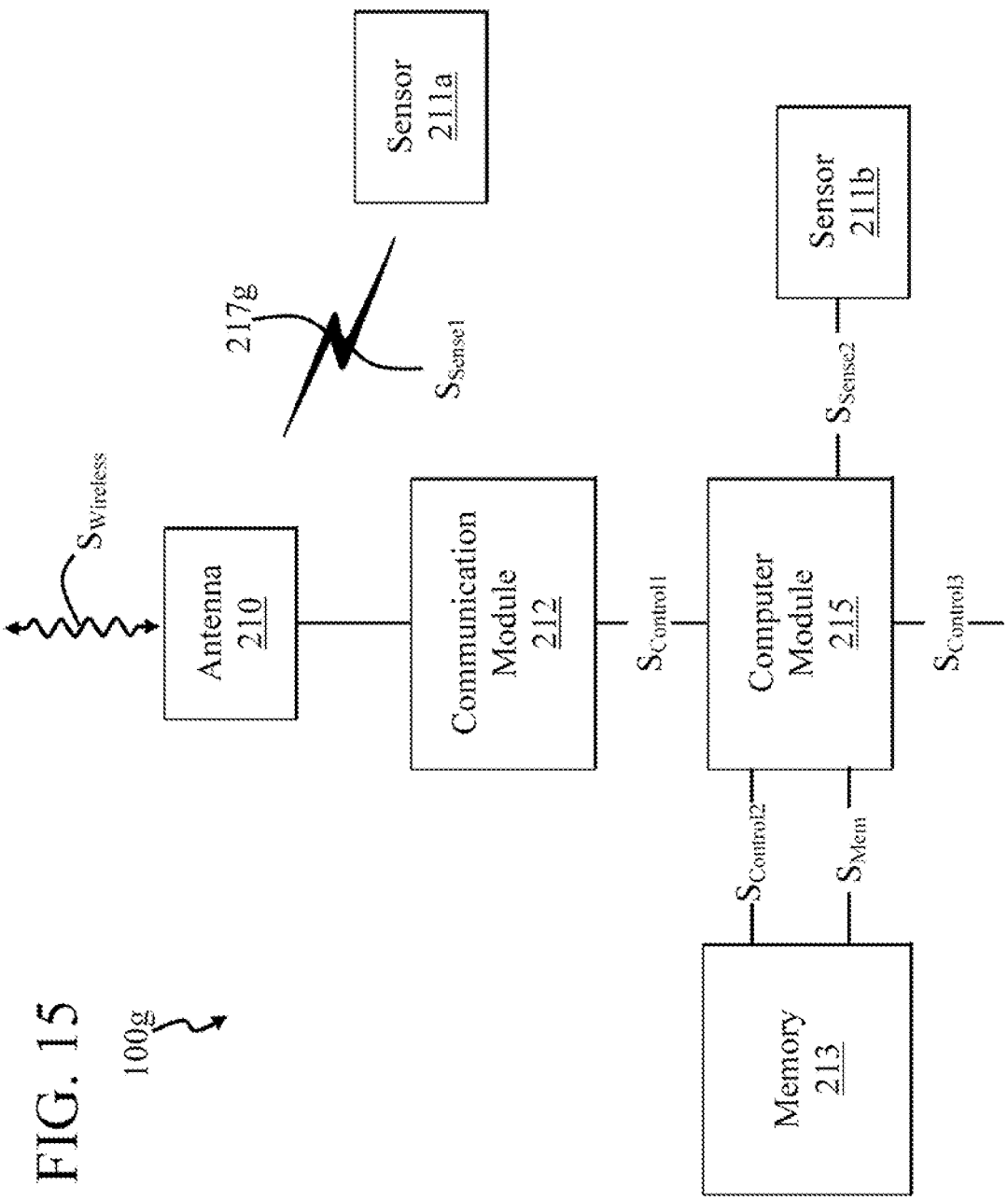

LIGHTING SYSTEM FOR GROWING PLANTS

CROSS-REFERENCE TO RELATED APPLICATIONS

This application is a continuation-in-part of U.S. patent application Ser. No. 12/509,380, filed on Jul. 24, 2000 and issued on Oct. 30, 2012 as U.S. Pat. No. 8,297,782, which claims priority to U.S. Provisional Application No. 61/083,499 filed on Jul. 24, 2008, the contents of both of which are incorporated by reference as though fully set forth herein.

BACKGROUND OF THE INVENTION

1. Field of the Invention

This invention relates generally to facilitating plant growth using light.

2. Description of the Related Art

Some lighting systems for growing plants utilize gas-based lights and other lighting systems utilize light emitting diodes (LEDs). More information regarding lighting systems for growing plants can be found in U.S. Pat. No. 6,688,759 to Hadjimichael, the contents of which are incorporated herein by reference. Information regarding lighting systems that utilize LEDs can be found in U.S. Pat. No. 5,012,609 to Ignatius et al., U.S. Pat. No. 5,278,432 to Ignatius et al., U.S. Pat. No. 6,474,838 to Fang et al., U.S. Pat. No. 6,602,275 to Sullivan, U.S. Pat. No. 6,921,182 to Anderson et al., U.S. Patent Application Nos. 20040189555 to Capen et al., 20070058368 to Partee et al., U.S. Patent Application No. 20110125296 to Bucove, et al., U.S. Patent Application No. 20050030538 to Jaffar and International Application No. PCT/CA2007/001096 to Tremblay et al., all of which are incorporated by reference as though fully set forth herein.

There are many different manufacturers that use light emitting diodes for the growing of plants. Some of these manufacturers include Homegrown Lights, Inc., which provides the Procyon 100, SuperLED, which provides the LightBlaze 400, Sunshine Systems, which provides the GrowPanel Pro, Theoreme Innovation, Inc., which provides the T1 Smart-Lamp, and HID Hut, Inc., which provides the LED UFO.

However, it is desirable to provide a lighting system which allows the color of the emitted light to be better controlled.

BRIEF SUMMARY OF THE INVENTION

The present invention is directed to a lighting system for facilitating the growth of plants. The novel features of the invention are set forth with particularity in the appended claims. The invention will be best understood from the following description when read in conjunction with the accompanying drawings.

BRIEF DESCRIPTION OF THE DRAWINGS

FIG. 1b is a more detailed block diagram of the lighting system of FIG. 1a.

FIG. 3a is a graph of a wavelength spectrum of light provided by the lighting system of FIG. 1a.

FIG. 3b is a graph of another wavelength spectrum of light provided by the lighting system of FIG. 1a.

FIG. 3c is a graph of a wavelength spectrum of light provided by the lighting system of FIG. 1a, wherein the wavelength spectrum includes color mixing.

FIGS. 4a and 4b are graphs of wavelength spectra of light provided by the lighting system of FIG. 1a, and action spectrum corresponding to chlorophyll a and chlorophyll b, respectively.

FIGS. 4c and 4d are graphs of wavelength spectra of light provided by the lighting system of FIG. 1a, and action spectrum corresponding to α-carotene.

FIGS. 4e and 4f are graphs of wavelength spectra of light provided by the lighting system of FIG. 1a, and action spectrum corresponding to β-carotene.

FIG. 4g is a graph of wavelength spectrum of light provided by the lighting system of FIG. 1a, and action spectrum corresponding to pelargonin (Perlargonidin-3,5-diglucoside).

FIG. 4h is a graph of wavelength spectrum of light provided by the lighting system of FIG. 1a, and action spectrum corresponding to phycocyanin.

FIG. 4i is a graph of wavelength spectrum of light provided by the lighting system of FIG. 1a, and action spectrum corresponding to phycoerythrin.

FIGS. 5a and 5b are bottom and top perspective views, respectively, of an embodiment of a lighting system.

FIGS. 5c and 5d are top and back perspective views of the lighting system of FIGS. 5a and 5b.

FIG. 5e is a front perspective view of the lighting system of FIGS. 5a and 5b.

FIGS. 6a and 6b are block diagram of the lighting system of FIGS. 5a and 5b, which includes five inputs operatively coupled to the first and second LED arrays through an LED controller, wherein the LED controller includes first and second LED sub-controllers.

FIGS. 8a, 8b, 8c, 8d and 8e are schematic diagrams of the inputs of FIGS. 5a and 5b operatively coupled to the second LED sub-array through the second LED driver circuit, wherein the inputs operate as potentiometers.

FIGS. 9a, 9b and 9c are graphs of wavelength spectra of light provided by the lighting system of FIGS. 5a and 5b, wherein the wavelength spectrum includes color mixing.

FIG. 9d is a graph of a wavelength spectrum of light provided by the lighting system of FIGS. 5a and 5b, wherein, and the wavelength spectrum of chlorophyll a.

FIG. 9f is a graph of a wavelength spectrum of light provided by the lighting system of FIGS. 5a and 5b, wherein, and the wavelength spectrum of pelargonin.

FIG. 9g is a graph of a wavelength spectrum of light provided by the lighting system of FIGS. 5a and 5b, wherein, and the wavelength spectrum of sunlight.

FIG. 10 is a block diagram of a lighting system, which includes a programmable logic controller operatively coupled to an LED array through an LED controller.

FIGS. 11a and 11b are bottom and top perspective views, respectively, of an embodiment of a lighting system.

FIG. 13a is a schematic diagram of one embodiment of the lighting system of FIG. 12a.

FIG. 15 is a block diagram of one embodiment of a lighting system, which includes a computer module.

DETAILED DESCRIPTION OF THE INVENTION

Figure 1A:
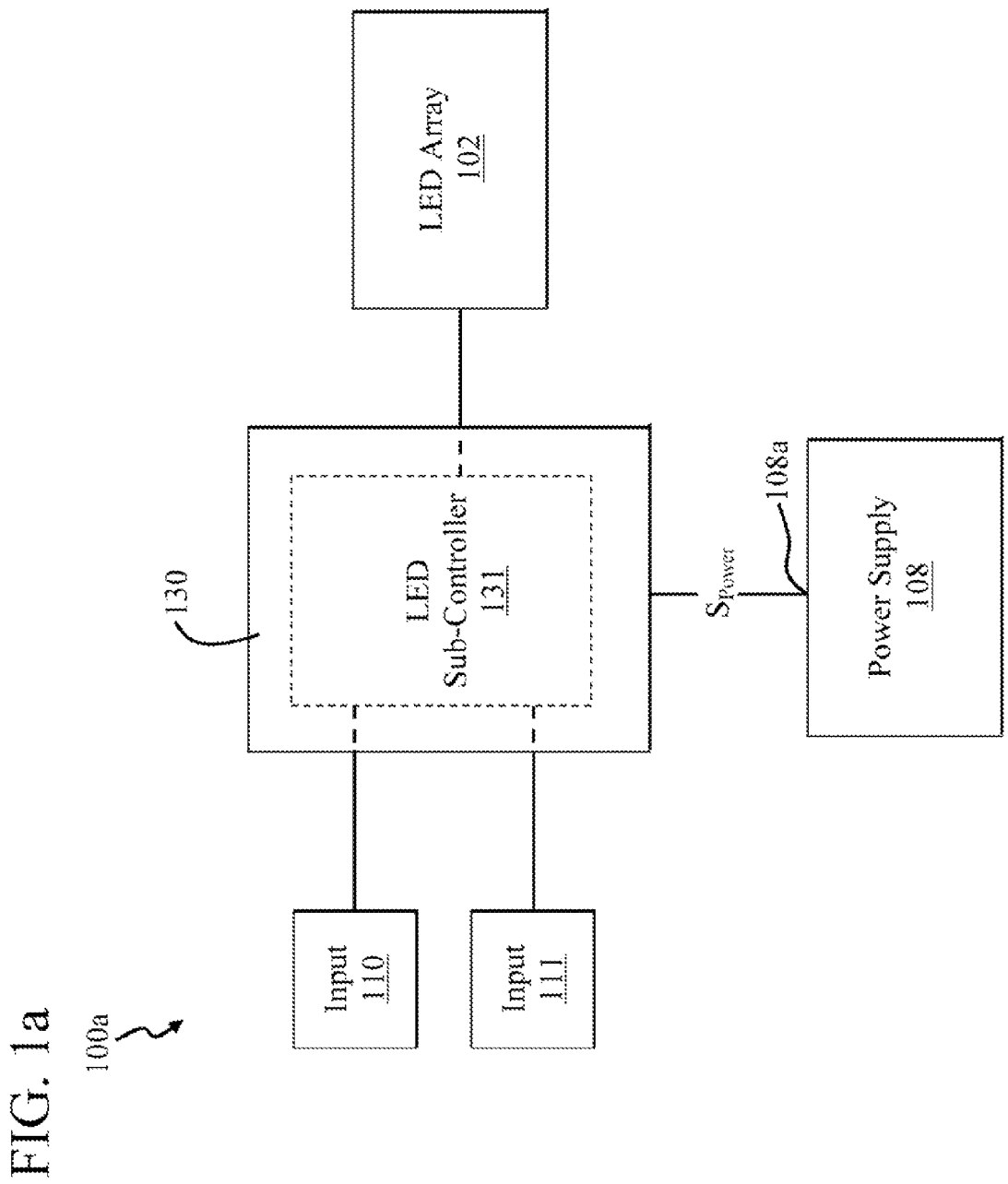
FIG. 1a is a block diagram of a lighting system, which includes two inputs operatively coupled to an LED array through an LED controller.

FIG. 1a is a block diagram of a lighting system 100a, which includes inputs 110 and 111 operatively coupled to an LED array 102 through an LED controller 130. Lighting system 100a includes a power supply 108 which provides a power signal $S_{Power}$ to LED controller 130 through a power terminal 108a.

LED array 102 includes two or more different types of LEDs, which are capable of emitting different wavelength spectrums of light. LEDs of the same type emit the same wavelength spectrums of light, and LEDs of different types emit different wavelength spectrum of light. A wavelength spectrum of light is the intensity of light emitted by the LED versus the wavelength of the light, and corresponds to a color of the light. The wavelengths spectrum of light can be determined in many different ways, such as with a spectrometer. Examples of wavelength spectrums of light are discussed in more detail below with the graphs shown in FIGS. 3a-3c and FIGS. 4a-4i.

It should be noted that the conventions for the wavelengths of different colors of light vary widely. However, the wavelengths of light discussed herein will have the following ranges for ease of discussion:

Ultraviolet light (UV): 40 nm to 380 nm;
Violet light: 380 nm to 450 nm;
Blue light: 450 nm to 495 nm;
Green light: 495 nm to 570 nm;
Yellow light: 570 nm to 590 nm;
Orange light: 590 nm to 620 nm;
Red light: 620 nm to 750 nm; and
Infrared light (IR): 750 nm to 2500 nm,
wherein the wavelengths above are in nanometers (nm).

It should also be noted that there is typically some wavelength overlap between adjacent colors of light emitted by an LED. For example, wavelengths of blue and green light emitted by an LED typically overlap in a wavelength range of about 485 nanometers to about 505 nanometers. Further, wavelengths of blue and violet light emitted by an LED typically overlap in a wavelength range of about 440 nm to about 460 nm. In this way, the wavelength range of blue light is between about 450 nm to about 495 nm, and the wavelength range of green light is between about 495 nm to about 570 nm.

It should be noted that an LED emits light in response to being activated, and an LED does not emit light in response to being deactivated. An LED is activated in response to driving a current through it to a current level above a threshold current level. Further, an LED is deactivated in response to driving a current through it to a current level below the threshold current level. In this embodiment, an LED of LED array 102 is activated in response to receiving a signal from LED controller 130, as will be discussed in more detail below.

It should be noted that the light emitted by two different types of LEDs of LED c array 102 are mixed together. In this way, lighting system 100a provides color mixing. The light of the LEDs of LED array 102 can be mixed together to provide a desired wavelength spectrum of light.

It should also be noted that the intensity of the light emitted by a single LED typically has a Gaussian wavelength distribution. However, some LEDs, such as those which provide white light, have intensities that have non-Gaussian wavelength distributions. An LED which provides white light and has an intensity having a non-Gaussian wavelength distribution will be discussed in more detail below with FIG. 9g.

The wavelength spectrum of the light emitted by an LED can be chosen in response to choosing the band gap energy of the semiconductor material of the LED. The band gap energy of the semiconductor material of the LED is typically chosen by choosing the semiconductor material composition. The semiconductor material composition can be chosen during growth. It should be noted that the wavelength distribution of the light emitted by an LED can be chosen in response to choosing the semiconductor material composition. The semiconductor materials included with different types of LEDs can be of many different types, several of which will be discussed in more detail presently.

LEDs which emit IR light can include many different types of semiconductor materials, such as gallium arsenide and aluminum gallium arsenide. Further, LEDs which emit red light can include many different types of semiconductor materials, such as aluminum gallium arsenide, gallium arsenide phosphide, aluminum gallium indium phosphide and gallium phosphide.

LEDs which emit orange light can include many different types of semiconductor materials, such as gallium arsenide phosphide, aluminum gallium indium phosphide and gallium phosphide. Further, LEDs which emit yellow light can include many different types of semiconductor materials, such as gallium arsenide phosphide, aluminum gallium indium phosphide and gallium phosphide.

LEDs which emit green light can include many different types of semiconductor materials, such as indium gallium nitride/gallium nitride heterostructure, gallium phosphide, aluminum gallium indium phosphide and aluminum gallium phosphide. Further, LEDs which emit blue light can include many different types of semiconductor materials, such as zinc selenide and indium gallium nitride.

LEDs which emit violet light can include many different types of semiconductor materials, such as indium gallium nitride. Further, LEDs which emit ultraviolet light can include many different types of semiconductor materials, such as aluminum nitride, aluminum gallium nitride, and aluminum gallium indium nitride.

LEDs which emit purple light typically include a blue LED coated with a red phosphor or a white LED coated with a purple plastic. LEDs which emit white light can include a blue LED coated with a yellow phosphor.

Hence, the LEDs of LED array 102 can provide light having many different wavelength values, such as those mentioned above. The LEDs of LED array 102 can be provided by many different manufacturers, such as Cree, Inc. of Durham, N.C. and Nichia Corporation of Tokyo, Japan. In this particular embodiment, however, the LEDs of LED array 102 are provided by Philips Lumileds Lighting Company and are referred to as Luxeon-III light emitting diodes.

In operation, power supply 108 provides power signal $S_{power}$ to LED controller 130 through power terminal 108a. LED controller 130 selectively controls the operation of the LEDs of LED array 102 in response to an indication from inputs 110 and/or 111, as will be discussed in more detail below. LED controller 130 selectively controls the operation of the LEDs of LED array 102 by controlling which types of LEDs are activated and deactivated. As mentioned above, activated LEDs emit light, and deactivated LEDs do not emit light. In this way, LED array 102 is capable of selectively emitting light of different wavelength ranges.

In one embodiment, LED array 102 includes a first LED which emits red light and a second LED which emits blue light. In this embodiment, LED array 102 can provide red light, blue light and a mixture of red and blue light in response to adjusting inputs 110 and/or 111.

In another embodiment, LED array 102 includes a first LED which emits violet light and a second LED which emits red light. In this embodiment, LED array 102 can provide violet light, red light and a mixture of violet and red light in response to adjusting inputs 110 and/or 111.

In one embodiment, LED array 102 includes a first LED which emits violet light and a second LED which emits blue light. In this embodiment, LED array 102 can provide violet light, blue light and a mixture of violet and blue light in response to adjusting inputs 111 and/or 110.

Figure 1C:
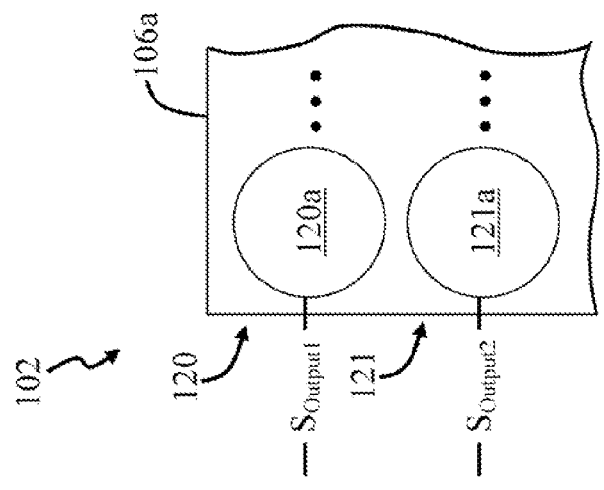
FIG. 1c is a more detailed front view of one embodiment of the LED array of FIG. 1a, which includes two LED sub-arrays.
Figure 1B:
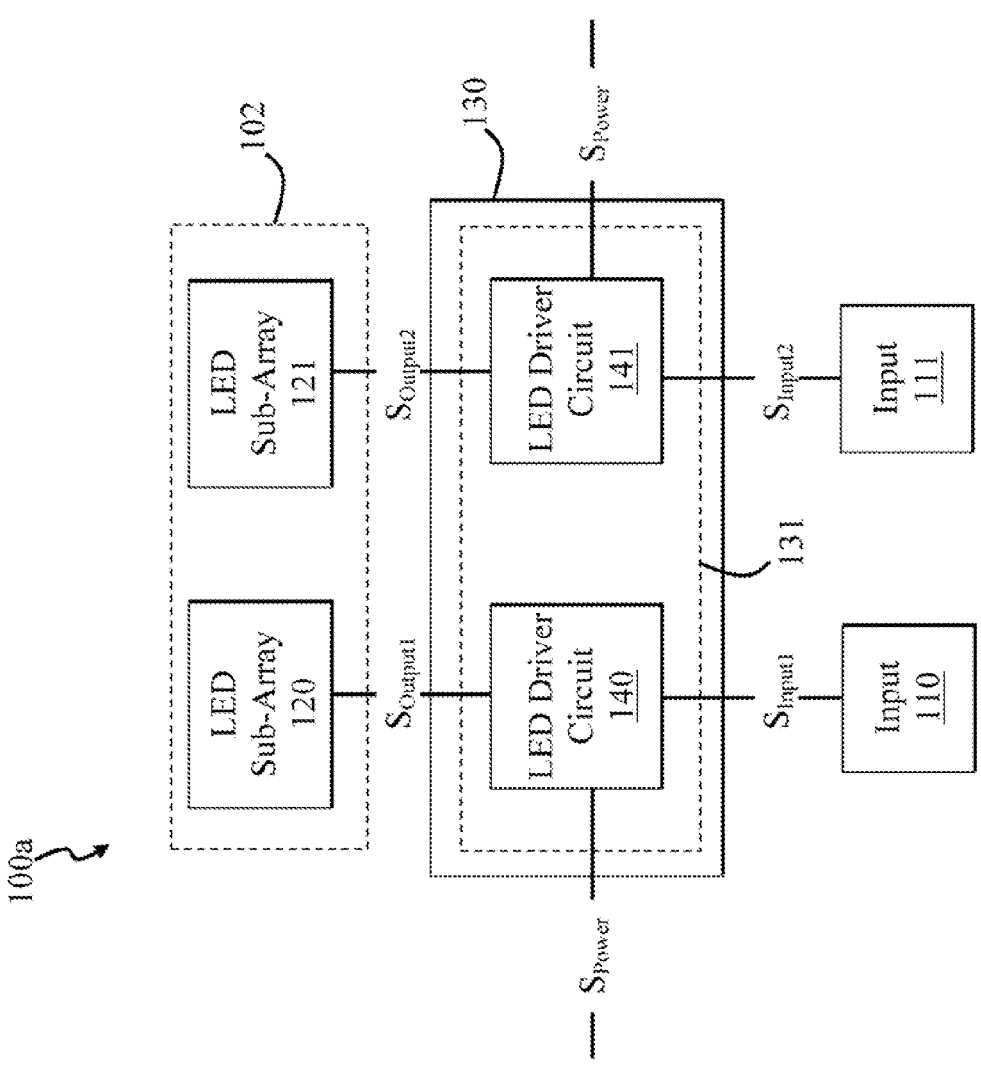

FIG. 1b is a more detailed block diagram of lighting system 100a, and FIG. 1c is a more detailed front view of one embodiment of LED array 102. In this embodiment, LED controller 130 includes an LED sub-controller 131, which is operatively coupled to inputs 110 and 111, as well as to LED array 102. In particular, LED sub-controller 131 includes LED driver circuits 140 and 141, and LED array 102 includes LED sub-arrays 120 and 121. Input 110 is operatively coupled to LED sub-array 120 through LED driver circuit 140, and input 111 is operatively coupled to LED sub-array 121 through LED driver circuit 141. In this way, inputs 110 and 111 are operatively coupled to LED array 102 through LED controller 130.

In this embodiment, LED array 102 includes an LED array support structure 106a which carries LED sub-arrays 120 and 121. In this embodiment, LED sub-array 120 includes one or more LEDs of the same type. Further, in this embodiment, LED sub-array 121 includes one or more LEDs of the same type. The LEDs of LED sub-array 120 are denoted as LEDs 120a, and the LEDs of LED sub-array 121 are denoted as LEDs 121a. In this embodiment, and for illustrative purposes, LEDs 120a is capable of emitting blue light 162 and LEDs 121a is capable of emitting red light 166. It should be noted that, in general, LED array 102 includes one or more LED sub-arrays. However, two LED sub-arrays are shown in FIG. 1c for simplicity and ease of discussion. An embodiment in which LED array 102 includes five LED sub-arrays will be discussed in more detail below.

In operation, power supply 108 (FIG. 1a) provides power signal $S_{Power}$ to LED driver circuits 140 and 141 through power terminal 108a (FIG. 1a). Input 110 provides an input signal $S_{Input1}$ to LED driver circuit 140 and, in response, LED driver circuit 140 provides an output signal $S_{Output1}$ to LED sub-array 120. Further, input 111 provides an input signal $S_{Input2}$ to LED driver circuit 141 and, in response, LED driver circuit 141 provides an output signal $S_{Output2}$ to LED sub-array 121.

In some embodiments, input 110 operates as a switch, which is repeatably moveable between active and deactive conditions. In some situations, input 110 is activated so that input signal $S_{Input1}$ provides an indication to LED driver circuit 140 that it is desirable to activate the LEDs of LED sub-array 120. In response to the indication that it is desirable to activate the LEDs of LED sub-array 120, LED driver circuit 140 provides output signal $S_{Output1}$ to LED sub-array 120, and LEDs 120a are activated so they emit light.

In some situations, input 110 is deactivated so that input signal $S_{Input1}$ provides an indication to LED driver circuit 140 that it is desirable to deactivate the LEDs of LED sub-array 120. In response to the indication that it is desirable to deactivate the LEDs of LED sub-array 120, LED driver circuit 140 provides output signal $S_{Output1}$ to LED sub-array 120, and LEDs 120a are deactivated so they do not emit blue light 162.

In some embodiments, input 111 operates as a switch, which is repeatably moveable between active and deactive conditions. In some situations, input 111 is activated so that input signal $S_{Input2}$ provides an indication to LED driver circuit 141 that it is desirable to activate the LEDs of LED sub-array 121. In response to the indication that it is desirable to activate the LEDs of LED sub-array 121, LED driver circuit 141 provides output signal $S_{Output2}$ to LED sub-array 121, and LEDs 121a are activated so they emit red light 166.

In some situations, input 111 is deactivated so that input signal $S_{Input2}$ provides an indication to LED driver circuit 141 that it is desirable to deactivate the LEDs of LED sub-array 121. in response to the indication that it is desirable to deactivate the LEDs of LED sub-array 121, LED driver circuit 141 provides output signal $S_{Output2}$ to LED sub-array 121, and LEDs 121a are deactivated so they do not emit red light 166. In this way, LED array 102 is capable of selectively emitting light of different wavelength ranges.

Figure 2A:
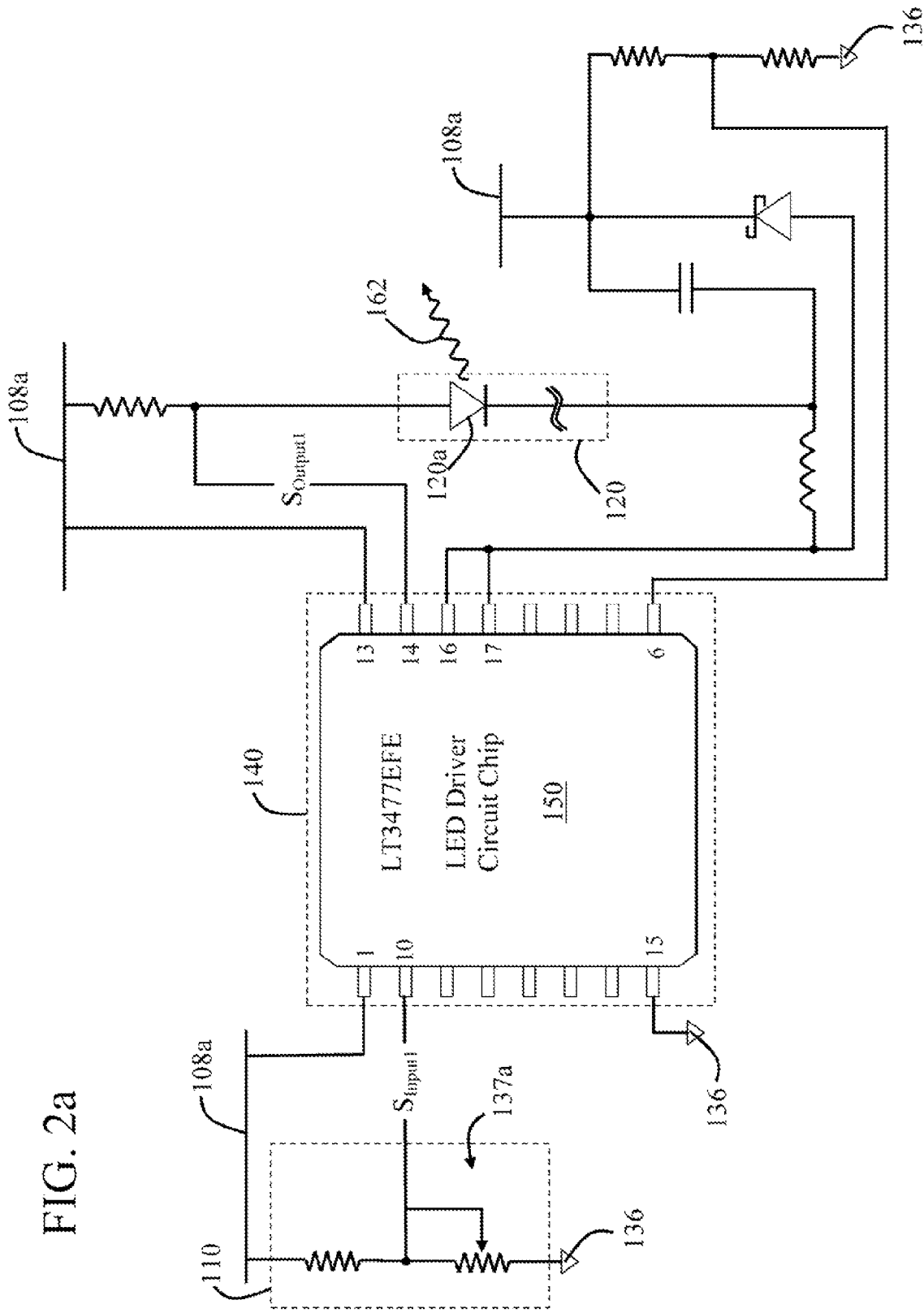
FIG. 2a is a schematic diagram of one input of FIG. 1a operatively coupled to one of the LED sub-arrays through an LED driver circuit, wherein the input operates as a potentiometer.

FIG. 2a is a schematic diagram of one embodiment of input 110 operatively coupled to LED sub-array 120 through LED driver circuit 140, wherein input 110 operates as a potentiometer. In this embodiment, input 110 includes a potentiometer 137a, which is connected between power terminal 108a and a current return 136. LED driver circuit 140 includes an LED driver chip 150, which is embodied as an LT3477EFE chip manufactured by Linear Technology, Inc. of Milpitas, Calif. The LT3477EFE chip is connected to electrical components, such as a resistor, inductor, capacitor and a Schottky diode, so that it operates as an LED driver. More information regarding the LT3477EFE chip, and how it is connected to the electrical components to operate as an LED driver, can be found in a corresponding Data Sheet provided by Linear Technology, Inc. Another chip that can be used is the LM3409 HV chip manufactured by National Semiconductors and Texas Instruments. More information regarding the LM3409 HV chip, and how it is connected to the electrical components to operate as an LED driver, can be found in a corresponding Data Sheet provided by National Semiconductors and Texas Instruments.

In this embodiment, power terminal 108a is connected to terminals 1 and 13 of the LT3477EFE chip, and the output of the potentiometer is connected to terminal 10 so that terminal 10 receives input signal $S_{Input1}$. Terminal 14 of the LT3477EFE chip provides output signal $S_{Output1}$ to LED sub-array 120 In particular, terminal 14 of the LT3477EFE chip provides output signal $S_{Output1}$ to LED 120a.

In operation, the power of input signal $S_{Input1}$ is adjustable in response to adjusting potentiometer 137a. In one situation, the power of input signal $S_{Input1}$ is increased in response to adjusting potentiometer 137a. LED driver circuit chip 150 increases the power of output signal $S_{Output1}$ in response to the power of input signal $S_{Input1}$ being increased by potentiometer 137a. The intensity of blue light 162 emitted by LED 120a increases in response to the amount of power of output signal $S_{Output1}$ being increased by LED driver circuit chip 150.

In another situation, the power of input signal $S_{Input1}$ is decreased in response to adjusting potentiometer 137a. LED driver circuit chip 150 decreases the power of output signal $S_{Output1}$ in response to the power of input signal $S_{Input1}$ being decreased by potentiometer 137a. The intensity of blue light 162 emitted by LED 120a decreases in response to the amount of power of output signal $S_{Output1}$ being decreased by LED driver circuit chip 150.

Figure 2B:
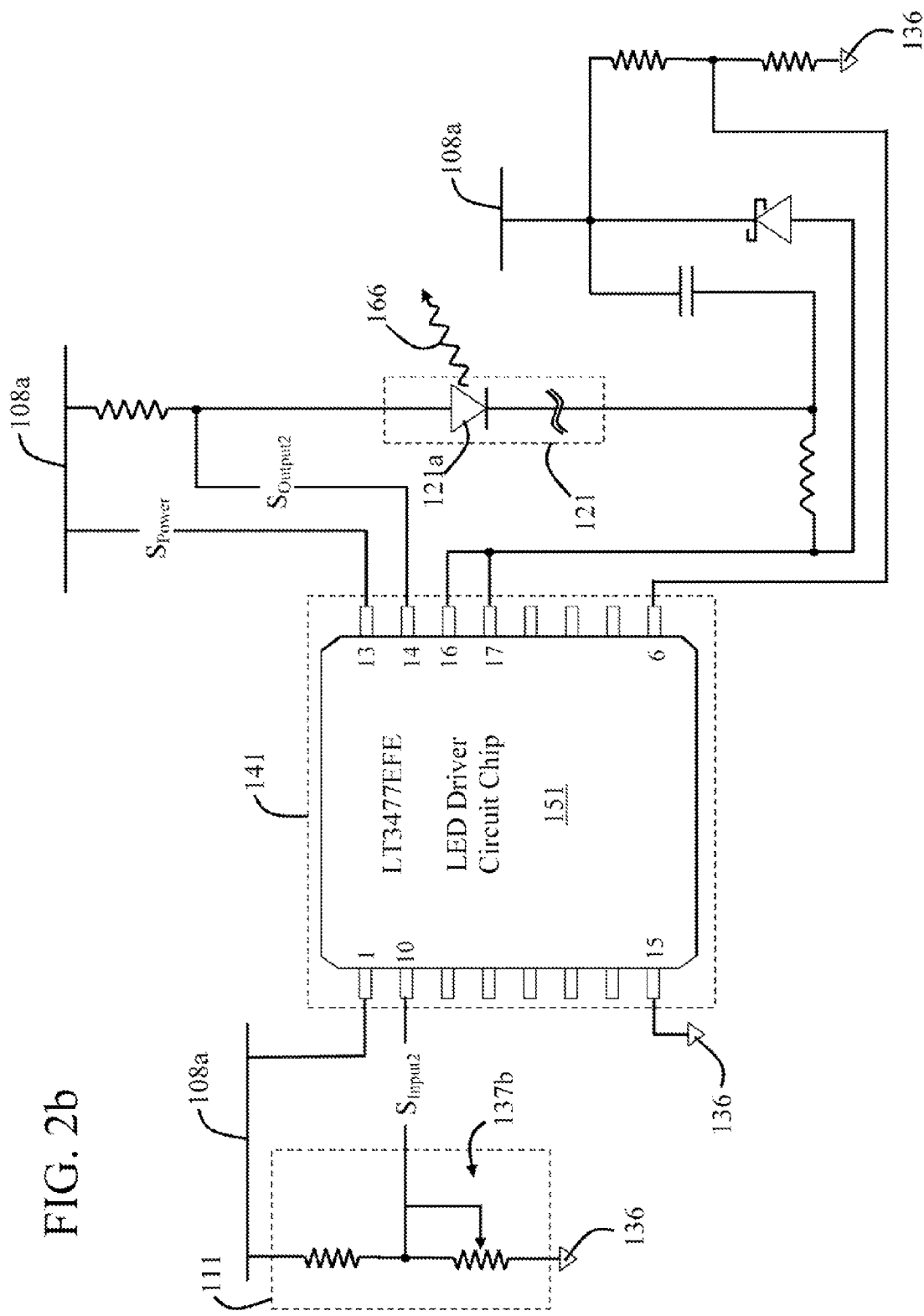
FIG. 2b is a schematic diagram of the other input of FIG. 1a operatively coupled to another of the LED sub-arrays through another LED driver circuit 141, wherein the other input operates as a potentiometer.

FIG. 2b is a schematic diagram of one embodiment of input 111 operatively coupled to LED sub-array 121 through LED driver circuit 141, wherein input 111 operates as a potentiometer. In this embodiment, input 111 is embodied as a potentiometer 137b, which is connected between power terminal 108a and current return 136. LED driver circuit 141 includes an LED driver chip 151, which is embodied as the LT3477EFE chip described in more detail above. The LT3477EFE chip of LED driver chip 151 is connected to electrical components, such as a resistor, inductor, capacitor and a Schottky diode, so that it operates as an LED driver.

In this embodiment, power terminal 108a is connected to terminals 1 and 13 of the LT3477EFE chip, and the output of the potentiometer is connected to terminal 10 so that terminal 10 receives input signal $S_{Input2}$. Terminal 14 of the LT3477EFE chip provides output signal $S_{Output2}$ to LED sub-array 121 In particular, terminal 14 of the LT3477EFE chip provides output signal $S_{Output2}$ to LED 121a.

In operation, the power of input signal $S_{Input2}$ is adjustable in response to adjusting potentiometer 137b. In one situation, the power of input signal $S_{Input2}$ is increased in response to adjusting potentiometer 137b. LED driver circuit chip 151 increases the power of output signal $S_{Output2}$ in response to the power of input signal $S_{Input2}$ being increased by potentiometer 137b. The intensity of red light 166 emitted by LED 121a increases in response to the amount of power of output signal $S_{Output2}$ being increased by LED driver circuit chip 151.

In another situation, the power of input signal $S_{Input2}$ is decreased in response to adjusting potentiometer 371b. LED driver circuit chip 151 decreases the power of output signal $S_{Output2}$ in response to the power of input signal $S_{Input2}$ being decreased by potentiometer 137b. The intensity of red light 166 emitted by LED 121a decreases in response to the amount of power of output signal $S_{Output2}$ being decreased by LED driver circuit chip 151.

Figure 3A:
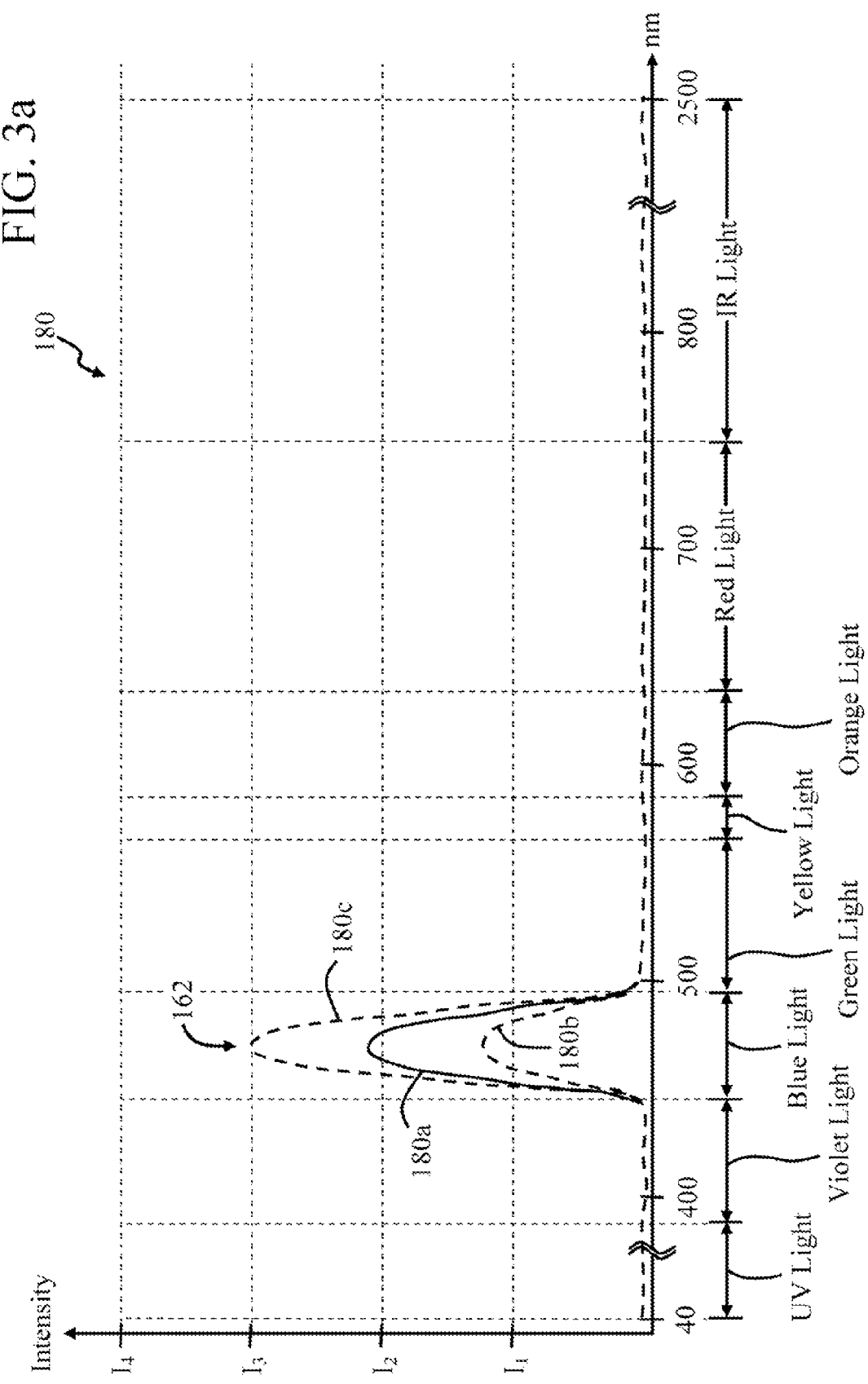

FIG. 3a is a graph of a wavelength spectrum 180 of light provided by lighting system 100a. In FIG. 3a, wavelength spectrum 180 corresponds to the intensity of light versus wavelength (nm). The intensity of light is denoted as $I_1, I_2, I_3$ and $I_4$, wherein $I_1$ is less than $I_2$, $I_2$ is less than $I_3$ and $I_3$ is less than $I_4$. The intensity of light can be determined in many different ways, such as by using a spectrometer.

In this situation, input 110 provides signal $S_{Input1}$ to LED driver circuit 140 (FIGS. 1b and 2a), and LED driver circuit 140 provides signal $S_{Output1}$ to LED sub-array 120. wherein LED sub-array 120 includes LED 120a. In this particular example, LED 120a is an LED that emits blue light 162 when activated. As shown in FIG. 3a, blue light 162 has a Gaussian wavelength spectrum 180a between about 450 nm and 495 nm. In some examples, blue light 162 has as Gaussian wavelength spectrum 180a between about 475 nm and 500 nm. In some examples, blue light 162 has a Gaussian wavelength spectrum 180a between about 450 nm and 475 nm. It should be noted that the intensity of blue light 162 of wavelength spectrum 180 can be adjusted in many different ways, several of which will be discussed in more detail presently.

As mentioned above, in some embodiments, input 110 operates as a switch which is repeatably moveable between activated and deactivated conditions. In these embodiments, the intensity of blue light 162 provided by LED sub-array 120 is adjustable in response to adjusting the number of LEDs 120a. For example, the intensity of blue light 162 decreases, as indicated by wavelength spectrum 180b, in response to decreasing the number of LEDs 120a of LED sub-array 120. Further, the intensity of blue light 162 increases, as indicated by wavelength spectrum 180c, in response to increasing the number of LEDs 120a of LED sub-array 120.

Further, in other embodiments, input 110 includes potentiometer 137a. In some situations, potentiometer 137a is adjusted so the power of input signal $S_{Input1}$ and output signal $S_{Output1}$ are decreased, as discussed above with FIG. 2a. The intensity of blue light 162 decreases, as indicated by wavelength spectrum 180b, in response to decreasing the power of input signal $S_{Input1}$ and output signal $S_{Output1}$ with potentiometer 137a.

In some situations, potentiometer 137a is adjusted so the power of input signal $S_{Input1}$ and output signal $S_{Output1}$ are increased, as discussed above with FIG. 2a. The intensity of blue light 162 increases, as indicated by wavelength spectrum 180c, in response to increasing the power of input signal $S_{Input1}$ and output signal $S_{Output1}$ with potentiometer 137a.

FIG. 3b is a graph of a wavelength spectrum 181 of light provided by lighting system 100a. in FIG. 3b, wavelength spectrum 181 corresponds to the intensity of light versus wavelength (nm), as discussed above with wavelength spectrum 180.

In this situation, input 111 provides signal $S_{Input1}$ to LED driver circuit 141 (FIGS. 1b and 2b), and LED driver circuit 141 provides signal $S_{Output1}$ to LED sub-array 121, wherein LED sub-array 121 includes LED 121a, in this particular example. LED 121a is an LED that emits red light 166 when activated. As shown in FIG. 3b, red light 166 has a Gaussian wavelength spectrum 181a between about 650 nm and 750 nm. In some examples, red light 166 has a Gaussian wavelength spectrum 181a between about 620 nm and 670 nm. In some examples, red light 166 has a Gaussian wavelength spectrum 181a between about 700 nm and 750 nm. It should be noted that the intensity of red light 166 of wavelength spectrum 181 can be adjusted in many different ways, several of which will be discussed in more detail presently.

As mentioned above, in some embodiments, input 111 operates as a switch which is repeatably moveable between activated and deactivated conditions. In these embodiments, the intensity of red light 166 provided by LED sub-array 121 is adjustable in response to adjusting the number of LEDs 121a. For example, the intensity of red light 166 decreases, as indicated by wavelength spectrum 181b, in response to decreasing the number of LEDs 121a of LED sub-array 121. Further, the intensity of red. light 166 increases, as indicated by wavelength spectrum 181*c*, in response to increasing the number of LEDs 121*a* of LED sub-array 121.

Further, in other embodiments, input 111 includes potentiometer 137*b*. In some situations, potentiometer 137*b* is adjusted so the power of input signal $S_{Input2}$ and output signal $S_{Output2}$ are decreased, as discussed above with FIG. 2*b*. The intensity of red light 166 decreases, as indicated by wavelength spectrum 181*b*, in response to decreasing the power of input signal $S_{Input2}$ and output signal $S_{Output2}$ with potentiometer 137*b*.

In some situations, potentiometer 137*b* is adjusted so the power of input signal $S_{Input2}$ and output signal $S_{Output2}$ are increased, as discussed above with FIG. 2*b*. The intensity of red light 166 increases, as indicated, by wavelength spectrum 181*c*, in response to increasing the power of input signal $S_{Input2}$ and output signal $S_{Output2}$ with potentiometer 137*b*.

As mentioned above, lighting system 100*a* can provide color mixing when LED array 102 includes different types of LEDs. An example of a wavelength spectrum with color mixing will be discussed in more detail presently.

FIG. 3*c* is a graph of a wavelength spectrum 182 of light provided by lighting system 100*a*, wherein wavelength spectrum 182 includes color mixing. In FIG. 3*c*, wavelength spectrum 182 corresponds to the intensity of light versus wavelength (nm), as discussed above with wavelength spectrum 180. As shown in FIG. 3*c*, blue light 162 has a Gaussian wavelength spectrum 180*a* between about 450 nm and 500 nm, and red light 166 has a Gaussian wavelength spectrum 181*a* between about 650 nm and 750 nm. Lighting system 100*a* can provide wavelength spectrum 182 with color mixing in many different ways.

In one embodiment, inputs 110 and 111 operate as switches, which are repeatably moveable between activated and deactivated conditions. In these embodiments, the intensity of blue light 162 provided by LED sub-array 120 is adjustable in response to adjusting the number of LEDs 120*a*. For example, the intensity of blue light 162 decreases, as indicated by wavelength spectrum 180*b*, in response to decreasing the number of LEDs 120*a* of LED sub-array 120. Further, the intensity of blue light 162 increases, as indicated by wavelength, spectrum 180*c*, in response to increasing the number of LEDs 120*a* of LED sub-array 120.

In these embodiments, the intensity of red light 166 provided by LED sub-array 121 is adjustable in response to adjusting the number of LEDs 121*a*. For example, the intensity of red light 166 decreases, as indicated by wavelength spectrum 181*b*, in response to decreasing the number of LEDs 121*a* of LED sub-array 121. Further, the intensity of red light 166 increases, as indicated by wavelength spectrum 181*c*, in response to increasing the number of LEDs 121*a* of LED sub-array 121.

It should be noted that the relative intensities of blue light 162 and red light 166 provided by lighting system 100*a* can be adjusted relative to each other in response to adjusting the number of LEDs 120*a* of LED sub-array 120 and the number of LEDs 121*a* of LED sub-array 121. The relative intensities of blue light 162 and red light 166 can be adjusted in many different ways.

For example, in one situation, the number of LEDs 120*a* can be increased relative to the number of LEDs 121*a*, so that wavelength spectrum 180*c*. and wavelength spectrum 181*b* are provided by LED sub-arrays 120 and 121, respectively. In this way, the amount of blue light 162 and red light 166 provided by lighting system 100*a* is increased relative to the amount of red light 166. Further, the number of LEDs 121*a* can be decreased relative to the number of LEDs 120*a*, so that wavelength spectrum 180*c* and wavelength spectrum 181*b* are provided by LED sub-arrays 120 and 121, respectively. In this way, the amount of blue light 162 and red light 166 provided by lighting system 100*a* is decreased relative to the amount of red light 166. In this way, lighting system 100*a* is capable of providing a desired mixture of blue and red light.

In other embodiments, inputs 110 and 111 include potentiometers 136*a* and 136*b*, respectively. In some situations, potentiometer 137*a* is adjusted so the power of input signal $S_{Input1}$ and output signal $S_{Output1}$ are decreased, as discussed above with FIG. 2*a*. The intensity of blue light 162 decreases, as indicated by wavelength spectrum 180*b*, in response to decreasing the power of input signal $S_{Input1}$ and output signal $S_{Output2}$ with potentiometer 137*a*.

In some situations, potentiometer 137*a* is adjusted so the power of input signal $S_{Input1}$ and output signal $S_{Output1}$ are increased, as discussed above with FIG. 2*a*, The intensity of blue light 162 increases, as indicated by wavelength spectrum 180*c*, in response to increasing the power of input signal $S_{Input1}$ and output signal $S_{Output1}$ with potentiometer 137*a*.

In some situations, potentiometer 137*b* is adjusted so the power of input signal $S_{Input2}$ and output signal $S_{Output2}$ are decreased, as discussed above with FIG. 2*b*. The intensity of red light 166 decreases, as indicated by wavelength spectrum 181*b*, in response to decreasing the power of input signal $S_{Input2}$ and output signal $S_{Output2}$ with potentiometer 137*b*.

In some situations, potentiometer 137*b* is adjusted so the power of input signal $S_{Input2}$ and output signal $S_{Output2}$ are increased, as discussed above with FIG. 2*b*. The intensity of red light 166 increases, as indicated by wavelength spectrum 181*c*, in response to increasing the power of input signal $S_{Input2}$ and output signal $S_{Output2}$ with potentiometer 137*b*.

It should be noted that the relative intensities of blue light 162 and red light 166 can be adjusted relative to each other in response to adjusting potentiometers 136*a* and/or 136*b*. The relative intensities of blue light 162 and red light 166 can be adjusted in many different ways by adjusting potentiometers 136*a* and 136*b*.

For example, in some situations, it may be desirable to provide more blue light 162 and less red light 166 with lighting system 100*a*. In this situation, potentiometer 137*a* is adjusted, as described above, so that input signal $S_{Input1}$ and output signal $S_{Output1}$ have more power, and wavelength spectrum 180*c* is provided by LED sub-array 120. Further, potentiometer 137*b* is adjusted, as described above, so that input signal $S_{Input2}$ and output signal $S_{Output2}$ have less power, and wavelength spectrum 181*b* is provided by LED sub-array 121. In this way, lighting system 100*a* provides more blue light 162 and less red light 166.

In some situations, the intensity of red light 166 is about one order of magnitude greater than the intensity of blue light 162. In another situation, the intensity of red light 166 is about ten to about fifteen times greater than the intensity of blue light 162. In another situation, the intensity of red light 166 is about eight to thirteen times greater than the intensity of blue light 162. In general, the intensity of red light 166 is a desired amount greater than the intensity of blue light 162.

In some situations, the intensity of blue light 162 is about one order of magnitude greater than the intensity of red light 166. In another situation, the intensity of blue light 162 is about ten to about fifteen times greater than the intensity of red light 166. In another situation, the intensity of blue light 162 is about eight to thirteen times greater than the intensity of red light 166. In general, the intensity of blue light 162 is a desired amount greater than the intensity of red light 166.

In another situation, it may be desirable to provide less blue light 162 and more red light 166 with lighting system 100*a*. In this situation, potentiometer 137*a* is adjusted, as described above, so that input signal $S_{Input1}$ and output signal $S_{Output1}$ have less power, and wavelength spectrum 180b is provided by LED sub-array 120. Further, potentiometer 137b is adjusted, as described above, so that input signal $S_{Input2}$ and output signal $S_{Output2}$ have more power, and wavelength spectrum 181c is provided by LED sub-array 121. In this way, lighting system 100a provides less blue light 162 and more red light 166. It should be noted that the desired mixture of light provided by lighting system 100a can be chosen to correspond to an action spectrum of a physiological activity of a plant, as will be discussed in more detail presently.

FIGS. 4a and 4b are graphs of wavelength spectrum 183 and 184, respectively, of light provided by lighting system 100a. Action spectrum corresponding to chlorophyll a and chlorophyll b are also shown in FIGS. 4a and 4b, respectively. In FIGS. 4a and 4b, wavelength spectrums 183 and 184 correspond to the intensity of light versus wavelength (nm), as discussed above with wavelength spectrum 180.

It should be noted that the action spectrum of chlorophyll a and chlorophyll b of FIGS. 4a and 4b, respectively, as well as the other action spectra discussed herein, are from a book entitled *Introduction to Plant Physiology, 2nd Edition*, by William G Hopkins, which was published in 1999 by John Wiley & Sons. An action spectrum is the rate of a physiological activity versus the wavelength of light received by a plant. An action spectrum illustrates which wavelengths of light are effective in driving the physiological activity, wherein the physiological activity corresponds to a chemical reaction of the plant. The physiological activity of the plant can be of many different types, such as the chemical reactions associated with photosynthesis and cellular respiration. The wavelengths of light that are effective in driving the physiological activity of the plant depends on the types of pigments the plant includes.

Plants can include many different types of pigments, such as chlorophylls, carotenoids and phycobilins. There are many different, types of chlorophylls, such as chlorophyll a and chlorophyll b. Further, there are many different types of carotenoids, such as xanthophylls and carotenes. There are many different types of carotenes, such as α-carotene and β-carotene. There are many different types of phycobilins, such as pelargonidin, phycocyanin, phycoerythrin, phytochrome and anthocyanins, among others. It should also be noted that the action spectrum of chlorophyll a and chlorophyll b is similar to the action spectrum of other chemicals, such as those associated with leaf extract.

For example, the red and blue-violet, spectrums of light are effective in driving, the physiological activity of photosynthesis of chlorophyll a and chlorophyll b. Hence, the action spectrum corresponding to chlorophyll a and chlorophyll b are non-zero in a range of wavelengths that include red and blue-violet light. in this way, the rate of photosynthesis of chlorophyll a and chlorophyll b increases in response to receiving more red and blue-violet light. Further, the rate of photosynthesis of chlorophyll a and chlorophyll b decreases in response to receiving less red and blue-violet light.

In the situation of FIG. 4a, input 110 provides signal $S_{Input1}$ to LED driver circuit 140. and LED driver circuit 140 provides signal $S_{Output1}$ to LED sub-array 120, wherein LED sub-array 120 includes LED 120a. In this particular example, LED 120a is an LED that emits violet light 161 when activated. As shown in FIG. 4a, violet tight 161 has a Gaussian wavelength spectrum 183a between about 400 nm and 450 nm. In some examples, violet light 161 has a Gaussian wavelength spectrum 183a between about 380 nm and 425 nm. In some examples, violet light 161 has a Gaussian wavelength spectrum 183a between about 425 nm and 450 nm.

Further, in this situation, input 111 provides signal $S_{Input2}$ to LED driver circuit 141, and LED driver circuit 141 provides signal $S_{Output2}$ to LED sub-array 121, wherein LED sub-array 121 includes LED 121a. In this particular example, LED 121a is an LED that emits red light 166 when activated. As shown in FIG. 4a, red light 166 has a Gaussian wavelength spectrum 183b between about 650 nm and 675 nm. In this way, lighting system 100a is capable of providing a wavelength spectrum which corresponds to the action spectrum of chlorophyll a when lighting system 100a includes LEDs capable of emitting violet light 161 and red light 166.

As mentioned above, the intensity of the light provided by the different types of LEDs of lighting system 100a are adjustable relative to each other. In one embodiment, inputs 110 and 111 correspond to switches so that the intensity of violet light 161 provided by LED sub-array 120 is adjusted by adjusting the number of LEDs 120a. Further, the intensity of red light 166 provided by LED sub-array 121 is adjusted by adjusting the number of LEDs 121a.

In another embodiment, input 110 includes potentiometer 137a, so that the intensity of violet light 161 provided by LED sub-array 120 is adjusted by adjusting potentiometer 137a, as described in more detail above. Further, input 111 includes potentiometer 137b, so that the intensity of red light 166 provided by LED sub-array 121 is adjusted by adjusting potentiometer 137b, as described in more detail above. It should be noted that the relative intensities of violet light 161 and red light 166 can be adjusted relative to each other in response to adjusting potentiometers 136a and 136b. In some situations, the intensity of red light 166 is about ten to about fifteen times greater than the intensity of violet light 161.

In the situation of FIG. 4b, input 110 provides signal $S_{Input1}$ to LED driver circuit 140, and LED driver circuit 140 provides signal $S_{Output1}$ to LED sub-array 120, wherein LED sub-array 120 includes LED 120a. In this particular example, LED 120a is an LED that emits blue-violet light 170 when activated. As shown in FIG. 4b, blue-violet light 170 has a Gaussian wavelength spectrum 184a between about 400 nm and 475 nm. In some examples, blue-violet light 170 has a Gaussian wavelength spectrum 184a between about 450 nm and 500 nm.

Further, in this situation, input 111 provides signal $S_{Input2}$ to LED driver circuit 141, and LED driver circuit 141 provides signal $S_{Output2}$ to LED sub-array 121, wherein LED sub-array 121 includes LED 121a. In this particular example, LED 121a is an LED that emits red light 166 when activated. As shown in FIG. 4b, red light 156 has a Gaussian wavelength spectrum 184b between about 625 nm and 675 nm. In this way, lighting system 100a is capable of providing a wavelength spectrum which corresponds to the action spectrum of chlorophyll b when lighting system 100a includes LEDs capable of emitting blue-violet light 170 and red light 166.

As mentioned above, the intensity of the light provided by the different types of LEDs of lighting system 100a are adjustable relative to each other. In one embodiment, inputs 110 and 111 correspond to switches so that the intensity of blue-violet light 170 provided by LED sub-array 120 is adjusted by adjusting the number of LEDs 120a. Further, the intensity of red light 166 provided by LED sub-array 121 is adjusted by adjusting the number of LEDs 121a.

In another embodiment, input 110 includes potentiometer 137a, so that the intensity of blue-violet light 170 provided by LED sub-array 120 is adjusted by adjusting potentiometer 137a, as described. in more detail above. Further, input 111 includes potentiometer 137b, so that the intensity of red light 166 provided by LED sub-array 121 is adjusted by adjusting potentiometer 137b, as described in more detail above. It should be noted that the relative intensities of blue-violet light 170 and red light 166 can be adjusted relative to each other in response to adjusting potentiometers 136a and 136b.

In general, the types of LEDs of lighting system 100a are chosen so that lighting system 100a can provide a wavelength spectrum which drives the physiological activity of a desired type of plant. Hence, lighting system 100a can provide wavelength spectra useful for plants which have action spectrum different from chlorophyll a and chlorophyll b, as will be discussed in more detail presently.

FIGS. 4c and 4d are graphs of wavelength spectrum 185 and 186, respectively, of light provided by lighting system 100a. Action spectrum corresponding to α-carotene are also shown in FIGS. 4c and 4d. FIGS. 4e and 4f are graphs of wavelength spectrum 187 and 188, respectively, of light provided by lighting system 100a. Action spectrum corresponding to β-carotene are also shown in FIGS. 4e and 4f. In FIGS. 4c, 4d, 4e and 4f, the wavelength spectrums correspond to the intensity of light versus wavelength (nm), as discussed above with wavelength spectrum 180.

The physiological activity of α-carotene and β-carotene is effectively driven by wavelengths of blue-violet light. Hence, the action spectrum corresponding to α-carotene and β-carotene are non-zero in a range of wavelengths that include blue and violet light. In this way, the rate of physiological activity of α-carotene and β-carotene increases in response to receiving more blue-violet light. Further, the rate of physiological activity of α-carotene and β-carotene decreases in response to receiving less blue-violet light.

In the situation of FIG. 4c, input 110 provides signal $S_{Input1}$ to LED driver circuit 140, and LED driver circuit 140 provides signal $S_{Output1}$ to LED sub-array 120, wherein LED sub-array 120 includes LED 120a. In this particular example, LED 120a is an LED that emits violet light 161 when activated. As shown in FIG. 4c, violet light 161 has a Gaussian wavelength spectrum 185a between about 400 nm and 450 nm.

Further, in this situation, input 111 provides signal $S_{Input2}$ to LED driver circuit 141, and LED driver circuit 141 provides signal $S_{Output2}$ to LED sub-array 121, wherein LED sub-array 121 includes LED 121a. In this particular example, LED 121a is an LED that emits blue light 162 when activated. As shown in FIG. 4c, blue light 162 has a Gaussian wavelength spectrum 185b between about 425 nm and 475 nm. in this way, lighting system 100a is capable of providing a wavelength spectrum which corresponds to the action spectrum of α-carotene when lighting system 100a includes LEDs capable of emitting violet light 161 and blue light 162.

As mentioned above, the intensity of the light provided by the different types of LEDs of lighting system 100a are adjustable relative to each other. In one embodiment, inputs 110 and 111 correspond to switches so that the intensity of violet light 161 provided by LED sub-array 120 is adjusted by adjusting the number of LEDs 120a. Further, the intensity of blue light 162 provided by LED sub-array 121 is adjusted by adjusting the number of LEDs 121a.

In another embodiment, input 110 includes potentiometer 137a, so that the intensity of violet light 161 provided by LED sub-array 120 is adjusted by adjusting potentiometer 137a, as described in more detail above. Further, input 111 includes potentiometer 137b, so that the intensity of blue light 162 provided by LED sub-array 121 is adjusted by adjusting potentiometer 137b, as described in more detail above. It should be noted that the relative intensities of violet light 161 and blue light 162 can be adjusted relative to each other in response to adjusting potentiometers 136a and 136b. It should also be noted that the physiological activity of α-carotene can be driven in response to the light from one type of LED, as will be discussed in more detail presently.

In the situation of FIG. 4d, input 110 provides signal $S_{Input1}$ to LED driver circuit 140, and LED driver circuit 140 provides signal $S_{Output1}$ to LED sub-array 120, wherein LED sub-array 120 includes LED 120a. In this particular example, LED 120a is an LED that emits blue-violet light 170 when activated. As shown in FIG. 4d, blue-violet light 170 has a Gaussian wavelength spectrum 186a between about 400 nm and 500 nm. In this way, LED 120a provides blue-violet light 170 which has a broader spectrum than the spectrum of violet light 161 FIG. 4e. Further, LED 120a provides blue-violet light 170 which has a broader spectrum than the spectrum of blue light 162 FIG. 4c. As mentioned above, the wavelength distribution of light provided by an LED can be made broader and narrower in many different ways, such as by choosing the semiconductor material composition of the LED.

Further, in this situation, input 111 provides input signal $S_{Input2}$ to LED driver circuit 141, and LED driver circuit 141 provides output signal $S_{Output2}$ to LED sub-array 121, wherein LED sub-array 121 includes LED 121a. In this particular example, LED 121a is deactivated in response to receiving output signal $S_{Output2}$. In this way, the physiological activity of n-carotene is driven in response to the light from one type of LED.

In one embodiment, inputs 110 and 111 correspond to switches so that the intensity of blue-violet light 170 provided by LED sub-array 120 is adjusted by adjusting the number of LEDs 120a. Further, the intensity of blue light 162 provided by LED sub-array 121 is adjusted by deactivating LEDs 121a.

In another embodiment, input 110 includes potentiometer 137a, so that the intensity of blue-violet light 170 provided by LED sub-array 120 is adjusted by adjusting potentiometer 137a, as described, in more detail above. Further, input 111 includes potentiometer 137b, so that the intensity of blue light 162 provided by LED sub-array 121 is adjusted by adjusting potentiometer 137b so that output signal $S_{Output2}$ deactivates LEDs 121a.

In the situation of FIG. 4e, input 110 provides signal $S_{Input1}$ to LED driver circuit 140, and LED driver circuit 140 provides signal $S_{Output1}$ to LED sub-array 120, wherein LED sub-array 120 includes LED 120a. In this particular example, LED 120a is an LED that emits blue-violet light 170 when activated. As shown in FIG. 4e, blue-violet light 170 has a Gaussian wavelength spectrum 187a between about 425 nm and 475 nm.

Further, in this situation, input 111 provides signal $S_{Input2}$ to LED driver circuit 141, and LED driver circuit 141 provides signal $S_{Output2}$ to LED sub-array 121, wherein LED sub-array 121 includes LED 121a. In this particular example, LED 121a is an LED that emits blue light 162 when activated. As shown in FIG. 4e, blue light 162 has a Gaussian wavelength spectrum 187b between about 425 nm and 475 um. In this way, lighting system 100a is capable of providing a wavelength spectrum which corresponds to the action spectrum of β-carotene when lighting system 100a includes LEDs capable of emitting blue-violet light 170 and blue light 162.

As mentioned above, the intensity of the light provided by the different types of LEDs of lighting system 100a are adjustable relative to each other. In one embodiment, inputs 110 and 111 correspond to switches so that the intensity of blue-violet light 170 provided by LED sub-array 120 is adjusted by adjusting the number of LEDs 120a. Further, the intensity of blue light 162 provided by LED sub-array 121 is adjusted by adjusting the number of LEDs 121a.

In another embodiment, input 110 includes potentiometer 137a, so that the intensity of blue-violet light 170 provided by LED sub-array 120 is adjusted by adjusting potentiometer 137a, as described in more detail above. Further, input 111 includes potentiometer 137b, so that the intensity of blue light 162 provided by LED sub-array 121 is adjusted by adjusting potentiometer 137b, as described in more detail above. It should be noted that the relative intensities of blue-violet light 170 and blue light 162 can be adjusted relative to each other in response to adjusting potentiometers 136a and 136b. It should also be noted that the physiological activity of β-carotene can be driven in response to the light from one type of LED, as will be discussed in more detail presently.

In the situation of FIG. 4f, input 110 provides signal $S_{Input1}$ to LED driver circuit 140, and LED driver circuit 140 provides signal $S_{Output1}$ to LED sub-array 120, wherein LED sub-array 120 includes LED 120a. In this particular example, LED 120a is an LED that emits blue-violet light 170 when activated. As shown in FIG. 4f, blue-violet light 170 has a Gaussian wavelength spectrum 188a between about 400 nm and 500 nm. In this way, LED 120a provides blue-violet light 170 which has a broader spectrum than the spectrum of violet light 161 FIG. 4e. Further, LED 120a provides blue-violet light 170 which has a broader spectrum than the spectrum of blue light 162 FIG. 4e. As mentioned above, the wavelength distribution of light provided by an LED can be made broader and narrower in many different ways, such as by choosing the semiconductor material composition of the LED.

Further, in this situation, input 111 provides input signal $S_{Input2}$ to LED driver circuit 141, and LED driver circuit 141 provides output signal $S_{Output}$ to LED sub-array 121, wherein LED sub-array 121 includes LED 121a. In this particular example, LED 121a is deactivated in response to receiving output signal $S_{Output2}$. In this way, the physiological activity β-carotene is driven in response to the light from one type of LED.

In one embodiment, inputs 110 and 111 correspond to switches so that the intensity of blue-violet light 170 provided by LED sub-array 120 is adjusted by adjusting the number of LEDs 120a. Further, the intensity of blue light 162 provided by LED sub-array 121 is adjusted by deactivating LEDs 121a.

In another embodiment, input 110 includes potentiometer 137a, so that the intensity of blue-violet light 170 provided by LED sub-array 120 is adjusted by adjusting potentiometer 137a, as described in more detail above. Further, input 111 includes potentiometer 137b, so that the intensity of light provided by LED sub-array 121 is adjusted by adjusting potentiometer 137b so that output signal $S_{Output2}$ deactivates LEDs 121a.

FIG. 4g is a graph of wavelength spectrum 189 of light provided by lighting system 100a. Action spectrum corresponding to pelargonin (Perlargonidin-3,5-diglucoside) is also shown in FIG. 4g. In FIG. 4g, wavelength spectrum 189 corresponds to the intensity of light versus wavelength (nm), as discussed above with wavelength spectrum 180.

In the situation of FIG. 4g, input 110 provides signal $S_{Input1}$ to LED driver circuit 140, and LED driver circuit 140 provides signal $S_{Output1}$ to LED sub-array 120 wherein LED sub-array 120 includes LED 120a. in this particular example, LED 120a is an LED that emits blue-green light 171 when activated. As shown in FIG. 4g, blue-green light 171 has a Gaussian wavelength spectrum 189a between about 450 nm and 550 nm. In this way, LED 120a provides blue-green light 171 which has a broader spectrum than the spectrum of blue light 162 FIG. 4e. As mentioned above, the wavelength distribution of light provided by an LED can be made broader and narrower in many different ways, such as by choosing the semiconductor material composition of the LED.

Further, in this situation, input 111 provides input signal $S_{Input2}$ to LED driver circuit 141, and. LED driver circuit 141 provides output signal $S_{Output2}$ to LED sub-array 121, wherein LED sub-array 121 includes LED 121a. In this particular example, LED 121a is deactivated in response to receiving output signal $S_{Output2}$. In this way, the physiological activity of pelargonin is driven in response to the light from one type of LED.

In one embodiment, inputs 110 and 111 correspond to switches so that the intensity of blue-green light 171 provided by LED sub-array 120 is adjusted by adjusting the number of LEDs 120a. Further, the intensity of blue-green light 171 provided by LED sub-array 121 is adjusted by deactivating LEDs 121a.

In another embodiment, input 110 includes potentiometer 137a, so that the intensity of light provided by LED sub-array 120 is adjusted by adjusting potentiometer 137a, as described in more detail above. Further, input 111 includes potentiometer 137b, so that the intensity of light provided by LED sub-array 121 is adjusted by adjusting potentiometer 137b so that output signal $S_{Output2}$ deactivates LEDs 121a.

It should be noted that the broadness of the wavelength spectra of blue-green light 171 can be chosen by choosing the semiconductor material of LEDs 120a, as discussed above with FIG. 4f. Further, it should be noted that, in some embodiments, LEDs 121a emit green light 163 and are activated so that green light 163 is mixed with blue-green light 171. In this way, wavelength spectrum 189 corresponds to the wavelength spectra of two different types of LEDs, as discussed above with FIG. 4e.

FIG. 4h is a graph of wavelength spectrum 190 of light provided by lighting system 100a. Action spectrum corresponding to phycocyanin is also shown in FIG. 4h. In FIG. 4h, wavelength spectrum 190 corresponds to the intensity of light versus wavelength (nm), as discussed above with wavelength spectrum 180.

In the situation of FIG. 4h, input 110 provides signal $S_{Input1}$ to LED driver circuit 140, and LED driver circuit 140 provides signal $S_{Output1}$ to LED sub-array 120, wherein LED sub-array 120 includes LED 120a. In this particular example, LED 120a is an LED that emits yellow-orange light 172 when activated. As shown in FIG. 4h, yellow-orange light 172 has a Gaussian wavelength spectrum 189a between about 575 nm and 625 nm.

Further, in this situation, input 111 provides input signal $S_{Input2}$ to LED drives circuit 141, and LED driver circuit 141 provides output signal $S_{Output2}$ to LED sub-array 121, wherein LED sub-array 121 includes LED 121a. In this particular example, LED 121a is deactivated in response to receiving output signal $S_{Output2}$. In this way, the physiological activity of pelargonin is driven in response to the light from one type of LED.

In one embodiment, inputs 110 and 111 correspond to switches so that the intensity of yellow-orange light 172 provided by LED sub-array 120 is adjusted by adjusting the number of LEDs 120a. Further, the intensity of yellow-orange light 172 provided by LED sub-array 121 is adjusted by deactivating LEDs 121a.

In another embodiment, input 110 includes potentiometer 137a, so that the intensity of yellow-orange light 172 provided, by LED sub-array 120 is adjusted by adjusting potentiometer 137a, as described in more detail above. Further, input 111 includes potentiometer 137b, so that the intensity of light provided by LED sub-array 121 is adjusted by adjusting potentiometer 137b so that output signal $S_{Output2}$ deactivates LEDs 121a. It should be noted that the broadness of the wavelength spectra of yellow-orange light 172 can be chosen by choosing the semiconductor material of LEDs 120a, as discussed above with FIG. 4f.

FIG. 4i is a graph of wavelength spectrum 191 of light provided by lighting system 100a. Action spectrum corresponding to phycoerythrin is also shown in FIG. 4i. In FIG. 4i, wavelength spectrum 191 corresponds to the intensity of light versus wavelength (nm), as discussed above with wavelength spectrum 180.

In the situation of FIG. 4i, input 110 provides signal $S_{Input1}$ to LED driver Circuit 140, and LED driver circuit 140 provides signal $S_{Output1}$ to LED sub-array 120, wherein LED sub-array 120 includes LED 120a. In this particular example, LED 120a is an LED that emits blue-green light 171 when activated. As shown in FIG. 4i, blue-green light 171 has a Gaussian wavelength spectrum 181a between about 475 nm and 550 nm.

Further, in this situation, input 111 provides input signal $S_{Input2}$ to LED driver circuit 141, and LED driver circuit 141 provides output signal $S_{Output2}$ to LED sub-array 121, wherein LED sub-array 121 includes LED 121a. In this particular example. LED 121a emits green light 163 when activated. As shown in FIG. 4i, green light 163 has a Gaussian wavelength spectrum 191b between about 500 nm and 575 nm. In this way, the physiological activity of phycoerythrin is driven in response to the light from two types of LEDs.

In one embodiment, inputs 110 and 111 correspond to switches so that the intensity of blue-green light 171 provided by LED sub-array 120 is adjusted by adjusting the number of LEDs 120a. Further, the intensity of green light 163 provided by LED sub-array 121 is adjusted by adjusting the number of LEDs 121a.

In another embodiment, input 110 includes potentiometer 137a, so that the intensity of blue-green light 171 provided by LED sub-array 120 is adjusted by adjusting potentiometer 137a, as described in more detail above. Further, input 111 includes potentiometer 137b, so that the intensity of green light 163 provided by LED sub-array 121 is adjusted by adjusting potentiometer 137b, as described in more detail above. It should be noted that the broadness of the wavelength spectra of blue-green light 171 and/or green light 163 can be chosen by choosing the semiconductor material of LEDs 120a and 121a, respectively, as discussed in more detail above.

As mentioned above, the lighting system can include one or more LED sub-arrays, which include different types of LEDs. As will be discussed in more detail below, the type of LEDs of the sub-arrays can be chosen so that the lighting system can provide a desired wavelength spectrum between UV light and IR light, which is useful to drive the physiological activity of a plant. It should be noted that adjusting the intensity of red and blue light is believed to affect the physiological activity of the plant. One useful light spectrum ratio is to have about ninety-five percent (95%) rod light and about five percent (5%) blue light. It is believed that the morphology of the plant changes in response to changing the ratio of red light and blue light. For example, the plant grows to be more compact in response to reducing the percentage of red light and increasing the percentage of blue light. One useful light spectrum ratio to grow a compact plant is to have about eighty percent (80%) red light and about twenty percent (20%) blue light. Adjusting the ratio of red light and blue light can produce an effect similar to that produced by plant growth regulators (PGR's) without the actual application of the PGR's. PGR's are hormones, and it is undesirable by some people to have hormones in plants because of certain perceived risks associated with human health.

FIGS. 5a and 5b are bottom and top perspective views, respectively, of a lighting system 100b. In this embodiment, lighting system 100b includes inputs 110, 111, 112, 113 and 114 (FIG. 5b) operatively coupled to LED arrays 102 and 103 through LED controller 130 (not shown). As discussed in more detail below, LED arrays 102 and 103 each include LED sub-arrays connected to inputs 110-114. The LED sub-arrays of LED arrays 102 and 103 each include a plurality of LEDs, as will be discussed in more detail with FIGS. 5f and 5g. The LEDs of arrays 102 and 103 can be of many different types, such as those mentioned above.

LED arrays 102 and 103 are spaced apart from each other by a distance L (FIG. 5b) so that lighting system 100b provides a desired intensity of light away from LED arrays 102 and 103. LED arrays 102 and 103 are spaced apart from each other by distance L so that lighting system 100b can be more effectively cooled, as will be discussed in more detail below. It should be noted that, in this embodiment, LED arrays 102 and 103 include the same number of LEDs. However, in other embodiments, LED arrays 102 and 103 can include different numbers of LEDs. For example, in one embodiment, LED array 102 includes twenty five LEDs and LED array 103 includes twenty six LEDs.

Figure 5D:
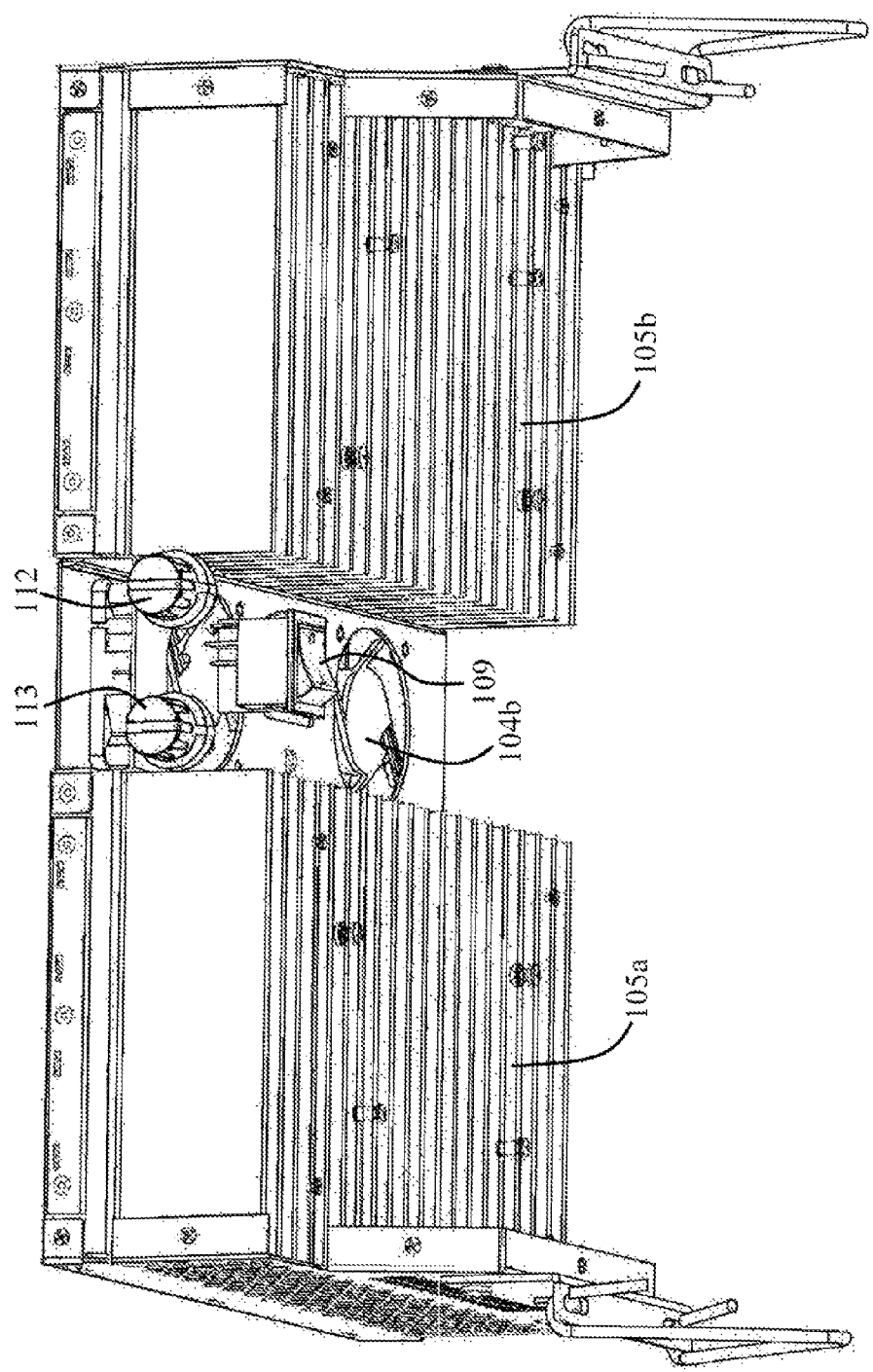

In this embodiment, lighting system 100b includes a lighting system housing 101 which houses LED arrays 102 and 103, and extends between housing sides 116a and 116b. FIGS. 5c and 5d are top and back perspective views of lighting system 100b with and without lighting system housing 101, respectively. FIG. 5e is a front perspective view of lighting system 100b without lighting system housing 101. In this embodiment, lighting system housing, 101 includes opposed walls 101a and 101b. Lighting system housing 101 includes an angled wall 101g, which extends from an edge of wall 101a. Lighting system 101 includes an angled wall 101b which extends from an edge of angled wall 101g. Lighting system 101 includes an angled wall 101e which extends from an edge of wall 101f. Lighting system 101 includes an angled wall 101d which extends from an edge of angled wall 101e. Lighting system 101 includes a back wall 101c which extends from edges of angled walls 101b and 101d.

As shown in FIGS. 5c and 5d, lighting system 100b includes an on/off switch 109 operatively coupled with LED controller 130. On/off switch 109 is for turning LED controller 130 on and off. In this embodiment, on/off switch 109 extends through angled wall 101e, as shown in FIG. 5b.

As shown in FIGS. 5a, 5b, 5d and 5c, lighting system 100b includes fans 104a and 104b which provide cooling. For example, fans 104a and 104b can cool LED controller 130 (not shown) and LED arrays 102 and 103. Fans 104a and 104b can be positioned at many different locations of lighting system 100b. In this embodiment, fans 104a and 104b are positioned between LED arrays 102 and 103.

As shown in FIGS. 5d and 5e, lighting system 100 includes a heatsinks 105a and 105b which provide cooling for LED arrays 102 and 103, respectively. Heatsinks 105a and 105b also provide cooling for LED controller 130. As mentioned above, LED arrays 102 and 103 are spaced apart from each other by distance L, which allows LED arrays 102 and 103 to be more effectively cooled by fans 104a and 104b, and, corresponding heatsinks 105a and 105b.

Figure 5F:
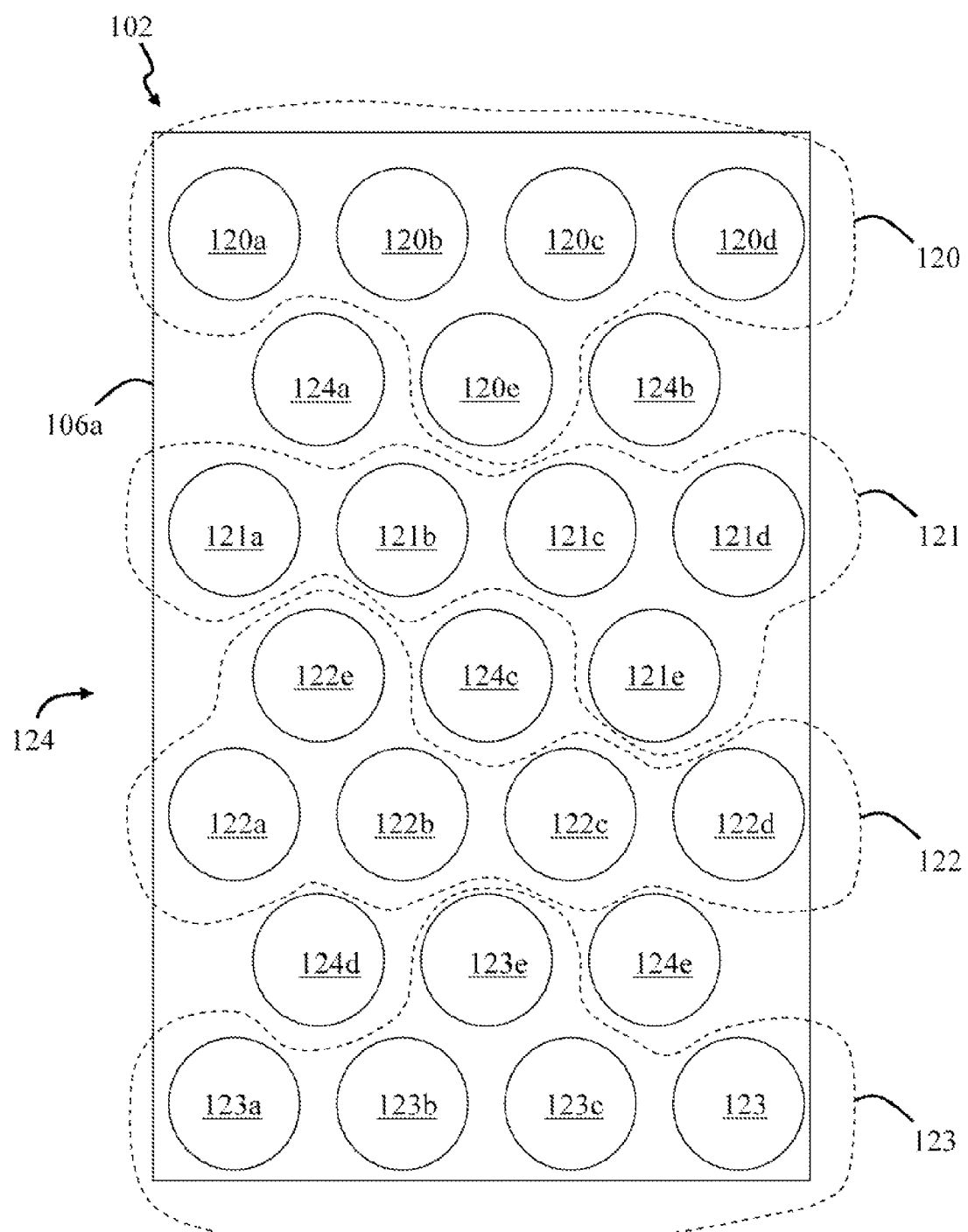
FIG. 5f is a front view of a first LED array of the lighting system of FIGS. 5a and 5b, wherein the first LED array includes five LED sub-arrays carried by an LED array support structure.

FIG. 5f is a front view of LED array 102 of lighting system 100b, wherein LED array 102 includes LED sub-arrays 120, 121, 122, 123 and 124 carried by LED array support structure 106a. LED array 102 generally includes one or more LED sub-arrays, but it includes five LED sub-arrays in this embodiment for illustrative purposes. An embodiment in which LED array 102 includes two LED sub-arrays is discussed in more detail above.

In this embodiment, LED sub-arrays 120, 121 122, 123 and 124 each include five LEDs for illustrative purposes so that LED array 102 includes twenty five LEDs. However, as discussed in more detail above with FIG. 1c, LED array 102 includes two or more sub-arrays LEDs, and the LED sub-arrays generally include one or more LEDs.

In this embodiment, LED sub-array 120 includes LEDs 120a, 120b, 120c, 120d and 120e, and LED sub-array 121 includes LEDs 121a, 121b, 121c, 121d and 121e. LED sub-array 122 includes LEDs 122a, 12b, 122c, 122d and 122e, and LED sub-array 123 includes LEDs 123a, 123b, 123c, 123d and 123e. Further, LED sub-array 124 includes LEDs 124a, 124b, 124c, 124d and 124e. The light emitting diodes included with LED array 102 can emit many different colors of light in response to output signals received from LED controller 130, as will be discussed in more detail below with FIGS. 9a-9f.

Figure 5G:
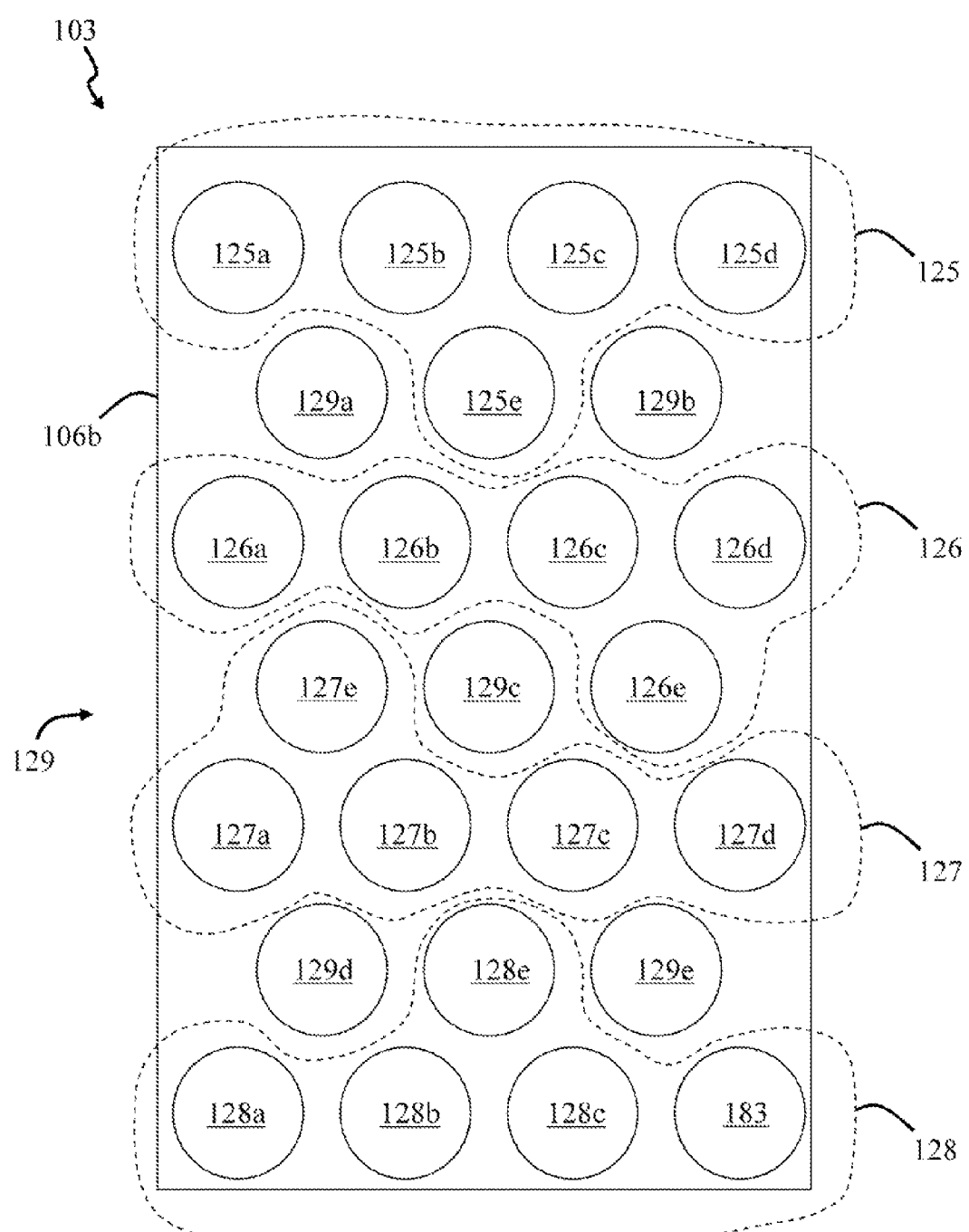
FIG. 5g is a front view of a second LED array of the lighting system of FIGS. 5a and 5b, wherein the second LED array includes five LED sub-arrays carried by an LED array support structure.

FIG. 5g is a front view of LED array 103 of lighting system 100b, wherein LED array 103 includes LED sub-arrays 125, 126, 127, 128 and 129 carried by LED array support structure 106b. LED array 103 generally includes one or more LED sub-arrays, but it includes five LED sub-arrays in this embodiment for illustrative purposes. An embodiment in which LED array 103 includes two LED sub-arrays is discussed in more detail above.

In this embodiment, LED sub-arrays 125, 126, 127, 128 and 129 each include five LEDs for illustrative purposes so that LED array 103 includes twenty five LEDs. However, as discussed in more detail above with FIG. 1c, LED array 103 includes two or more LEDs, and LED sub-arrays generally include one or more LEDs.

In this embodiment, LED sub-array 125 includes LEDs 125a, 125b, 125c, 125d and 125e, and LED sub-array 126 includes LEDs 126a, 126b, 126c, 126d and 126e. LED sub-array 127 includes LEDs 127a, 127b, 127c, 127d and 127e, and LED sub-array 128 includes LEDs 128a, 128b, 128c, 128d and 128e. Further, LED sub-array 129 includes LEDs 129a, 129b, 129c, 129d and 129e. The light emitting diodes included with LED array 103 can emit many different colors of light in response to output signals received from LED controller 130, as will be discussed in more detail below with FIGS. 9a-9f.

In this particular embodiment, LED sub-arrays 120 and 125 include LEDs which are capable of emitting UV light 160. Hence, LEDs 120a-120e and LEDs 125a-125e are capable of emitting UV light 160. In some embodiments, UV light 160 has a wavelength between about 300 and 380 nm. In other embodiments, IR light 167 has a wavelength between about 350 and 380 nm.

LED sub-arrays 121 and 126 include LEDs which are capable of emitting blue light 162. Hence, LEDs 121a-121e and LEDs 126a-126e are capable of emitting blue light 162. LED sub-arrays 122 and 127 include LEDs which are capable of emitting green light 163. Hence, LEDs 122a-122e and LEDs 127a-127e are capable of emitting green light 163. LED sub-arrays 123 and 128 include LEDs which are capable of emitting red light 166. Hence, LEDs 123a-123e and LEDs 128a-128e are capable of emitting red light 166. LED sub-arrays 124 and 129 include LEDs Which are capable of emitting IR light 167. Hence, LEDs 124a-124c and LEDs 129a-129e are capable of emitting IR light 167. In some embodiments, IR light 167 has a wavelength between about 750 and 825 nm. In other embodiments, light 167 has a wavelength between about 750 and 900 nm.

Figure 6B:
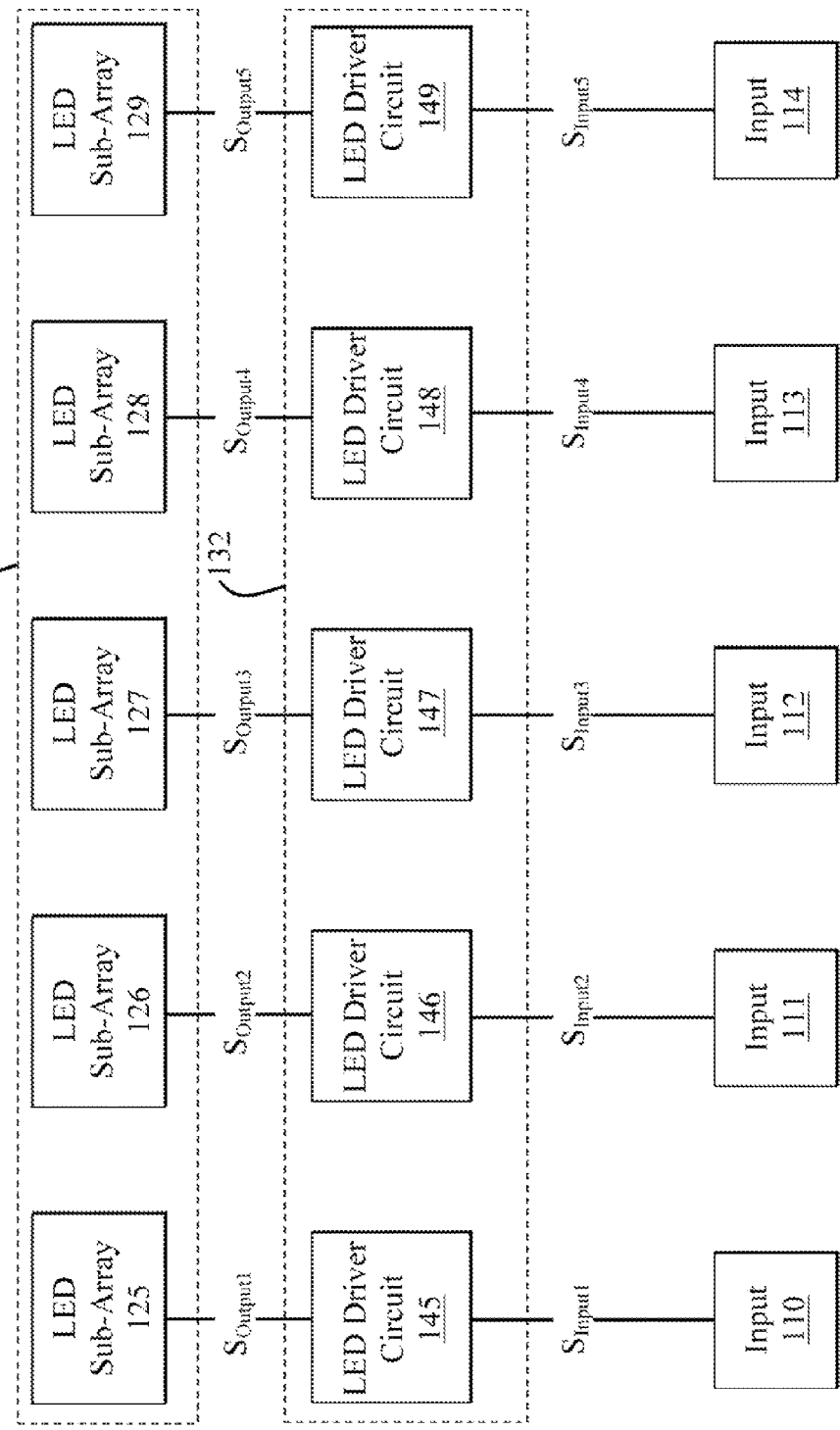

FIGS. 6a and 6b are block diagram of lighting system 100b, which includes inputs 110-114 operatively coupled to LED arrays 102 and 103 through LED controller 130, wherein LED controller 130 includes LED sub-controllers 131 and 132. In this embodiment, and as shown in FIG. 6a, LED sub-controller 131 is operatively coupled to inputs 110, 111, 112, 113 and 114, as well as to LED array 102. In this embodiment, LED sub-controller 131 includes LED driver circuits 140, 141, 142, 143 and 144 operatively coupled to LED sub-arrays 120, 121, 122, 123 and 124, respectively. Further, inputs 110, 111, 112, 113 and 114 are operatively coupled with LED driver circuits 140, 141, 142, 143 and 144, respectively.

In operation, input 110 provides input signal $S_{Input1}$ to LED driver circuit 140 and, in response, LED driver circuit 140 provides output signal $S_{Output1}$ to LED sub-array 120, Further, input 111 provides input signal $S_{Input2}$ to LED driver circuit 141 and, in response, LED driver circuit 141 provides output signal $S_{Output2}$ to LED sub-array 121. Input 112 provides an input signal $S_{Input3}$ to LED driver circuit 141 and, in response, LED driver circuit 141 provides an output signal $S_{Output3}$ to LED sub-array 122. Input 113 provides an input signal $S_{Input4}$ to LED driver circuit 141 and, in response, LED driver circuit 141 provides an output signal $S_{Output4}$ to LED sub-array 123. Input 114 provides an input signal $S_{Input5}$ to LED driver circuit 141 and, in response, LED driver circuit 141 provides an output signal $S_{Output5}$ to LED sub-array 124. In this way, inputs 110-114 are operatively coupled to LED array 102 through LED sub-controller 131.

In this embodiment, and as shown in FIG. 6b, LED sub-controller 132 is operatively coupled to inputs 110, 111, 112, 113 and 114, as well as to LED array 103. In this embodiment, LED sub-controller 132 includes LED driver circuits 145, 146, 147, 148 and 149 operatively coupled to LED sub-arrays 125, 126, 127, 128 and 129, respectively. Further, inputs 110, 111, 112, 113 and 114 are operatively coupled with LED driver circuits 145, 146, 147, 148 and 149, respectively.

In operation, input 110 provides input signal $S_{Input1}$ to LED driver circuit 145 and, in response, LED driver circuit 145 provides output signal $S_{Output1}$ to LED sub-array 125. Further, input 111 provides input signal $S_{Input2}$ to LED driver circuit 146 and, in response, LED driver circuit 146 provides output signal $S_{Output2}$ to LED sub-array 126. Input 112 provides input signal $S_{Input3}$ to LED driver circuit 147 and, in response, LED driver circuit 147 provides output signal $S_{Output3}$ to LED sub-array 127. Input 113 provides input signal $S_{Input4}$ to LED driver circuit 148 and, in response, LED driver circuit 148 provides output signal $S_{Output4}$ to LED sub-array 128. Input 114 provides input signal $S_{Input5}$ to LED driver circuit 149 and, in response. LED driver circuit 149 provides output signal $S_{Output5}$ to LED sub-array 129. In this way, inputs 110-114 are operatively coupled to LED array 103 through LED sub-controller 132.

In some embodiments, inputs 110-114 each operate as a switch which is repeatably moveable between active and deactive conditions, as described in more detail above with FIGS. 1a, 1b and 1c. However, in this embodiment, inputs 110-114 include potentiometers, as will be discussed in more detail below.

Figure 7A:
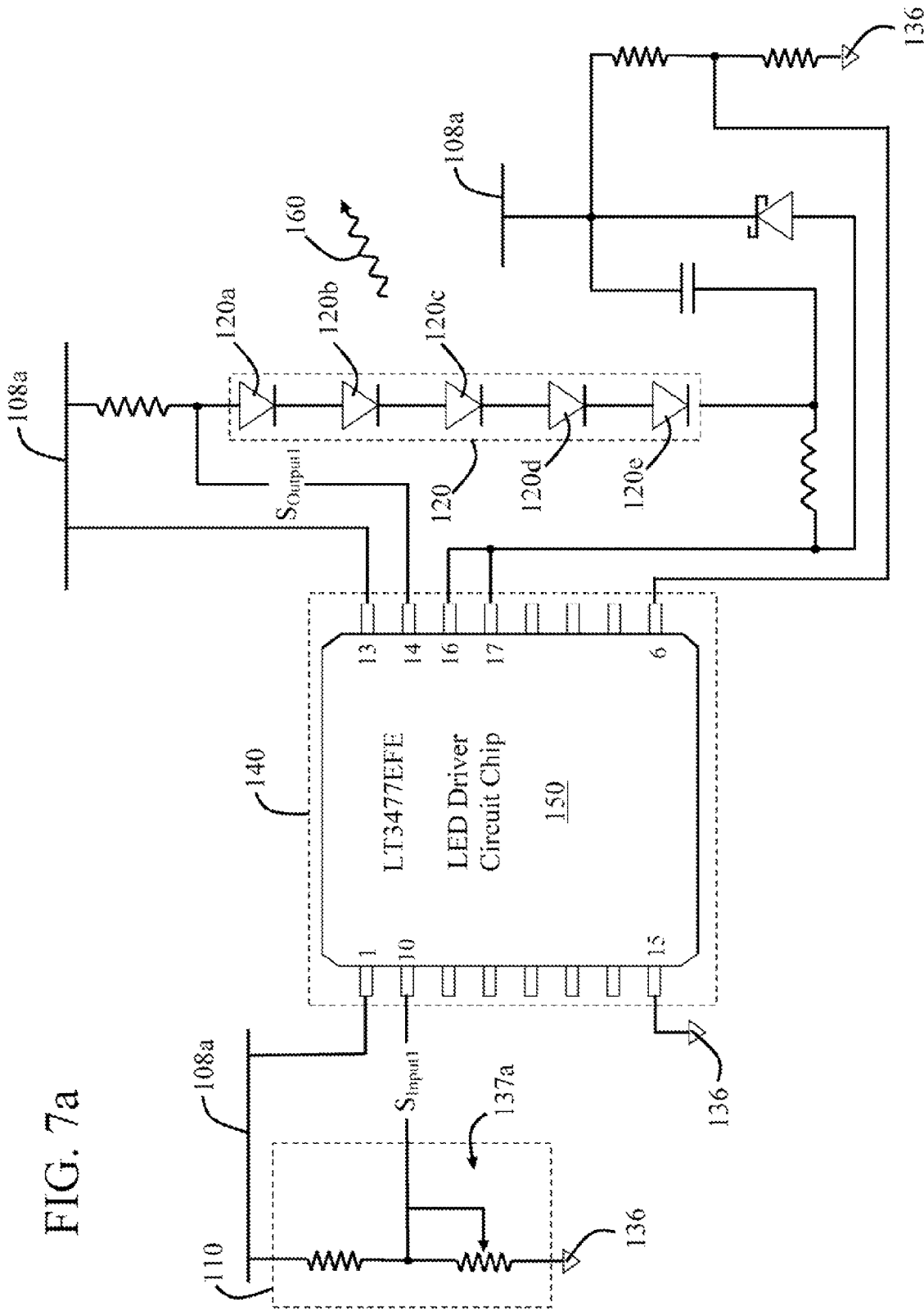
FIGS. 7a, 7b, 7c, 7d and 7e are schematic diagrams of the inputs of FIGS. 5a and 5b operatively coupled to the first LED sub-array through the first LED driver circuit, wherein the inputs operate as potentiometers.

FIG. 7a is a schematic diagram of input 110 operatively coupled to LED sub-array 120 through LED driver circuit 140, wherein input 110 operates as a potentiometer. In this embodiment, input 110 includes potentiometer 137a, which is connected between power terminal 108a and current return 136. The output of potentiometer 137a is connected to LED driver circuit 140, which includes LED driver circuit chip 150, so that LED driver circuit 140 receives input signal $S_{Input1}$. LED driver circuit chip 150 provides output signal $S_{Output1}$ to LED sub-array 120 (FIG. 6a) in response to receiving input signal $S_{Input1}$ from input 110. In particular, LED driver circuit chip 150 provides output signal $S_{Output3}$ to LEDs 120a-120e. LEDs 120a-120e emit UV light 160 in response to being activated by output signal $S_{Output1}$. Further, LEDs 120a-120e do not emit UV light 160 in response to being deactivated by output signal $S_{Output1}$.

It should be noted that more information regarding LED driver circuits and LED driver circuit chips, as well as the connections of the components of lighting system 100a, is provided in more detail above with the discussion of FIGS. 1a, 1b and 1c, as well as with the discussion of FIGS. 2a and 2b.

Figure 7B:
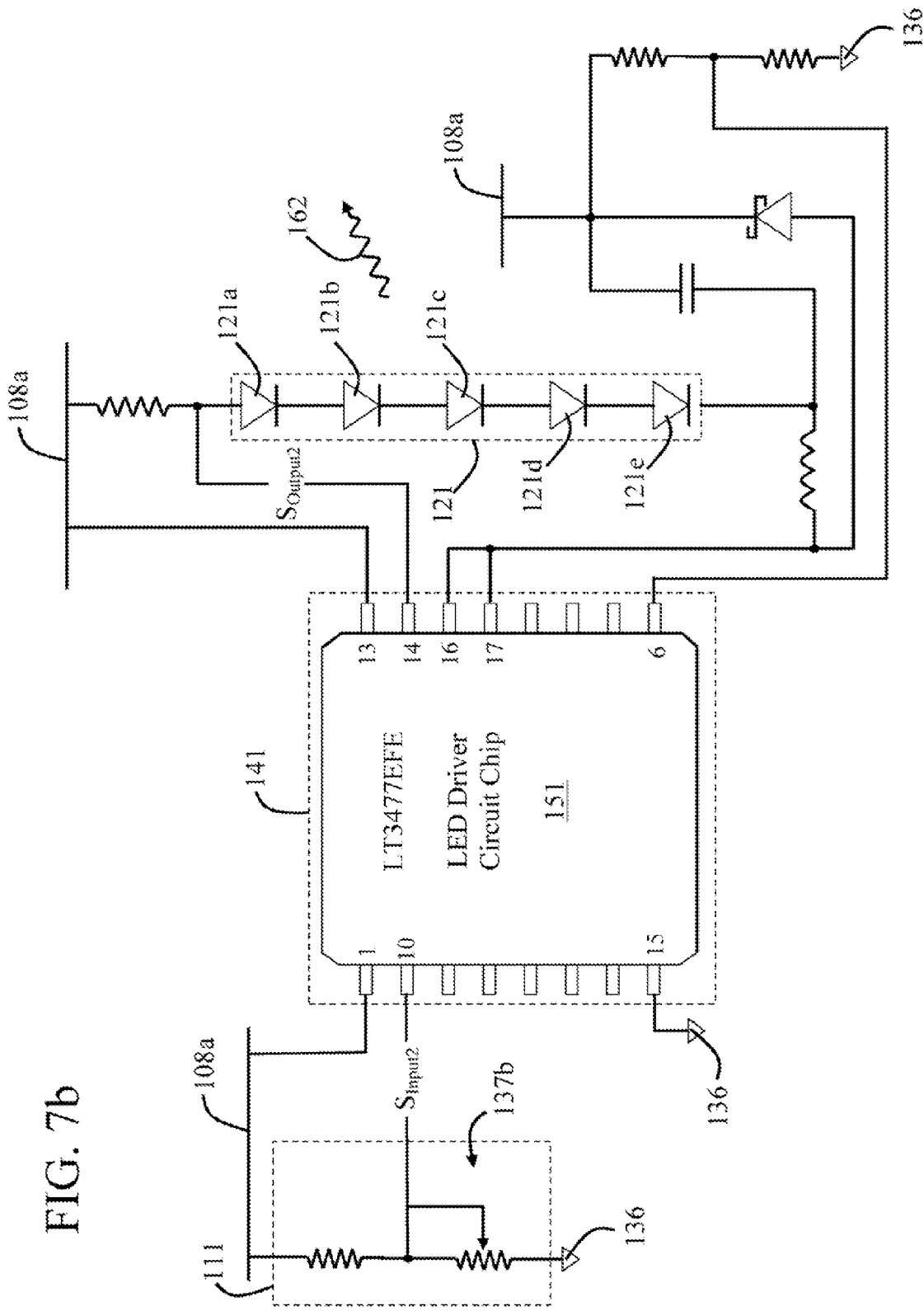

FIG. 7b is a schematic diagram of input 111 operatively coupled to LED sub-array 121 through LED driver circuit 141, wherein input 111 operates as a potentiometer. In this embodiment, input 111 includes potentiometer 137b, which is connected between power terminal 108a and current return 136. The output of potentiometer 137b is connected to LED driver circuit 141, which includes LED driver circuit chip 151, so that LED driver circuit 141 receives input signal $S_{Input2}$. LED driver circuit chip 151 provides output signal $S_{Output2}$ to LED sub-array 121 (FIG. 6a) in response to receiving input signal $S_{Input2}$ from input 111. In particular, LED driver circuit chip 151 provides output signal $S_{Output2}$ to LEDs 121a-121e. LEDs 121a-121e emit blue light 162 in response to being activated by output signal $S_{Output2}$. Further, LEDs 121a-121e do not emit blue light 162 in response to being deactivated by output signal $S_{Output2}$.

Figure 7C:
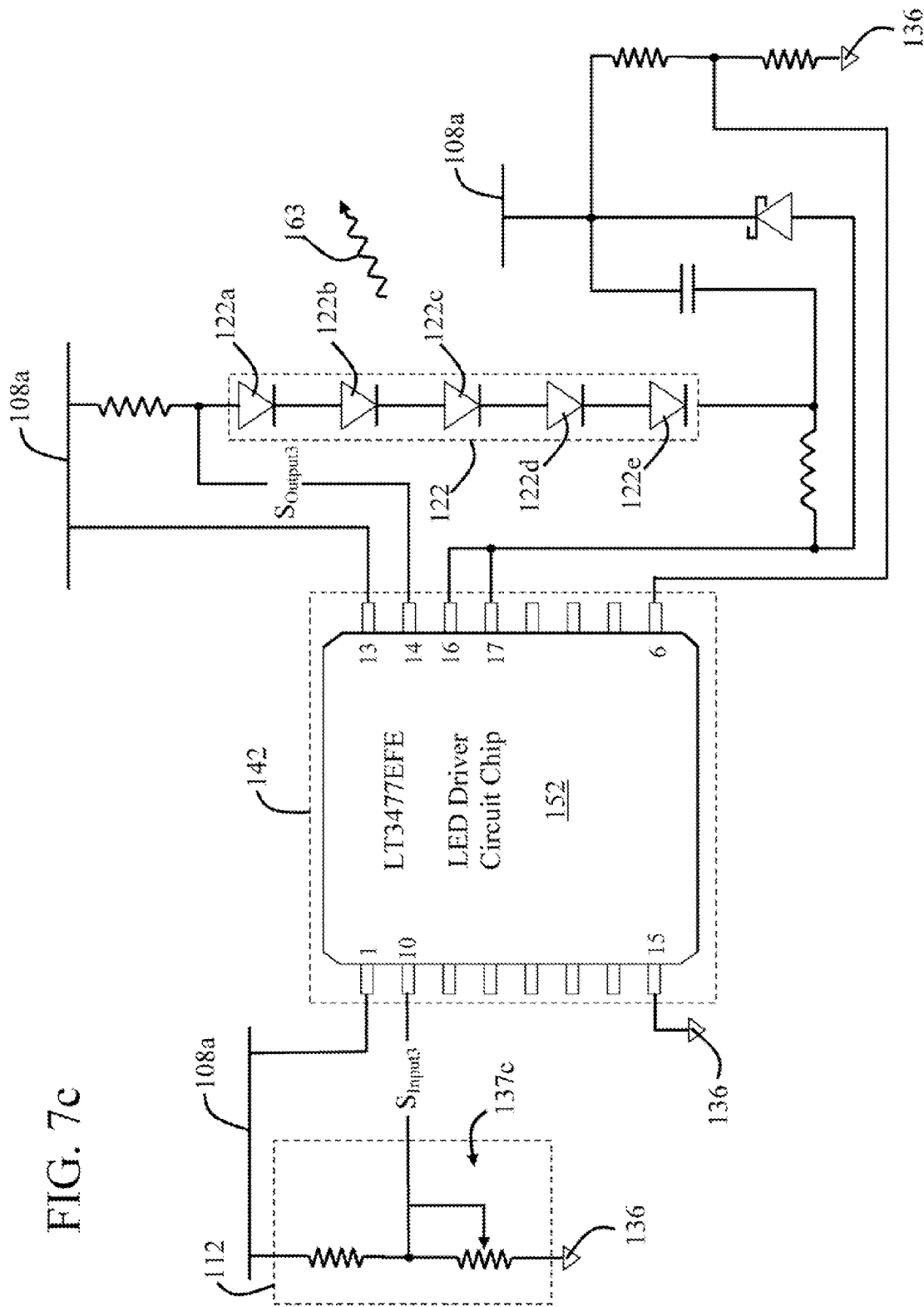

FIG. 7c is a schematic diagram of input 112 operatively coupled to LED sub-array 122 through LED driver circuit 142, wherein input 112 operates as a potentiometer. In this embodiment, input 112 includes a potentiometer 137c, which is connected between power terminal 108a and current return 136. The output of potentiometer 137c is connected to LED driver circuit 142, which includes an LED driver circuit chip 152, so that LED driver circuit 142 receives input signal $S_{Input3}$. LED driver circuit chip 152 provides output signal $S_{Output3}$ to LED sub-array 122 (FIG. 6a) in response to receiving input signal $S_{Input3}$ from input 112. In particular, LED driver circuit chip 152 provides output signal $S_{Output3}$ to LEDs 122a-122c. LEDs 122a-122e emit green light 163 in response to being activated by output signal $S_{Output3}$. Further, LEDs 122a-122e do not emit green light 163 in response to being deactivated by signal $S_{Output3}$.

Figure 7D:
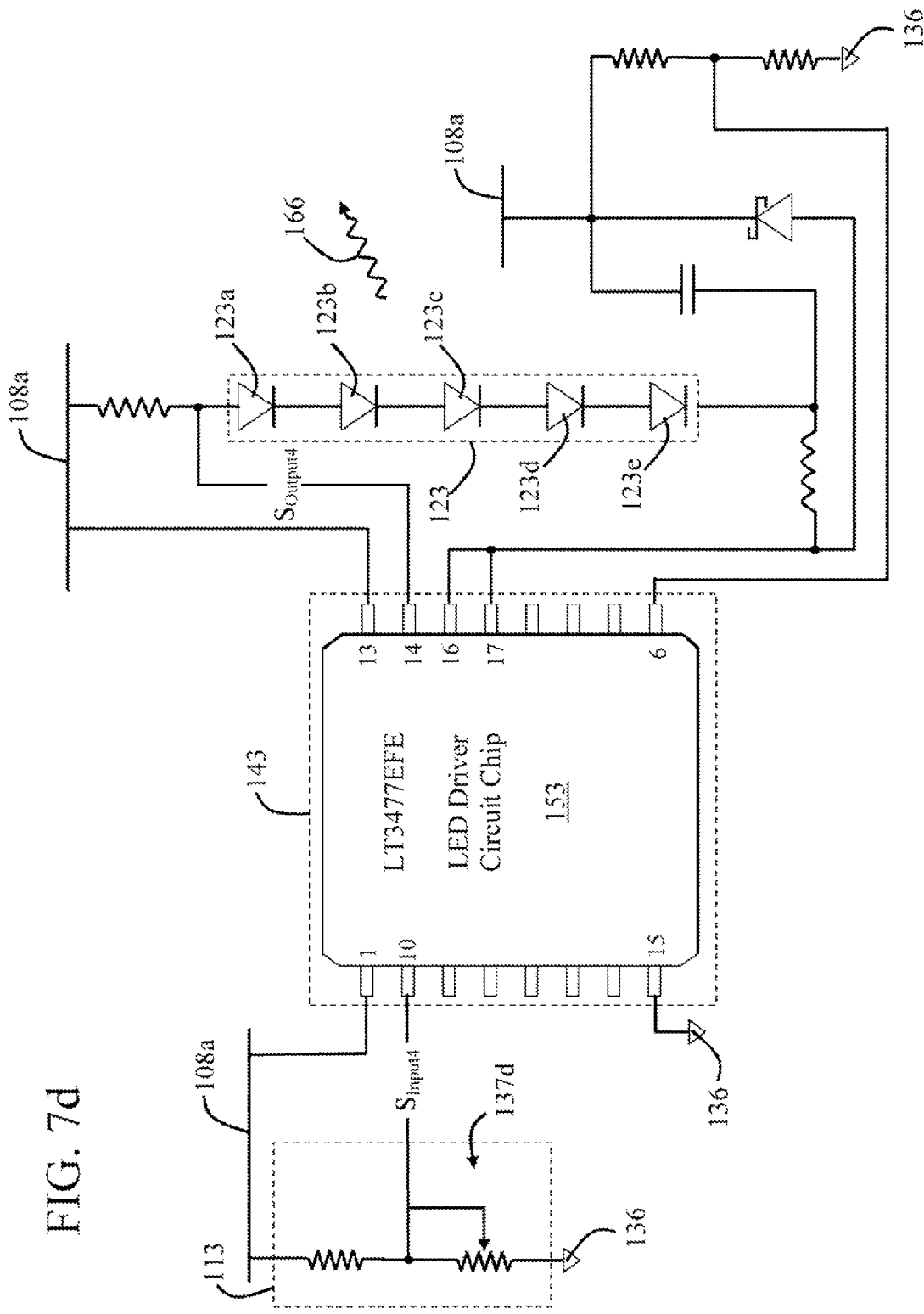

FIG. 7d is a schematic diagram of input 113 operatively coupled to LED sub-array 123 through LED driver circuit 143, wherein input 113 operates as a potentiometer. In this embodiment, input 113 includes a potentiometer 137d, which is connected between power terminal 108a and current return 136. The output of potentiometer 137d is connected to LED driver circuit 143, which includes an LED driver circuit chip 153, so that LED driver circuit 143 receives input signal $S_{Input4}$. LED driver circuit chip 153 provides output signal $S_{Output4}$ to LED sub-array 123 (FIG. 6a) in response to receiving input signal $S_{Input4}$ from input 113. In particular, LED driver circuit chip 153 provides output signal $S_{Output4}$ to LEDs 123a-123e. LEDs 123a-123e emit red light 166 in response to being activated by output signal $S_{Output4}$. Further LEDs 123a-123e do not emit red light 166 in response to being deactivated by output signal $S_{Output\,4}$.

Figure 7E:
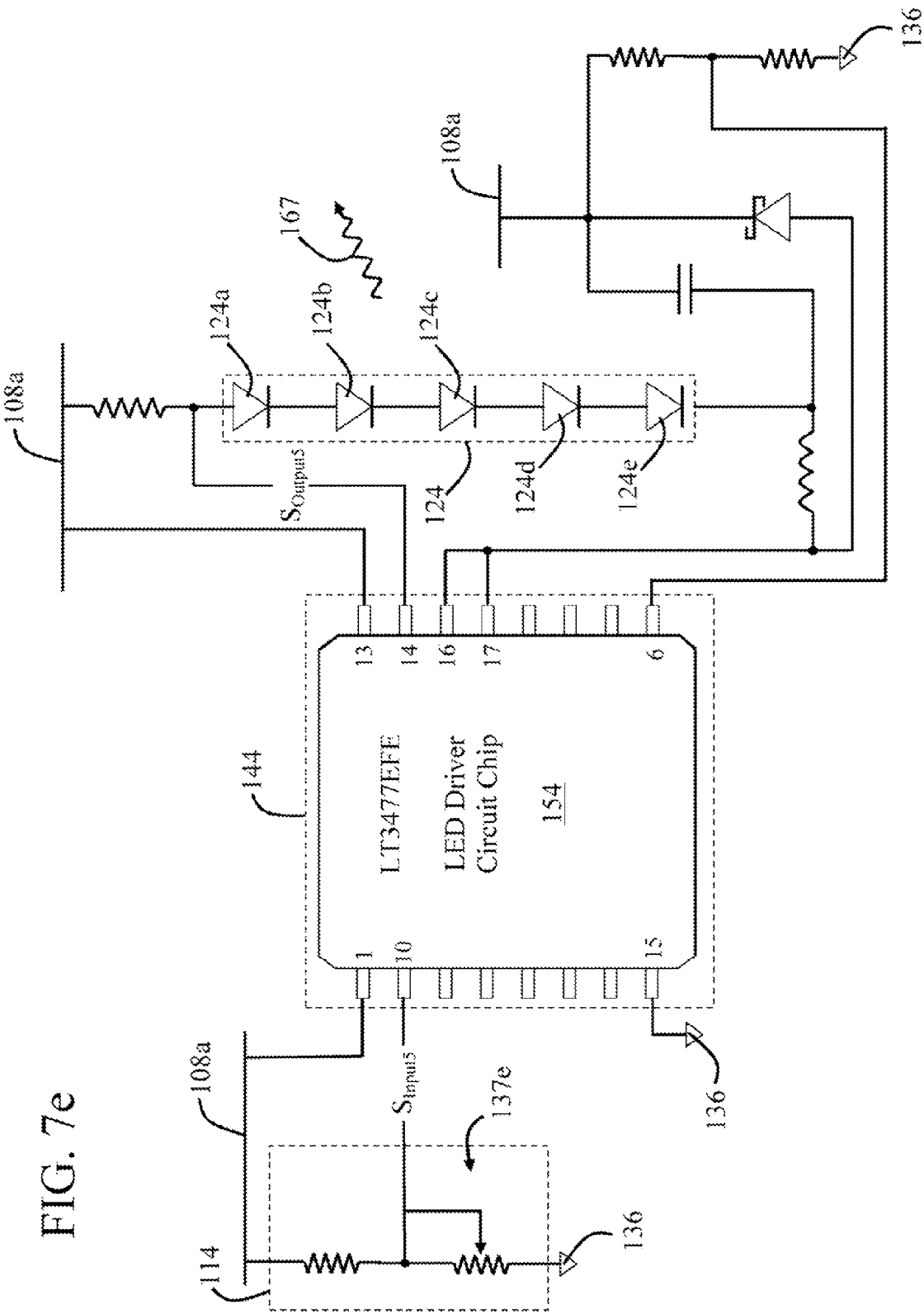

FIG. 7e is a schematic diagram of input 114 operatively coupled to LED sub-array 124 through LED driver circuit 144, wherein input 114 operates as a potentiometer. In this embodiment, input 114 includes a potentiometer 137e, which is connected between power terminal 108a and current return 136. The output of potentiometer 137e is connected to LED driver circuit 144, which includes an LED driver circuit chip 154, so that LED driver circuit 144 receives input signal $S_{Input5}$. LED driver circuit chip 154 provides output signal $S_{Output5}$ to LED sub-array 124 (FIG. 6a) in response to receiving input signal $S_{Input5}$ from input 114. In particular, LED driver circuit chip 154 provides output signal $S_{Output5}$ to LEDs 124a-124e. LEDs 124a-124e emit IR light 167 in response to being activated by output signal $S_{Output5}$. Further, LEDs 124a-124e do not emit IR light 167 in response to being deactivated by output signal $S_{Output5}$.

FIG. 8a is a schematic diagram of input 110 operatively coupled to LED sub-array 125 through LED driver circuit 145. As mentioned above, input 110 includes potentiometer 137a, which is connected between power terminal 108a and current return 136. In this embodiment, the output of potentiometer 137a is connected to LED driver circuit 145, which includes an LED driver circuit chip 155, so that LED driver circuit 145 receives input signal $S_{Input1}$. LED driver circuit chip 155 provides output signal $S_{Output1}$ to LED sub-array 125 (FIG. 6b) in response to receiving input signal $S_{Input1}$ from input 110. In particular, LED driver circuit chip 155 provides output signal $S_{Output1}$ to LEDs 125a-125e. LEDs 125a-125e emit UV light 160 in response to being activated by output signal $S_{Output1}$. Further, LEDs 125a-125e do not emit UV light 160 in response to being deactivated by output signal $S_{Output3}$.

Figure 8B:
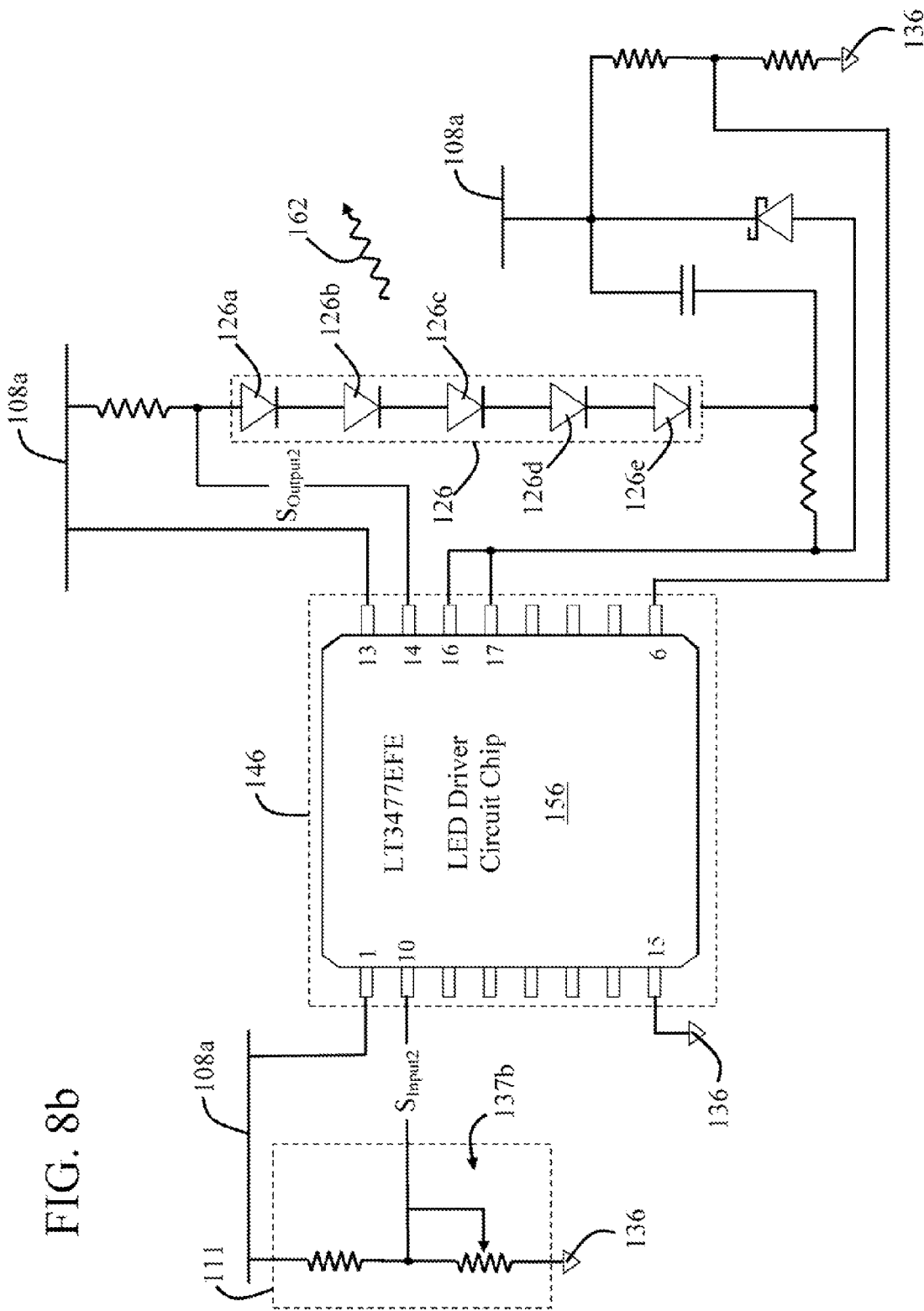

FIG. 8b is a schematic diagram of input 111 operatively coupled to LED sub-array 126 through LED driver circuit 146. As mentioned above, input 111 includes potentiometer 137b, which is connected between power terminal 108a and current return 136. In this embodiment, the output of potentiometer 137b is connected to LED driver circuit 146, which includes an LED driver circuit chip 156, so that LED driver circuit 146 receives input signal $S_{Input2}$. LED driver circuit chip 156 provides output signal $S_{Output2}$ to LED sub-array 126 (FIG. 6b) in response to receiving input signal $S_{Input2}$ from input 111. In particular, LED driver circuit chip 156 provides output signal $S_{Output2}$ to LEDs 126a-126e, LEDs 126a-126e emit blue light 162 in response to being activated by output signal $S_{Output2}$. Further, LEDs 126a-126e do not emit blue light 162 in response to being deactivated by output signal $S_{Output2}$.

Figure 8C:
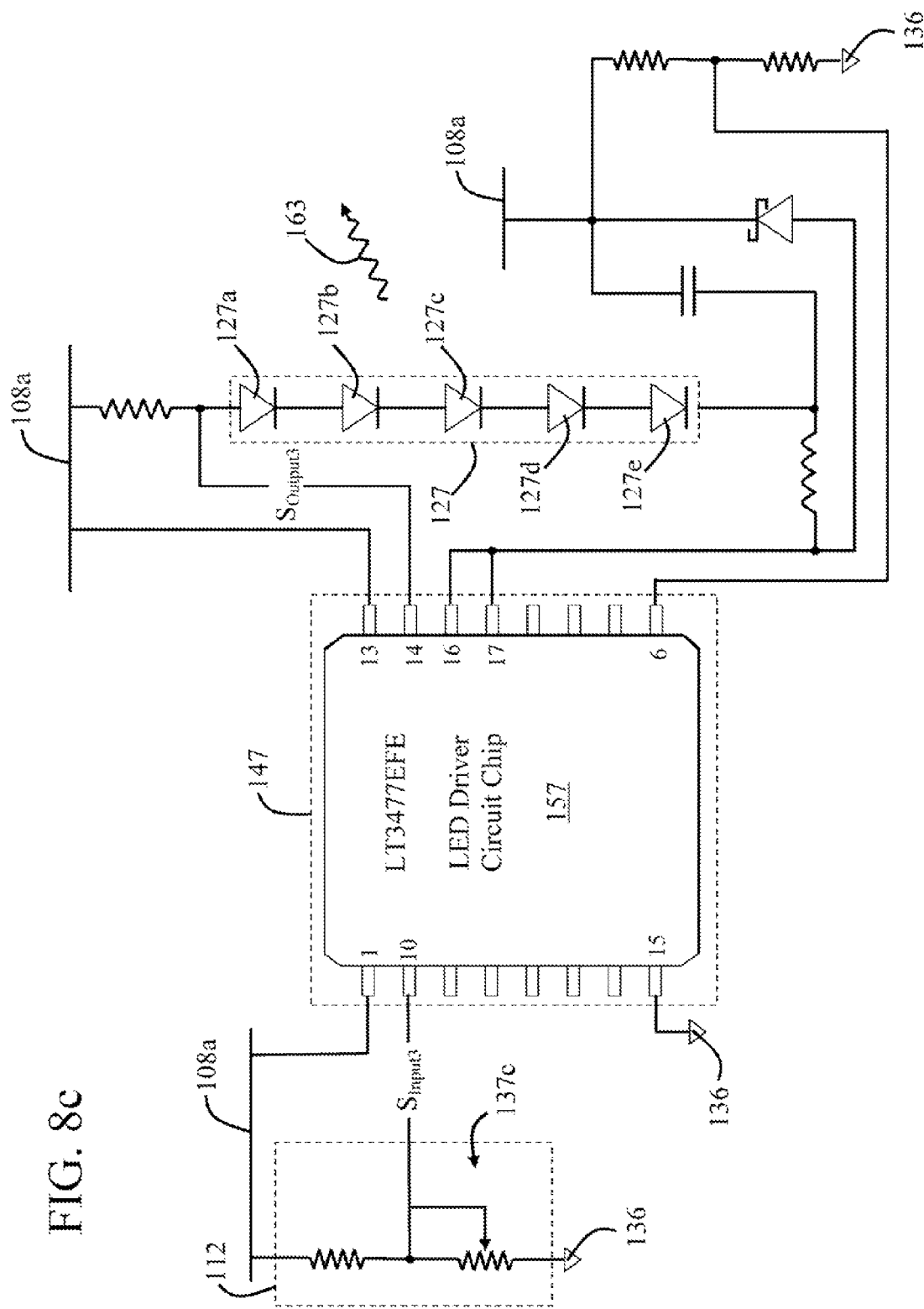

FIG. 8c is a schematic diagram of input 112 operatively coupled to LED sub-array 127 through LED driver circuit 147. As mentioned above, input 112 includes potentiometer 137c, which is connected between power terminal 108a and current return 136. In this embodiment, the output of potentiometer 137c is connected to LED driver circuit 147, which includes an LED driver circuit chip 157, so that LED driver circuit 147 receives input signal $S_{Input3}$. LED driver circuit chip 157 provides output signal $S_{Output2}$ to LED sub-array 127 (FIG. 6b) in response to receiving input signal $S_{Input3}$ from input 112. In particular, LED driver circuit chip 157 provides output signal $S_{Output3}$ LEDs 127a-127e. LEDs 127a-1272e emit green light 163 in response to being activated by output signal $S_{Output3}$. Further, LEDs 127a-127e do not emit green light 163 in response to being deactivated by output signal $S_{Output3}$.

FIG. 8d is a schematic diagram of input 113 operatively coupled to LED sub-array 128 through LED driver circuit 148. As mentioned above, input 113 includes potentiometer 137d, which is connected between power terminal 108a and current return 136. In this embodiment, the output of potentiometer 137d is connected to LED driver circuit 148, which includes an LED driver circuit chip 158, so that LED driver circuit 148 receives input signal $S_{Input4}$. LED driver circuit chip 158 provides output signal $S_{Output4}$ to LED sub-array 128 (FIG. 6*b*) in response to receiving input signal $S_{Input4}$ from input 113. In particular, LED driver circuit chip 158 provides output signal $S_{Output4}$ to LEDs 127*a*-127*e*. LEDs 127*a*-127*e* emit red light 166 in response to being activated by output signal $S_{Output4}$. Further, LEDs 127*a*-127*e* do not emit red light 166 in response to being deactivated by output signal $S_{Output4}$.

Figure 8E:
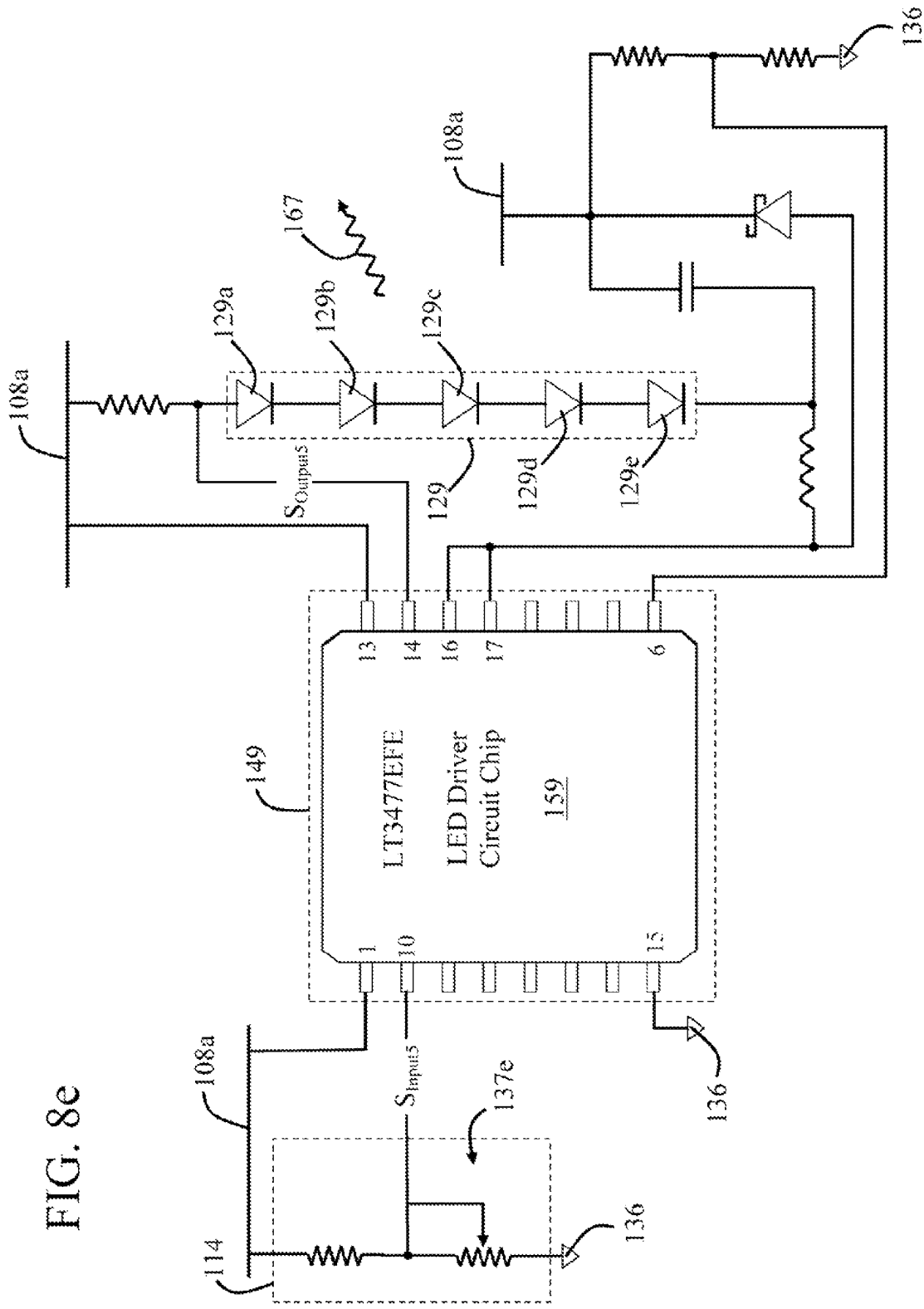

FIG. 8*e* is a schematic diagram of input 114 operatively coupled to LED sub-array 129 through LED driver circuit 149. As mentioned above, input 114 includes potentiometer 137*e*, which is connected between power terminal 108*a* and current return 136. In this embodiment, the output of potentiometer 137*e* is connected to LED driver circuit 149, which includes an LED driver circuit chip 159, so that LED driver circuit 149 receives input signal $S_{Input5}$. LED driver circuit chip 159 provides output signal $S_{Output5}$ to LED sub-array 129 (FIG. 6*b*) in response to receiving input signal $S_{Input5}$ from input 114. In particular, LED driver circuit chip 159 provides output signal $S_{Output5}$ LEDs 129*a*-129*e*. LEDs 129*a*-129*c* emit IR light 167 in response to being activated by output signal $S_{Output5}$. Further, LEDs 129*a*-129*e* do not emit IR light 167 in response to being deactivated by output signal $S_{Output5}$.

As mentioned above, the light emitting diodes included with LED arrays 102 and 103 can emit many different colors of light in response to output signals received from LED controller 130, as will be discussed in more detail presently.

FIG. 9*a* is a graph of a wavelength spectrum 192 of light provided by lighting system 100*b*, wherein wavelength spectrum 192 includes color mixing. In FIG. 9*a*, wavelength spectrum 192 corresponds to the intensity of light versus wavelength (nm), as discussed above with wavelength spectrum 180.

As mentioned above with FIGS. 7*a* and 8*a*, input 110 includes potentiometer 137*a*. In some situations, potentiometer 137*a* is adjusted so the power of input signal $S_{Input1}$ and output signal $S_{Output1}$ are decreased. The intensity of LV light 160 decreases, as indicated by wavelength spectrum 192*b*, in response to decreasing the power of input signal $S_{Input1}$ and output signal $S_{Output1}$ with potentiometer 137*a*.

In some situations, potentiometer 137*a* is adjusted so the power of input signal $S_{Input1}$ and output signal $S_{Output1}$ are increased. The intensity of UV light 160 increases, as indicated by wavelength spectrum 192*e*, in response to increasing the power of input signal $S_{Input1}$ and output signal $S_{Output1}$ with potentiometer 137*a*.

As mentioned above with FIGS. 7*b* and 8*b*, input 111 includes potentiometer 137*b*. In some situations, potentiometer 137*b* is adjusted so the power of input signal $S_{Input2}$ and output signal $S_{Output2}$ are decreased. The intensity of blue light 162 decreases, as indicated by wavelength spectrum 193*b*, in response to decreasing the power of input signal $S_{Input2}$ and output signal $S_{Output2}$ with potentiometer 137*b*.

In some situations, potentiometer 137*b* is adjusted so the power of input signal $S_{Input2}$ and output signal $S_{Output2}$ are increased. The intensity of blue light 162 increases, as indicated by wavelength spectrum 193*c*, in response to increasing the power of input signal $S_{Input2}$ and output signal $S_{Output2}$ with potentiometer 137*b*.

As mentioned above with FIGS. 7*c* and 8*c*, input 112 includes potentiometer 137*c*. In some situations, potentiometer 137*c* is adjusted so the power of input signal $S_{Input3}$ and output signal $S_{Output3}$ are decreased. The intensity of green light 163 decreases, as indicated by wavelength spectrum 194*b*, in response to decreasing the power of input signal $S_{Input3}$ and output signal $S_{Output3}$ with potentiometer 137*c*.

In some situations, potentiometer 137*c* is adjusted so the power of input signal $S_{Input3}$ and output signal $S_{Output3}$ are increased. The intensity of green light 163 increases, as indicated by wavelength spectrum 194*c*, in response to increasing the power of input signal $S_{Input3}$ and output signal $S_{Output3}$ with potentiometer 137*c*.

As mentioned above with FIGS. 7*d* and 8*d*, input 113 includes potentiometer 137*d*. In some situations, potentiometer 137*d* is adjusted so the power of input signal $S_{Input4}$ and output signal $S_{Output4}$ are decreased. The intensity of red light 166 decreases, as indicated by wavelength spectrum 195*b*, in response to decreasing the power of input signal $S_{Input4}$ and output signal $S_{Output4}$ with potentiometer 137*d*.

In some situations, potentiometer 137*d* is adjusted so the power of input signal $S_{Input5}$ and output signal $S_{Output5}$ are increased. The intensity of red light 166 increases, as indicated by wavelength spectrum 195*d*, in response to increasing the power of input signal $S_{Input5}$ and output signal $S_{Output5}$ with potentiometer 137*d*.

As mentioned above with FIGS. 7*e* and 8*e*, input 114 includes potentiometer 137*e*. In some situations, potentiometer 137*e* is adjusted so the power of input signal $S_{Input5}$ and output signal $S_{Output5}$ are decreased. The intensity of IR light 167 decreases, as indicated by wavelength spectrum 196*b*, in response to decreasing the power of input signal $S_{Input5}$ and output signal $S_{Output5}$ with potentiometer 137*e*.

In some situations, potentiometer 137*e* is adjusted so the power of input signal $S_{Input5}$ and output signal $S_{Output5}$ are increased. The intensity of IR light 167 increases, as indicated by wavelength spectrum 195*e*, in response to increasing the power of input signal $S_{Input5}$ and output signal $S_{Output5}$ with potentiometer 137*e*. In this way, the light emitting diodes included with LED arrays 102 and 103 emit different colors of light in response to output signals received from LED controller 130.

FIG. 9*b* is a graph of a wavelength spectrum 200 of light provided by lighting system 100*b*, wherein wavelength spectrum 200 includes color mixing. In FIG. 9*b*, wavelength spectrum 200 corresponds to the intensity of light versus wavelength (nm), as discussed above with wavelength spectrum 180.

In this example, potentiometer 137*a* is adjusted so the power of input signal $S_{Input1}$ and output signal $S_{Output1}$ are adjusted, and the intensity of UV light 160 is driven to zero. In this example, potentiometer 137*b* is adjusted so the power of input signal $S_{Input2}$ and output signal $S_{Output2}$ are adjusted, and the intensity of blue light 162 is driven to that indicated by wavelength spectrum 193*a*. In this example, potentiometer 137*c* is adjusted so the power of input signal $S_{Input3}$ and output signal $S_{Output3}$ are adjusted, and the intensity of green light 163 is driven to that indicated by wavelength spectrum 194*b*.

In this example, potentiometer 137*d* is adjusted so the power of input signal $S_{Input4}$ and output signal $S_{Output4}$ are adjusted, and the intensity of red light 166 is driven to that indicated by wavelength spectrum 195*a*. In this example, potentiometer 137*e* is adjusted so the power of input signal $S_{Input5}$ and output signal $S_{Output5}$ are adjusted, and the intensity of IR light 167 is driven to that indicated by wavelength spectrum 196*c*.

FIG. 9*c* is a graph of a wavelength spectrum 201 of fight provided by fighting system 100*b*, wherein wavelength spectrum 201 includes color mixing. In FIG. 9*e*, wavelength spectrum 201 corresponds to the intensity of light versus wavelength (nm), as discussed above with wavelength spectrum 180.

In this example, potentiometer 137a is adjusted so the power of input signal $S_{Input1}$ and output signal $S_{Output1}$ are adjusted, and the intensity of UV light 160 is driven to zero. in this example, potentiometer 137b is adjusted so the power of input signal $S_{Input2}$ and output signal are adjusted, and the intensity of blue light 162 is driven to that indicated by wavelength spectrum 193a. In this example, potentiometer 137c is adjusted so the power of input signal $S_{Input3}$ and output signal $S_{Output3}$ are adjusted, and the intensity of green light 163 is driven to that indicated by wavelength spectrum 194c.

In this example, potentiometer 137d is adjusted so the power of input signal $S_{Input4}$ and output signal $S_{Output4}$ are adjusted, and the intensity of red light 166 is driven to that indicated by wavelength spectrum 195b. In this example, potentiometer 137e is adjusted so the power of input signal $S_{Input5}$ and output signal $S_{Output5}$ are adjusted, and the intensity of fit light 167 is driven to that indicated by wavelength spectrum 196b.

It should be noted that the desired mixture of light provided by lighting system 100b can be chosen to correspond to an action spectrum of a physiological activity of a plant, as will be discussed in more detail presently.

Figure 9D:
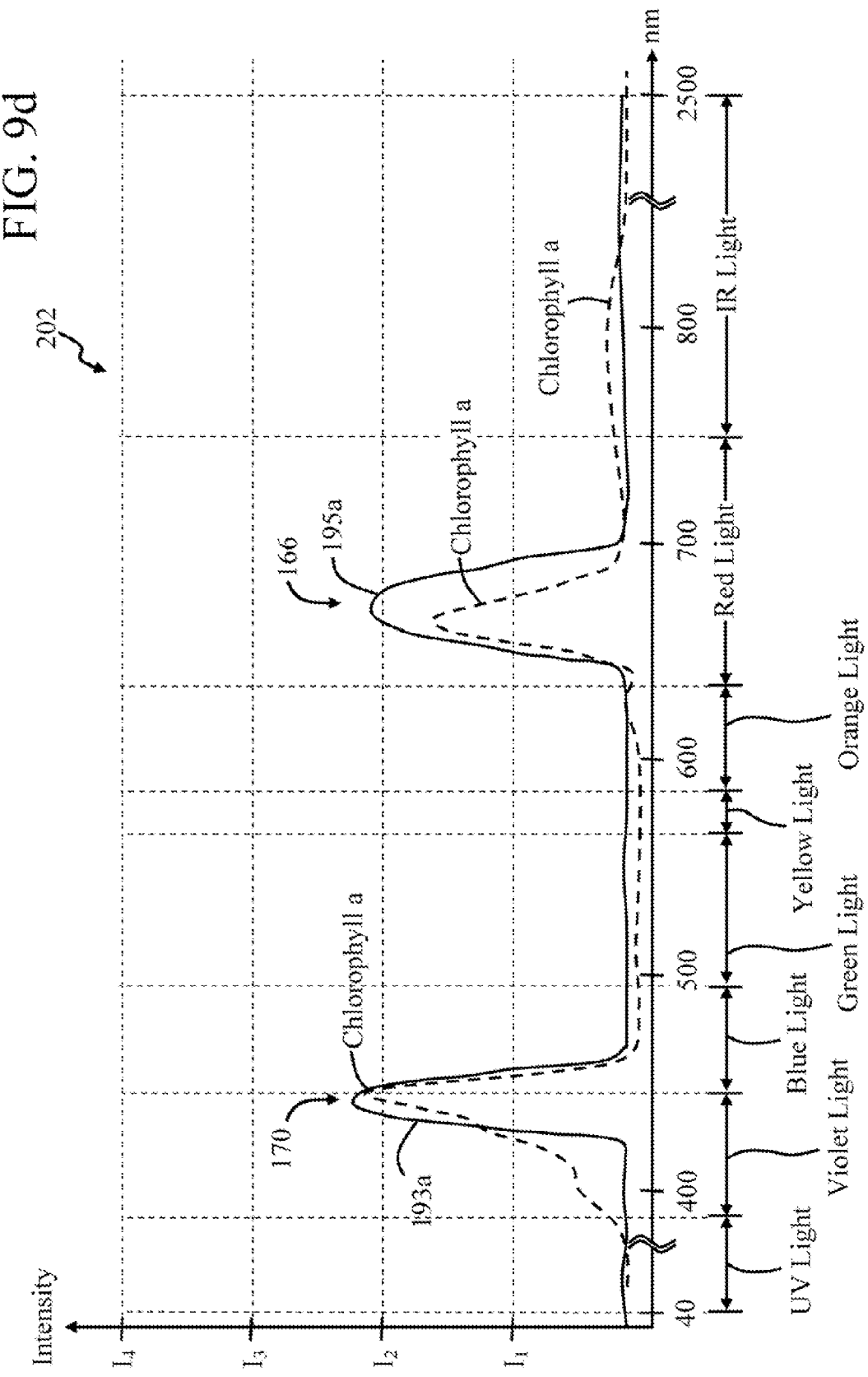
Figure 9E:
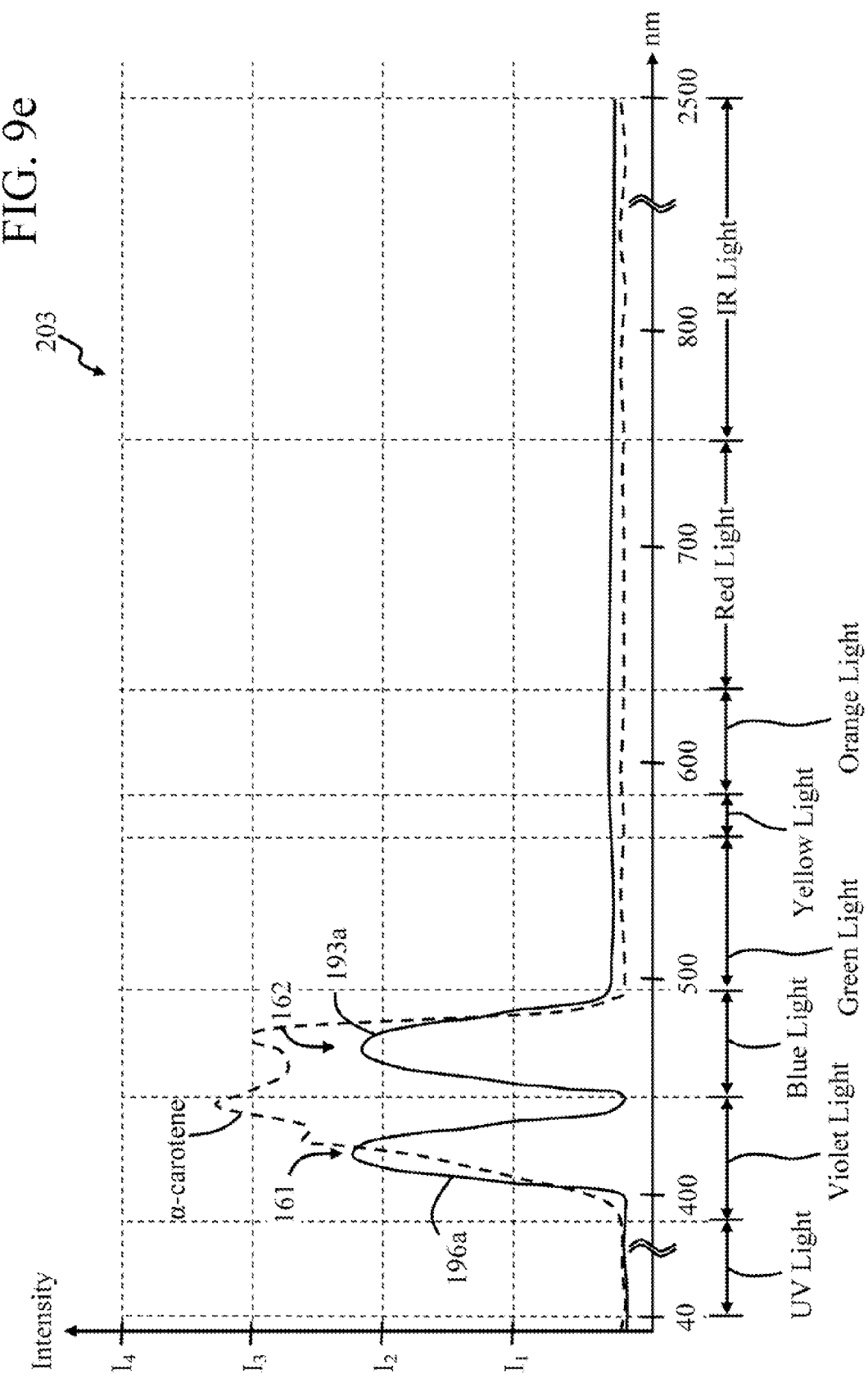
FIG. 9e is a graph of a wavelength spectrum of light provided by the lighting system of FIGS. 5a and 5b, wherein, and the wavelength spectrum of α-carotene.

FIG. 9d is a graph of a wavelength spectrum 202 of light provided by lighting system 100b, wherein wavelength spectrum 202 includes color mixing. Action spectrum corresponding to chlorophyll a is also shown in FIG. 9d. In FIG. 9d, wavelength spectrum 202 and the action spectrum corresponding to chlorophyll a correspond to the intensity of light versus wavelength (nm).

In this example, potentiometer 137a is adjusted so the power of input signal $S_{Input1}$ and output signal $S_{Output1}$ are adjusted, and the intensity of UV light 160 is driven to zero. In this example, potentiometer 137b is adjusted so the power of input signal $S_{Input2}$ and output signal $S_{Output2}$ are adjusted, and the intensity of blue light 162 is driven to that indicated by wavelength spectrum 193a. In this example, potentiometer 137c is adjusted so the power of input signal $S_{Input3}$ and output signal $S_{Output3}$ are adjusted, and the intensity of green light 163 is driven to zero.

In this example, potentiometer 137d is adjusted so the power of input signal $S_{Input4}$ and output signal $S_{Output4}$ are adjusted, and the intensity of red fight 166 is driven to that indicated by wavelength spectrum 195a. In this example, potentiometer 137e is adjusted so the power of input signal $S_{Input5}$ and output signal $S_{Output5}$ are adjusted, and the intensity of IR light 167 is driven to zero. in this way, the desired mixture of light provided by lighting system 100b is chosen to correspond to the action spectrum corresponding to chlorophyll a.

FIG. 9e is a graph of a wavelength spectrum 203 of light provided by lighting system 100b, wherein wavelength spectrum 203 includes color mixing. Action spectrum corresponding to α-carotene is also shown in FIG. 9e. In FIG. 9e, wavelength spectrum 203 and the action spectrum corresponding to α-carotene correspond to the intensity of light versus wavelength (nm).

It should be noted that, in this example, LED sub-arrays 120 and 125 include LEDs which emit violet light 161 when activated, and do not emit violet light 161 when deactivated. Hence, LEDs 120a, 120b, 120c, 120d and 120e in FIG. 7a emit violet light 161 instead of UV light 160. Further, LEDs 125a, 125b, 125c, 125d and 125e. In FIG. 8a emit blue light 162 instead of UV light 160.

In this example, potentiometer 137a is adjusted so the power of input signal $S_{Input1}$ and output signal $S_{Output1}$ are adjusted, and the intensity of violet light 161 is driven to that indicated by wavelength spectrum 196a, In this example, potentiometer 137b is adjusted so the power of input signal $S_{Input2}$ and output signal $S_{Output2}$ are adjusted, and the intensity of blue light 162 is driven to that indicated by wavelength spectrum 193a. In this example, potentiometer 137c is adjusted so the power of input signal $S_{Input3}$ and output signal $S_{Output3}$ are adjusted, and the intensity of green light 163 is driven to zero.

In this example, potentiometer 137d is adjusted so the power of input signal $S_{Input4}$ and output signal $S_{Output4}$ are adjusted, and the intensity of red light 166 is driven to zero. In this example, potentiometer 137e is adjusted so the power of input signal $S_{Input5}$ and output signal $S_{Output5}$ are adjusted, and the intensity of IR light 167 is driven to zero. In this way, the desired mixture of light provided by lighting system 100b is chosen to correspond to the action spectrum corresponding to α-carotene.

FIG. 9f is a graph of a wavelength spectrum 204 of light provided by lighting system 100b, wherein wavelength spectrum 204 includes color mixing. Action spectrum corresponding to pelargonin is also shown in FIG. 9f. In FIG. 9f, wavelength spectrum 204 and the action spectrum corresponding to pelargonin correspond to the intensity of light versus wavelength (nm).

It should be noted that, in this example, LED sub-arrays 120 and 125 include LEDs which emit green light 163 when activated, and do not emit green light 163 when deactivated. Hence, LEDs 120a, 121a, 121b, 121c, 121d and 121e in FIG. 7a emit violet light 161 instead of UV light 160. Further, LEDs 125a, 125b, 125c, 125d and 125e in FIG. 8a emit green light 163 instead of UV light 160.

Further, in this example. LED sub-arrays 121 and 126 include LEDs which emit blue-green light 171 when activated, and do not emit blue-green light 171 when deactivated. Hence, LEDs 121a, 121b, 121c, 121d and 121e in FIG. 7b emit blue-green light 171 instead of blue light 162. Further, LEDs 126a, 126b, 126c, 126d and 126c in FIG. 8b emit blue-green light 171 instead of blue light 162.

In this example, potentiometer 137a is adjusted so the power of input signal $S_{Input4}$ and output signal $S_{Output4}$ are adjusted, and the intensity of violet light 161 is driven to zero. In this example, potentiometer 137b is adjusted so the power of input signal $S_{Input5}$ and output signal $S_{Output5}$ are adjusted, and the intensity of blue-green light 171 is driven to that indicated by wavelength spectrum 197a. In this example, potentiometer 137c is adjusted so the power of input signal $S_{Input3}$ and output signal $S_{Output3}$ are adjusted, and the intensity of green light 163 is driven to that indicated by wavelength spectrum 194c.

In this example, potentiometer 137d is adjusted so the power of input signal $S_{Input4}$ and output signal $S_{Output4}$ are adjusted, and the intensity of red light 166 is driven to zero. In this example, potentiometer 137e is adjusted so the power of input signal $S_{Input5}$ and output signal $S_{Output5}$ are adjusted, and the intensity of IR light 167 is driven to zero. In this way, the desired mixture of light provided by lighting system 100b is chosen to correspond to the action spectrum corresponding to pelargonin.

It should be noted that the desired mixture of light provided by lighting system 100b can be chosen to correspond to a wavelength spectrum of sunlight, as will be discussed in more detail presently.

FIG. 9g is a graph of a wavelength spectrum 205 of light provided by lighting system 100b, wherein wavelength spectrum 205 includes color mixing. A wavelength spectrum 197 corresponding to sunlight is also shown in FIG. 9g. In FIG. 9g, wavelength spectra 197 and 205 correspond to the intensity of light versus wavelength (nm).

It should be noted that, in this example, LED sub-arrays 120 and 125 include LEDs which emit UV light 160 when activated, and do not emit UV light 160 when deactivated. Hence, LEDs 120*a*, 120*b*, 120*c*, 120*d* and 120*e* in FIG. 7*a* emit UV light 160. Further, LEDs 125*a*, 125*b*, 125*e*, 125*d* and 125*e* in FIG. 8*a* emit violet light 161.

Further, in this example. LED sub-arrays 121 and 126 include LEDs which emit white light 148 when activated, and do not emit white light 168 when deactivated. Hence, LEDs 121*a*, 121*b*, 121*c*, 121*d* and 121*e* in FIG. 7*b* emit white light 168. Further, LEDs 125*a*, 125*b*, 125*c*, 125*d* and 125*e* in FIG. 8*b* emit white light 168. A wavelength spectrum 197 corresponding to white light 168 is also shown in FIG. 9*d*. The LEDs of LED sub-arrays 121 and 126 can emit white light 168 in many different ways. In this example, the LEDs of LED sub-arrays 121 and 126 emit white light 168 because they include phosphor coated LEDs, which emit blue light. In another example, the LEDs of LED sub-arrays 121 and 126 emit white light 168 because they include phosphor coated LEDs, which emit UV light.

In this example, potentiometer 137*a* is adjusted so the power of input signal $S_{Input1}$ and output signal $S_{Output1}$ are adjusted, and the intensity of UV light 160 is driven to zero. In this example, potentiometer 137*b* is adjusted so the power of input signal $S_{Input2}$ and output signal $S_{Output2}$ are adjusted, and the intensity of white light 168 is driven to that indicated by wavelength spectrum 197. In this example, potentiometer 137*c* is adjusted so the power of input signal $S_{Input3}$ and output signal $S_{Output3}$ are adjusted, and the intensity of green light 163 is driven to that indicated by wavelength spectrum 194*b*.

In this example, potentiometer 137*d* is adjusted so the power of input signal $S_{Input4}$ and output signal $S_{Output4}$ are adjusted, and the intensity of red light 166 is driven to that indicated by wavelength spectrum 195*b*. In this example, potentiometer 137*e* is adjusted so the power of input signal $S_{Input5}$ and output signal $S_{Output5}$ are adjusted, and the intensity of IR light 167 is driven to that indicated by wavelength spectrum 196*b*. In this way, the desired mixture of light provided by lighting system 100*b* is chosen to correspond to a wavelength spectrum of sunlight.

FIG. 10 is a block diagram of a lighting system 100*c*, which includes a programmable logic controller 133 operatively coupled to LED array 102 through LED controller 130. Lighting system 100*c* includes a timer circuit 134 operatively coupled to programmable logic circuit 133. Timer circuit 134 can be of many different types, such as a 555 timer. 555 timers are made by many different manufacturers. For example, ECG Philips makes the ECG955M chip, Maxim makes the ICM7555 chip and Motorola makes the MC1455/MC1555 chip.

Timer circuit 134 provides a timing signal $S_{Timer}$ to programmable logic circuit 133 and, in response, programmable logic circuit 133 provides input signals $S_{Input1}$, $S_{Input2}$, $S_{Input3}$, $S_{Input4}$ and $S_{Input5}$ to LED controller 130. As discussed in more detail above with FIGS. 6*a* and 6*b*, as well as with FIGS. 7*a*-7*e* and FIGS. 8*a*-8*e*, LED controller 130 provides input signals $S_{Output1}$, $S_{Output2}$, $S_{Output3}$, $S_{Output4}$ and $S_{Output5}$ to LED array 102 in response to receiving input signals $S_{Input1}$, $S_{Input2}$, $S_{Input3}$, $S_{Input4}$ and $S_{Input5}$.

In this embodiment, programmable logic controller 133 is programmed to adjust input signals $S_{Input1}$, $S_{Input2}$, $S_{Input3}$, $S_{Input4}$ and $S_{Input5}$ in response to receiving timing signal $S_{Timer}$. Programmable logic controller 133 can adjust input signals $S_{Input1}$, $S_{Input2}$, $S_{Input3}$, $S_{Input4}$ and $S_{Input5}$ in response to receiving timing signal $S_{Timer}$ in many different ways.

In one example, programmable logic controller 133 adjusts input signals $S_{Input1}$, $S_{Input2}$, $S_{Input3}$, $S_{Input4}$ and $S_{Input5}$ in response to receiving timing signal $S_{Timer}$ so that the relative intensities of light 160, 162, 163, 166 and 167 of FIG. 9*a* are adjusted relative to each other, as described in more detail with FIGS. 9*a*-9*g*. In this way, lighting system 100*c* includes a programmable logic circuit which adjusts input signals in response to receiving a timing signal from a timer.

In general, lighting system 100*c* allows the intensities of light 160, 162, 163, 166 and 167 to be adjusted relative to each other as a period of time. The period of time can have many different values. For example, in some embodiments, the period of time is in a range from about half an hour to more than one hour. In other embodiments, the period of time is in a range from about a day to several days. The period of time can also be in a range from a day to a week or more, or from a day to a month or more. In one particular embodiment, the period of time corresponds with the yearly cycle of the sun so that lighting system 100*c* mimics the sun.

Figure 11B:
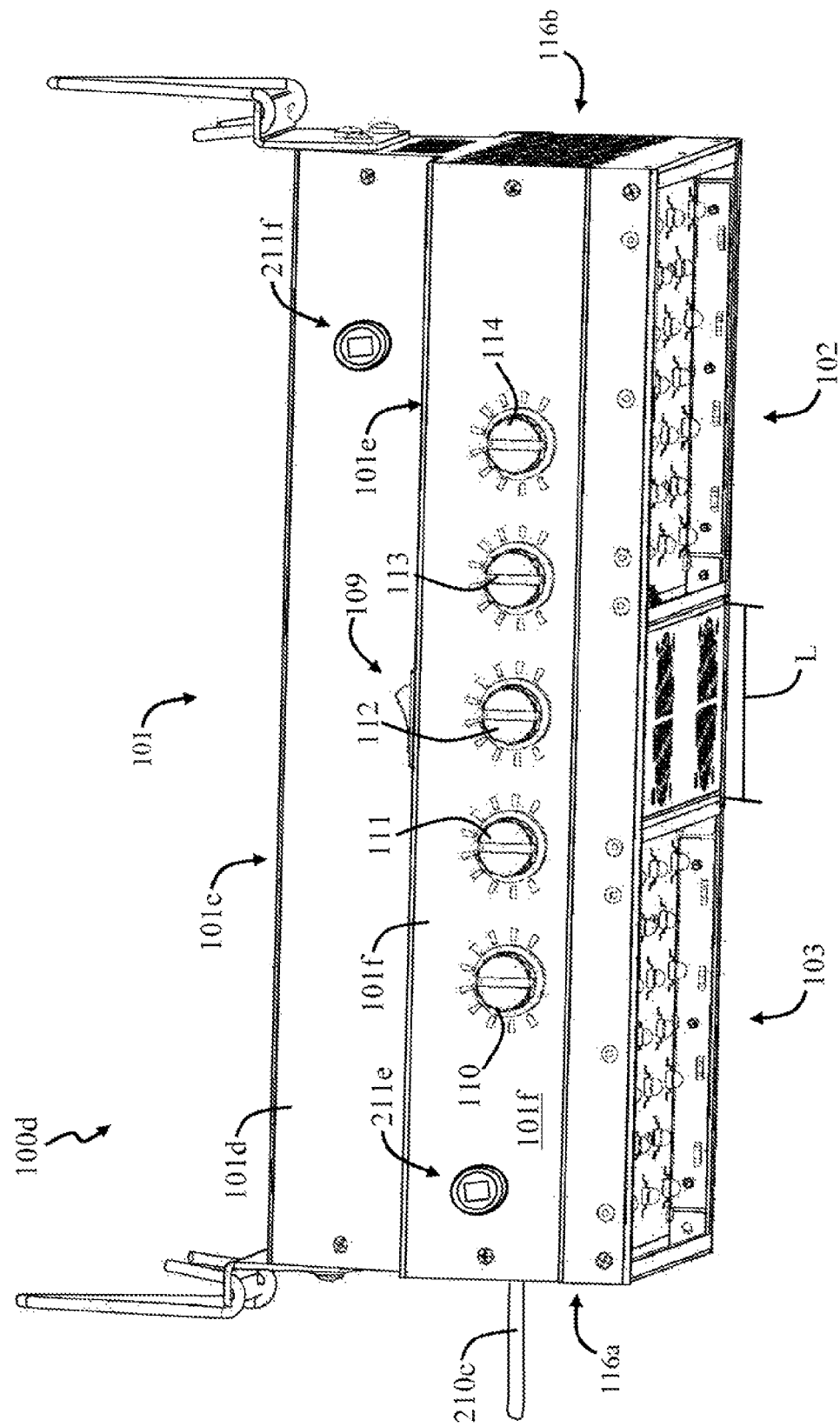

FIGS. 11*a* and 11*b* are bottom and top perspective views, respectively, of a lighting system 100*d*. It should be noted that lighting system 100*d* is similar to lighting system 100*b* of FIGS. 5*a*-5*e*. In this embodiment, lighting system 100*d* includes inputs 110, 111, 112, 113 and 114 (FIG. 11*b*) operatively coupled to LED arrays 102 and 103 through LED controller 130 (not shown). As discussed in more detail above, LED arrays 102 and 103 each include LED sub-arrays connected to inputs 110-114. The LED sub-arrays of LED arrays 102 and 103 each include a plurality of LEDs, as will be discussed in more detail below. The LEDs of arrays 102 and 103 can be of many different types, such as those mentioned above.

LED arrays 102 and 103 are spaced apart from each other by distance L (FIG. 11*b*) so that lighting system 100*d* provides a desired intensity of light away from LED arrays 102 and 103. LED arrays 102 and 103 are spaced apart from each other by distance L so that lighting system 100*d* can be more effectively cooled, as will be discussed in more detail below. It should be noted that, in this embodiment, LED arrays 102 and 103 include the same number of LEDs. However, in other embodiments, LED arrays 102 and 103 can include different numbers of LEDs. For example, in one embodiment, LED array 102 includes twenty five LEDs and LED array 103 includes twenty six LEDs.

Figure 11C:
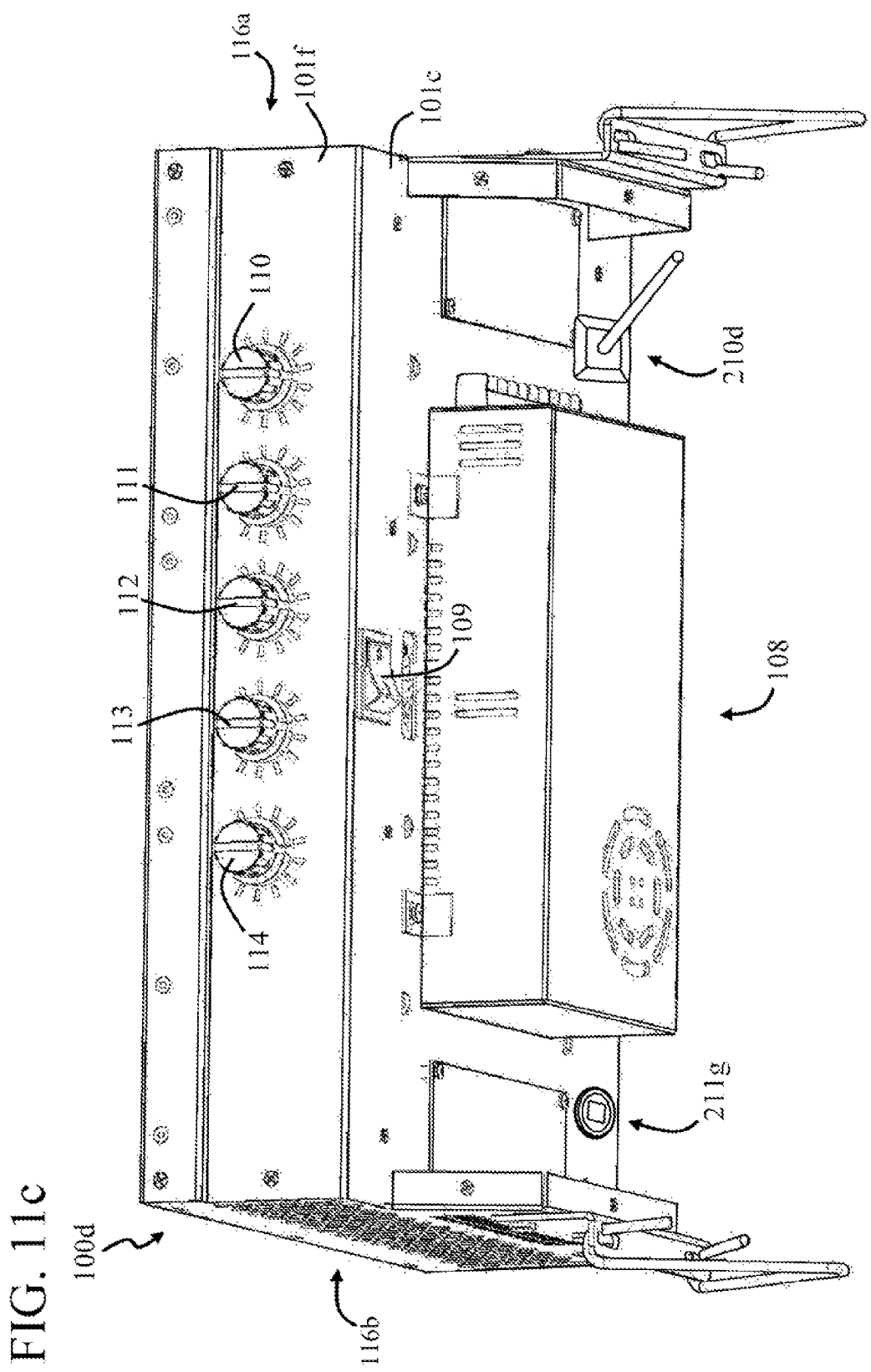
FIGS. 11c and 11d are top and back perspective views of the lighting system of FIGS. 11a and 11b.
Figure 11D:
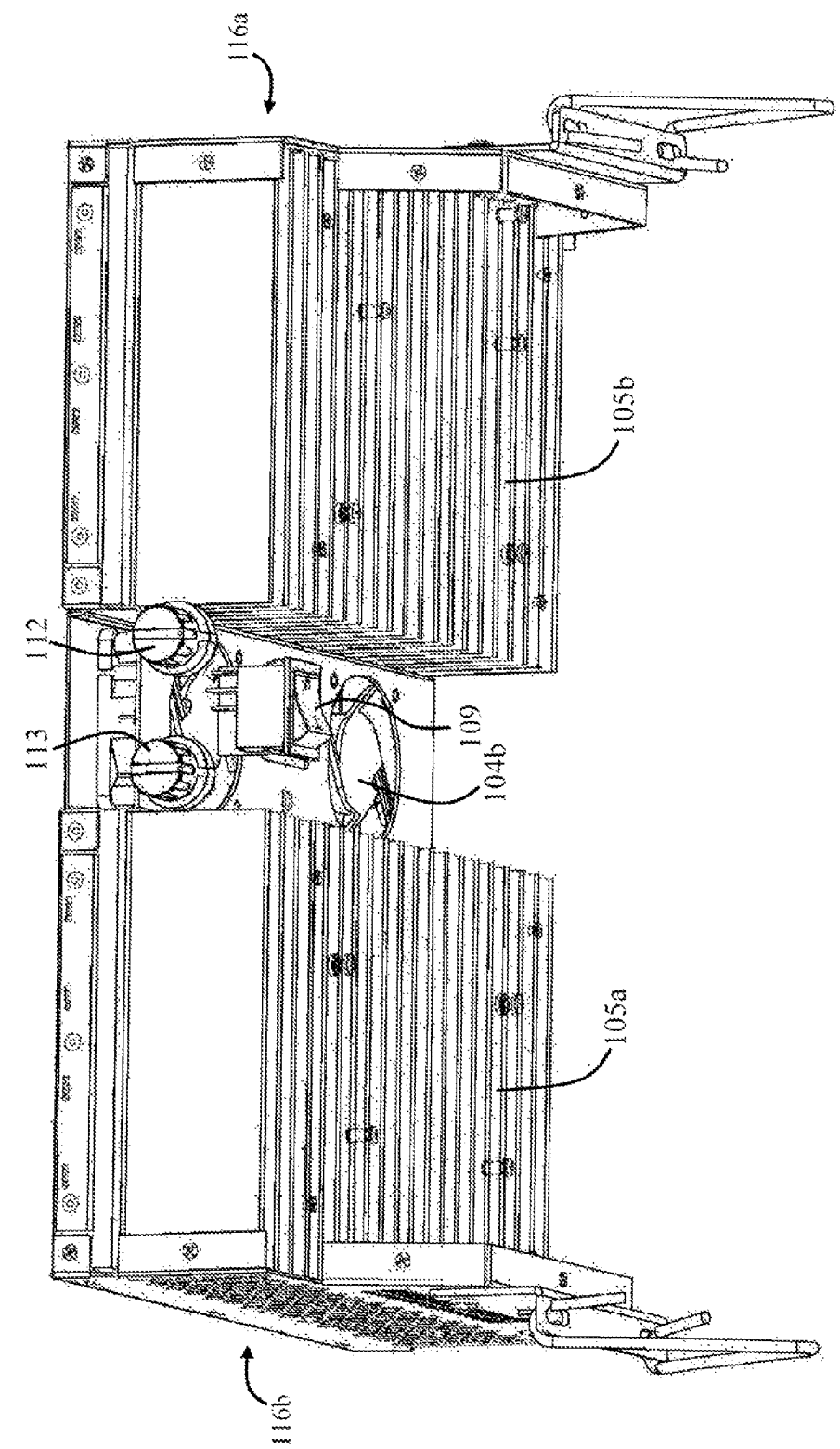
Figure 11E:
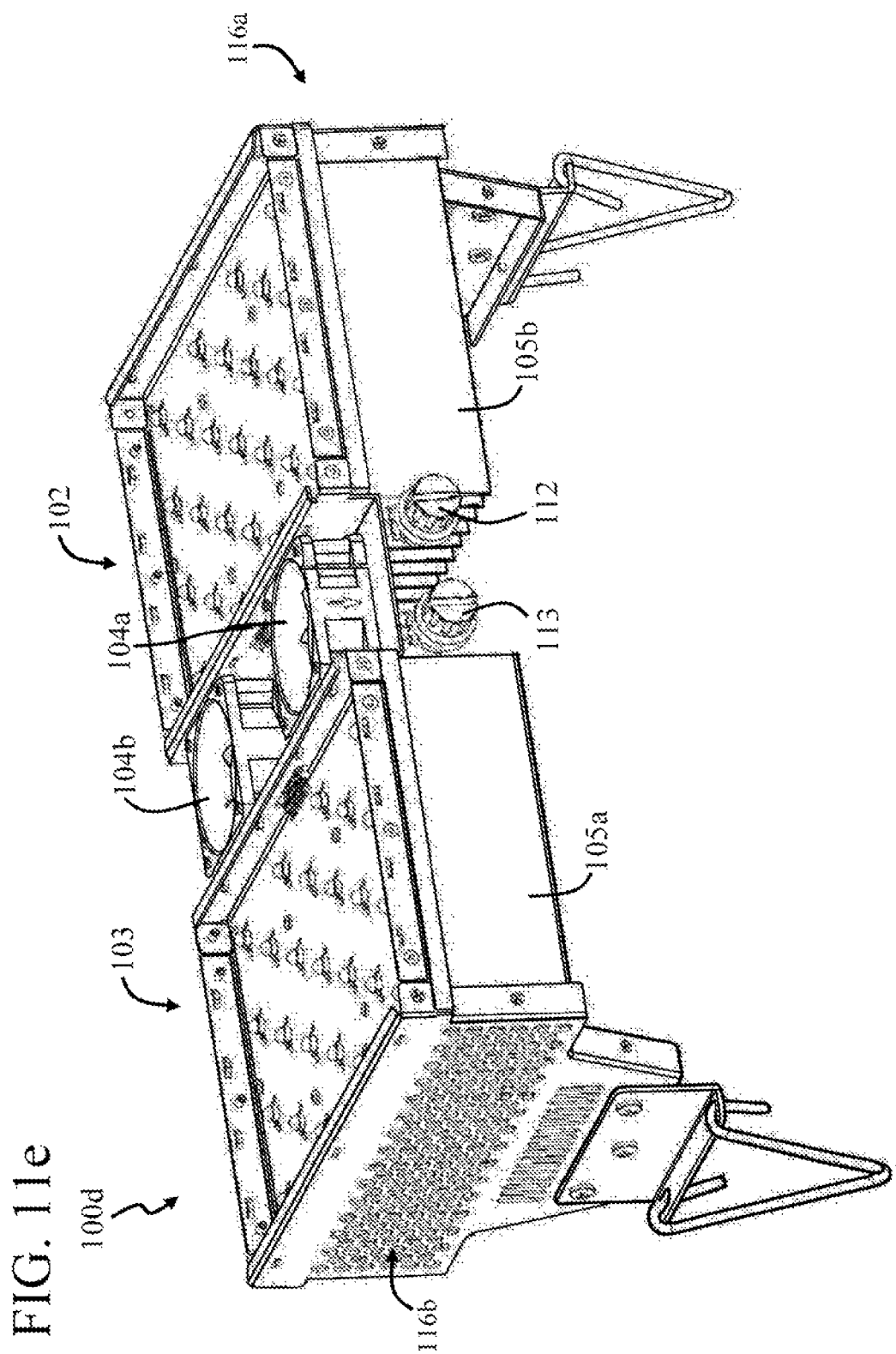
FIG. 11e is a front perspective view of the lighting system of FIGS. 11a and 11b.

In this embodiment, lighting system 100*d* includes lighting system housing 101 which houses LED arrays 102 and 103, and extends between housing sides 116*a* and 116*b*. FIGS. 11*c* and 11*d* are top and back perspective views of lighting system 100*d* with and without lighting system housing 101, respectively. FIG. 11*e* is a front perspective view of lighting system 100*d* without lighting system housing 101. In this embodiment, lighting system housing 101 includes opposed walls 101*a* and 101*b*. Lighting system housing 101 includes angled wall 101*g*, which extends from the edge of wall 101*a*. Lighting system 101 includes angled wall 101*b* which extends from the edge of angled wall 101*g*. Lighting system 101 includes angled wall 101*0* which extends from the edge of wall 101*f*. Lighting system 101 includes angled wall 101*d* which extends from the edge of angled wall 101*e*. Lighting system 101 includes back wall 101*0* which extends from edges of angled walls 101*b* and 101*d*.

As shown in FIGS. 11*e* and 11*d*, lighting system 100*b* includes on/off switch 109 operatively coupled with LED controller 130. On/off switch 109 is for turning LED controller 130 on and off. In this embodiment, on/off switch 109 extends through angled wall 101*e* as shown in FIG. 11*b*.

In this embodiment, lighting system 100d includes an antenna, which allows the flow of a wireless signal, wherein the wireless signal can flow to and from lighting system 100d. The wireless signal can flow in many different ways such as through a Wi-Fi network. The wireless signal can include many different types of information, as will be discussed in more detail below. In some embodiments, the wireless signal includes maintenance information regarding the operation of lighting system 100d. In general, lighting system 100d includes at least one antenna. In this embodiment, lighting system 100d includes antennas 210a, 210b and 210c. The antennas can be positioned at many different locations. Antenna 210a extends through wall 101a and antenna 210b extends through angled wall 101b for illustrative purposes. It should be noted that antennas 210a and 210b can extend through other walls of lighting system housing 101, if desired.

In this embodiment, antenna 210e extends through a housing side 116a for illustrative purposes. It should be noted that antenna 210c can extend through housing side 116b, if desired. In this way, the antennas of lighting system 100d can be positioned to allow communication in a desired direction. As will be discussed in more detail below, the antennas of lighting system 100d allow the communication to a remote device, such as a sensor, computer and the LED controller another lighting system. It should be noted that the antennas of lighting system 100d are in communication with a communication module, such as a transceiver and modem, as will be discussed in more detail below.

In this embodiment, lighting system 100d includes a sensor, which senses a condition. The condition can be of many different types, such as a light condition. The sensor operates as a light sensor when the sensor senses a light condition. The sensor can operate as a photosynthesis meter, moisture meter, and gas analyzers to detect conditions proximate to lighting system 100d, and apply feedback to adjust plant growth conditions. In some embodiments, the sensor is responsive to the physiological activity of the plant. It should be noted that, in some embodiments, the sensor is carried by a housing of the lighting system, as shown in FIGS. 11a-11e. Further, in other embodiments, the sensor is positioned remotely from lighting system 100d. The sensor can be in communication with the other components of lighting system 100d in many different ways, such as through wired and wireless communication.

One type of photosynthesis meter is referred to as the FIELDSCOUT CM 1000 NDVI Meter manufactured by Spectrum Technologies, Inc. of Plainfield, Ill. One type of moisture meter is referred to as the Springfield 91746 Digital Moisture Meter manufactured by Springfield, of Plainfield, Ill. The moisture meter can be a wireless moisture meter, such as the one disclosed in U.S. Pat. No 6,975,236. The gas analyzer can be of many different types, such as an infrared gas analyzer. One type of infrared gas analyzers is referred to as the Anarad AR-500-R, which is responsive to carbon dioxide gas. More information regarding gas analyzers can be found in U.S. Pat. No. 6,624,887. It should be noted that the sensors of lighting system 100d can all be the same type of sensor, or different types of sensors.

In this embodiment, lighting system 100d includes sensors 211a, 211b, 211c, 211d, 211e and 211f. It should be noted that, in general, lighting system 100d includes one or more sensors. In this embodiment, lighting system 100d includes six sensors for illustrative purposes. It should also be noted that sensors 211a, 211b, 211c, 211d, 211e and 211f can all be the same type of sensors, or different types of sensors.

The sensors can be positioned at many different locations. Sensor 211a is coupled to wall 101a and sensor 211b is coupled to angled wall 101b for illustrative purposes. Further, sensor 211e is coupled to wall 101f and sensor 211f is coupled to angled wall 101d for illustrative purposes. It should be noted that sensors 211a, 211b, 211c and 211d can be coupled to other walls of lighting system housing 101, if desired.

In this embodiment, sensor 211c is coupled to front panel 115 and sensor 211d is coupled to housing side 116b for illustrative purposes. It should be noted that sensor 211d can be coupled to housing side 116a, if desired. In this way, the sensors of lighting system 100d can be positioned to sense the condition from a desired direction. As will be discussed in more detail below, the sensors of lighting system 100d are in communication with an LED controller of lighting system 100d, such as LED controller 130.

As shown in FIGS. 11a, 11b, 11d and 11e, lighting system 100d includes fans 104a and 104b which provide cooling. For example, fans 104a and 104b can cool LED controller 130 (not shown) and LED arrays 102 and 103. Fans 104a and 104b can be positioned at many different locations of lighting system 100d. In this embodiment, fans 104a and 104b are positioned between LED arrays 102 and 103.

As shown in FIGS. 11d and 11e, lighting system 100 includes heatsinks 105a and 105b which provide cooling for LED arrays 102 and 103, respectively. Heatsinks 105a and 1.05b also provide cooling for LED controller 130. As mentioned above, LED arrays 102 and 103 are spaced apart from each other by distance L, which allows LED arrays 102 and 103 to be more effectively cooled by fans 104a and 104b, and corresponding heatsinks 105a and 105b.

LED array 102 includes LED sub-arrays 120, 121, 122, 123 and 124 carried by LED array support structure 106a, LED array 102 generally includes one or more LED sub-arrays, but it includes five LED sub-arrays in this embodiment for illustrative purposes. An embodiment in which LED array 102 includes two LED sub-arrays is discussed in more detail above.

In this embodiment, LED sub-arrays 120, 121, 122, 123 and 124 each include five LEDs for illustrative purposes so that LED array 102 includes twenty five LEDs. However, as discussed in more detail above with FIG. 1c, LED array 102 includes two or more sub-arrays LEDs, and the LED sub-arrays generally include one or more LEDs.

In this embodiment, LED sub-array 120 includes LEDs 120a, 120b, 120c, 120d, and 120e, and LED sub-array 121 includes LEDs 121a, 121b, 121c, 121d and 121e. LED Sub-array 122 includes LEDs 122a, 122b, 122c, 122d and 122e, and LED sub-array 123 includes LEDs 123a, 123b, 123c, 123d and 123e. Further, LED sub-array 124 includes LEDs 124a, 124b, 124c, 124d and 124e. The light emitting diodes included with LED array 102 can emit many different colors of light in response to output signals received from LED controller 130, as will be discussed in more detail below with FIGS. 9a-9f.

In this embodiment, wherein LED array 103 includes LED sub-arrays 125, 126, 127, 128 and 129 carried by LED array support structure 106b. LED array 103 generally includes one or more LED sub-arrays, but it includes five LED sub-arrays in this embodiment for illustrative purposes. An embodiment in which LED array 103 includes two LED sub-arrays is discussed in more detail above.

In this embodiment, LED sub-arrays 125, 126, 127, 128 and 129 each include five LEDs for illustrative purposes so that LED array 103 includes twenty five LEDs. However, as discussed in more detail above with FIG. 1e, LED array 103 includes two or more LEDs, and LED sub-arrays generally include one or more LEDs.

In this embodiment, LED sub-array 125 includes LEDs 125a, 125b, 125c, 125d and 125e, and LED sub-array 126 includes LEDs 126*a*, 126*b*, 126*c*, 126*d* and 126*e*. LED sub-array 127 includes LEDs 127*a*, 127*b*, 127*c*, 127*d* and 127*e*, and LED sub-array 128 includes LEDs 128*a*, 128*b*, 128*c*, 128*d* and 128*e*. Further, LED sub-array 129 includes LEDs 129*a*, 129*b*, 129*e*, 129*d* and 129*e*. The light emitting diodes included with LED array 103 can emit many different colors of light in response to output signals received from LED controller 130, as discussed in more detail above.

In this particular embodiment, LED sub-arrays 120 and 125 include LEDs which are capable of emitting UV light 160. Hence, LEDs 120*a*-120*e* and LEDs 125*a*-125*e* are capable of emitting UV light 160. In some embodiments, UV light 160 has a wavelength between about 300 and 380 nm. In other embodiments, IR light 167 has a wavelength between about 350 and 380 nm.

LED sub-arrays 121 and 126 include LEDs which are capable of emitting blue light 162. Hence, LEDs 121*a*-121*e* and LEDs 126*a*-126*e* are capable of emitting blue light 162. LED sub-arrays 122 and 127 include LEDs which ace capable of emitting green light 163. Hence, LEDs 122*a*-122*e* and LEDs 127*a*-127*e* are capable of emitting green light 163. LED sub-arrays 123 and 128 include LEDs which are capable of emitting red light 166. Hence, LEDs 123*a*-123*e* and LEDs 128*a*-128*e* are capable of emitting red light 166. LED sub-arrays 124 and 129 include LEDs which are capable of emitting IR light 167. Hence, LEDs 124*a*-124*e* and LEDs 129*a*-129*e* are capable of emitting IR light 167. In some embodiments. IR light 167 has a wavelength between about 750 and 825 nm. In other embodiments, IR light 167 has a wavelength between about 750 and 900 nm.

Figure 12A:
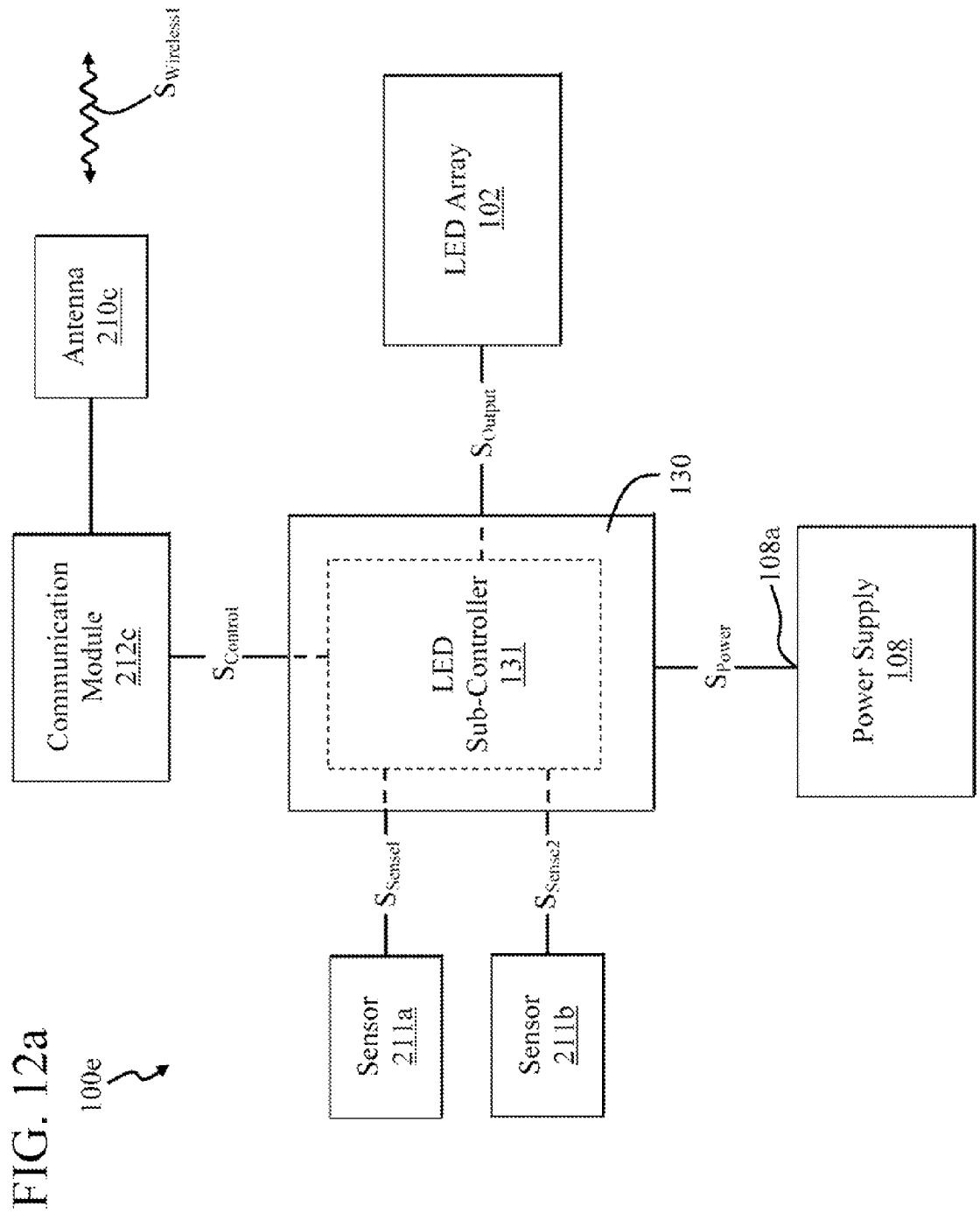
FIG. 12a is a block diagram of one embodiment of a lighting system.

FIG. 12*a* is a block diagram of one embodiment of a lighting system 100*e*. It should be noted that lighting system 100*e* can be included with lighting system 100*d* of FIGS. 11*a*-11*e*. In this embodiment, lighting system 100*e* includes LED controller 130, which includes LED sub-controller 131. LED sub-controller 131 is in communication with LED array 102, as discussed in more detail above. As mentioned in more detail above, the operation of LED array 102 is adjustable in response to adjusting output signal $S_{Output}$. LED controller 130 and LED sub-controller 131 are powered by power supply 108, as discussed in more detail above. It should be noted that the embodiments discussed below refer to LED array 102 and LED sub-controller 131 of LED controller 130. However, it should be noted that the discussion also applies to LED array 103 and LED sub-controller 132, which are discussed in more detail above.

In this embodiment, lighting system 100*e*, includes sensors 211*a* and 211*b*, which are in communication with LED controller 130. In particular, sensors 211*a* and 211*b* are in communication with LED sub-controller 131. Sensors 211*a* and 211*b* can be of many different types, such as the types mentioned above.

In this embodiment, lighting system 100*e* includes antenna 210*e* in communication with LED controller 130 through a communication module 212*c*. In particular, antenna 210*c* is in communication with LED sub-controller 131 through communication module 212*c*. Communication module 212*c* can be of many different types, such as a wireless transceiver and wireless modem. A modem and transceiver send and receive signals, but a modem modulates and demodulates the signal. Wireless signal $S_{Wireless1}$ can be provided in many different ways, such as by a remote device. The remote device can be of many different types, such as a computer and another lighting system.

In a first mode of operation, antenna 210*c* receives wireless signal $S_{Wireless1}$ and, in response, communication module 212*c* provides a control signal $S_{Control}$ to LED controller 130.

The operation of LED controller 130 is adjusted in response to LED controller 130 receiving control signal $S_{Control}$. The operation of LED controller 130 can be adjusted in many different ways. For example, in some situations. LED sub-controller 131 is turned on and off, such as by turning, on and off power supply 108, in response to LED controller 130 receiving control signal $S_{Control}$. In another embodiment, LED sub-controller 131 adjusts the wavelength of light provided by LED array 102 in response to LED controller 130 receiving control signal $S_{Control}$. In some embodiments, the operation of LED controller 130 is adjusted, in response to receiving control signal $S_{Control}$, to adjust the intensity of light provided by LED array 102. It is useful to adjust the intensity of light provided by LED array 102 to adjust the amount of power used by lighting system 100*e*. In another embodiment, the operation of a sensor, such as sensors 211*a* and/or 211*b* is adjusted in response to LED controller 130 receiving control signal $S_{Control}$. The operation of the sensor can be adjusted in many different ways, such as by turning the sensor on and off.

In a second mode of operation, the sensor of lighting system 100*e* senses a condition, such as a light condition or the physiological activity of the plant, and, in response, provides a sense signal to LED controller 130. For example, in one embodiment, sensor 211*a* is a light sensor which senses a wavelength of light and, in response, provides a sense signal $S_{Sense1}$ to LED controller 130. In some embodiments, the operation of LED controller 130 is adjusted in response to receiving sense signal $S_{Sense1}$. For example, the operation of LED controller 130 is adjusted to adjust the wavelength of light provided by LED array 102. In some embodiments, the operation of LED controller 130 is adjusted to adjust the intensity of light provided by LED array 102. It is useful to adjust the intensity of light provided by LED array 102 to adjust the amount of power used by lighting system 100*e*. In some embodiments, sense signal $S_{Sense1}$ is flowed through communication module 212*c* and antenna 210*c* as wireless signal $S_{Wireless1}$, wherein wireless signal $S_{Wireless1}$ includes information corresponding to the wavelength of light sensed by sensor 211*a*.

In another embodiment, sensor 211*b* is a gas sensor which senses a type of gas proximate to lighting system 100*c* and, in response, provides a sense signal $S_{Sense2}$ to LED controller 130. In some embodiments, the operation of LED controller 130 is adjusted in response to receiving sense signal $S_{Sense2}$. For example, the operation of LED controller 130 is adjusted to adjust the wavelength of light provided by LED array 102. In some embodiments, the operation of LED controller 130 is adjusted to adjust the intensity of light provided by LED array 102. It is useful to adjust the intensity of light provided by LED array 102 to adjust the amount of power used by lighting system 100*c*. In some embodiments, sense signal $S_{Sense2}$ is flowed through communication module 212*c* and antenna 210*c* as wireless signal $S_{Wireless1}$, wherein wireless signal $S_{Wireless1}$ includes information corresponding to the type of gas sensed by sensor 211*b*.

In another embodiment, sensor 211*b* is a photosynthesis meter which senses the plant stress level of a plant proximate to lighting system 100*e* and, in response, provides sense signal $S_{Sense2}$ to LED controller 130. In some embodiments, the operation of LED controller 130 is adjusted in response to receiving sense signal $S_{Sense2}$. For example, the operation of LED controller 130 is adjusted to adjust the wavelength of light provided by LED array 102. In some embodiments, the operation of LED controller 130 is adjusted to adjust the intensity of light provided by LED array 102. It is useful to adjust the intensity of light provided by LED array 102 to adjust the amount of power used by lighting system 100*e*. In some embodiments, sense signal $S_{Sense2}$ is flowed through communication module 212c and antenna 210c as wireless signal $S_{Wireless1}$, wherein wireless signal $S_{Wireless1}$ includes information corresponding to the plant stress level sensed by sensor 211b.

In another embodiment, sensor 211a is a gas analyzer which senses the type and/or amount of gas proximate to lighting system 100e and, in response, provides sense signal $S_{Sense1}$ to LED controller 130. In some embodiments, the operation of LED controller 130 is adjusted in response to receiving sense signal $S_{Sense1}$. For example, the operation of LED controller 130 is adjusted to adjust the wavelength of light provided by LED array 102. In some embodiments, the operation of LED controller 130 is adjusted to adjust the intensity of light provided by LED array 102. It is useful to adjust the intensity of light provided by LED array 102 to adjust the amount of power used by lighting system 100e. In some embodiments, sense signal $S_{Sense1}$ is flowed through communication module 212c and antenna 210c as wireless signal $S_{Wireless1}$, wherein wireless signal $S_{Wireless1}$ includes information corresponding to the type and/or amount of gas sensed by sensor 211a.

In a third mode of operation, wireless signal $S_{Wireless1}$ includes information corresponding to a growth season. Antenna 210c receives wireless signal $S_{Wireless1}$ and, in response, communication module 212c provides control signal $S_{Control}$ to LED controller 130. The operation of LED controller 130 is adjusted in response to receiving control signal $S_{Control}$. The operation of LED controller 130 can be adjusted in many different ways. For example, in some situations, LED sub-controller 131 adjusts the wavelength of light provided by LED array 102 in response to LED controller 130 receiving signal $S_{Control}$. In this way, the wavelength of light provided by LED array 102 is adjusted in response to an indication of the growth season. In another embodiment, LED sub-controller 131 adjusts the intensity of light provide by LED array 102 in response to LED controller 130 receiving control signal $S_{Control}$. It is useful to adjust the intensity of light provided by LED array 102 to adjust the amount of power used by lighting system 100e. In this way, the amount of power used by lighting system 100e is adjustable in response to the indication of the growth season. In another embodiment, the operation of the sensor, such as sensors 211a and/or 211b, is adjusted in response to LED controller 130 receiving control signal $S_{Control}$. In this way, the operation of sensors 211a and/or 211b is adjusted in response to the indication of the growth season.

In a fourth mode of operation, wireless signal $S_{Wireless1}$ includes information corresponding to a type of plant positioned proximate to lighting system 100e. Antenna 210c receives wireless signal $S_{Wireless1}$ and, in response, communication module 212c provides control signal $S_{Control}$ to LED controller 130. The operation of LED controller 130 is adjusted in response to receiving control signal $S_{Control}$. The operation of LED controller 130 can be adjusted in many different ways, For example, in sonic situations, LED sub-controller 131 adjusts the wavelength of light provided by LED array 12 in response to LED controller 130 receiving control signal $S_{Control}$. In this way, the wavelength of light provided by LED array 102 is adjusted in response to an indication of the type of plant positioned proximate to lighting system 100e. In another embodiment, the operation of the sensor, such as sensors 211a and/or 211b, is adjusted in response to LED controller 130 receiving control signal $S_{Control}$. In this way, the operation of sensors 211a and/or 211b is adjusted in response to the indication of the type of plant positioned proximate to lighting system 100e.

Figure 12B:
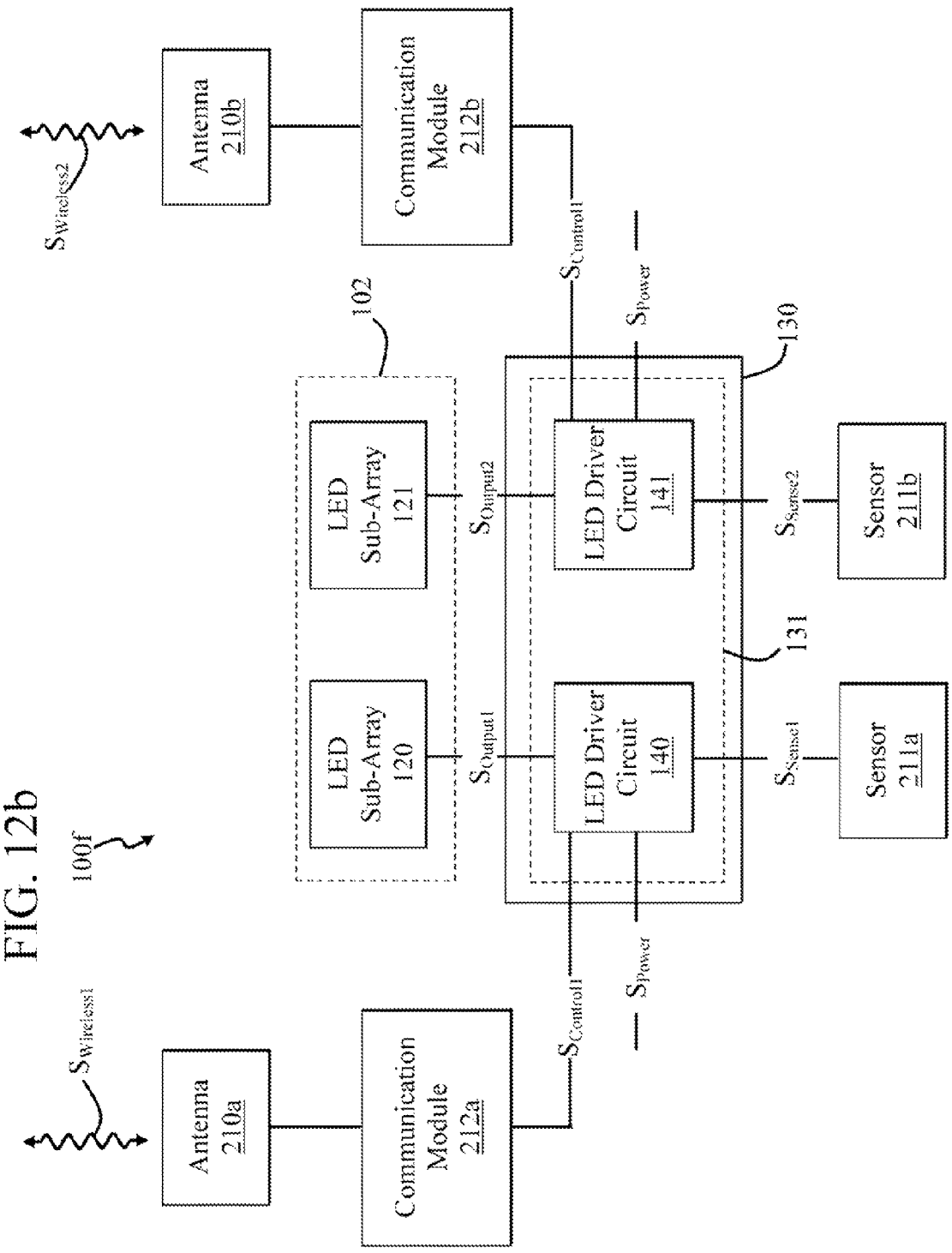
FIG. 12b is a block diagram of one embodiment of a lighting system.

FIG. 12b is a block diagram of one embodiment of a lighting system 100f. It should be noted that lighting system 100f can be included with lighting system 100d of FIGS. 11a-11e. It should be noted that lighting system 100f includes a portion of the embodiment of lighting system 100a of FIG. 1b. In this embodiment, lighting system 100f includes LED controller 130, which includes LED sub-controller controller 131. In this embodiment, LED sub-controller 131 includes LED driver circuits 140 and 141, wherein LED driver circuits 140 and 141 are driven by power signal $S_{Power}$. LED controller 130 and LED sub-controller 131 are powered by power supply 108, as discussed in more detail above.

In this embodiment, lighting system 100f includes LED array 102, wherein LED sub-controller 131 is in communication with LED array 102, as discussed in more detail above. In particular, LED driver circuit 140 is in communication with LED sub-array 120 and LED driver circuit 141 is in communication with LED sub-array 121. As discussed in more detail above, the operation of LED sub-arrays 120 and 121 are adjustable in response to adjusting output signals $S_{Output1}$ and $S_{Output2}$, respectively.

It should be noted that LED sub-arrays 120 and 121 are capable of providing a desire wavelength spectrum, such as those shown in FIGS. 3a, 3b, 3c, 4a, 4b, 4c, 4d, 4e, 4f, 4g, 4h and 4i. For example, in one embodiment, LED sub-array 120 provides the wavelength spectrum of FIG. 3a and LED sub-array 121 provides the wavelength spectrum of FIG. 3b. In another embodiment, LED sub-array 120 provides the wavelength spectrum of FIG. 3c and LED sub-array 121 provides the wavelength spectrum of FIG. 4a.

It should be noted that the wavelength spectrums provided by LED sub-arrays 120 and 121 are adjustable with time. For example, during a first time period, LED sub-array 120 provides the wavelength spectrum of FIG. 3a and, during a second time period. LED sub-array 120 provides the wavelength spectrum of FIG. 4a. Further, during the first time period, LED sub-array 121 provides the wavelength spectrum of FIG. 3b and, during the second time period, LED sub-array 121 provides the wavelength spectrum of FIG. 4g.

In this embodiment, lighting system 1001 includes sensors 211a and 211b, which are in communication with LED sub-controller 131. in particular, sensors 211a and 211b are in communication with LED driver circuits 140 and 141, respectively. Sensors 211a and 211b can be of many different types, such as the types mentioned above.

In this embodiment, lighting system 100f includes antenna 210a in communication with LED sub-controller 131 through a communication module 212a. In particular, antenna 210a is in communication with LED driver circuit 140 through communication module 212a. Communication module 212a can be of many different types, such as a wireless transceiver.

In this embodiment, lighting system 100f includes antenna 210b in communication with LED sub-controller 131 through a communication module 212b. In particular, antenna 210b is in communication with LED driver circuit 141 through communication module 212b. Communication modules 212a and 212b can be of many different types, such as a wireless transceiver. Wireless signal $S_{Wireless1}$ can be provided in many different ways, such as by a remote device. The remote device can be of many different types, such as a computer and another lighting system.

The operation of lighting system 1001 is similar to the operation of lighting system 100e of FIG. 12a. In a first mode of operation, antenna 210a receives wireless signal $S_{Wireless1}$ and, in response, communication module 212a provides control signal $S_{Control1}$ to LED controller 130. The operation of LED driver circuit 140 is adjusted in response to LED controller 130 receiving control signal $S_{Control1}$. The operation of LED driver circuit 140 can be adjusted in many different ways. For example, in some situations, LED driver circuit 140 is turned on and off, such as by turning on and off power supply 108, in response to LED controller 130 receiving control signal $S_{Control1}$. In another embodiment, LED driver circuit 140 adjusts the wavelength of light provided by LED sub-array 120 in response to LED controller 130 receiving control signal $S_{Control1}$. In some embodiments, the operation of LED driver circuit 140 is adjusted, in response to receiving control signal $S_{Control1}$, to adjust the intensity of light provided by LED sub-array 120. It is useful to adjust the intensity of light provided by LED sub-array 120 to adjust the amount of power used by lighting system 100f. In another embodiment, the operation of a sensor, such as sensors 211a and/or 211b is adjusted in response to LED controller 130 receiving control signal $S_{Control1}$. The operation of the sensor can be adjusted in many different ways, such as by turning the sensor on and off.

In the first mode of operation, antenna 210b receives wireless signal $S_{Wireless2}$ and, in response, communication module 212a provides control signal $S_{Control2}$ to LED controller 130. The operation of LED driver circuit 141 is adjusted in response to LED controller 130 receiving control signal $S_{Control2}$. The operation of LED driver circuit 141 can be adjusted in many different ways. For example, in some situations, LED driver circuit 141 is turned on and off, such as by turning on and off power supply 108, in response to LED controller 130 receiving control signal $S_{Control2}$. In another embodiment, LED driver circuit 141 adjusts the wavelength of light provided by LED sub-array 121 in response to LED controller 130 receiving Control signal $S_{Control2}$. In some embodiments, the operation of LED driver circuit 141 is adjusted, in response to receiving control signal $S_{Control2}$, to adjust the intensity of light provided by LED sub-array 121. It is useful to adjust the intensity of light provided by LED sub-array 121 to adjust the amount of power used by lighting system 100f. In another embodiment, the operation of a sensor, such as sensors 211a and/or 211b is adjusted in response to LED controller 130 receiving control signal $S_{Control2}$. The operation of the sensor can be adjusted in many different ways, such as by turning the sensor on and off.

In a second mode of operation, the sensor of lighting system 100f senses a condition, such as a light condition or the physiological activity of the plant, and, in response, provides a sense signal to LED controller 130. For example, in one embodiment, sensor 211a is a light sensor which senses a wavelength of light and, in response, provides sense signal $S_{Sense1}$ to LED controller 130. In some embodiments, the operation of LED sub-array 120 is adjusted by LED driver circuit 140 in response to LED controller 130 receiving sense signal $S_{Sense1}$. For example, the operation of LED sub-array 120 is adjusted to adjust the wavelength of light provided by LED sub-array 120. In some embodiments, the operation of LED sub-array 120 is adjusted to adjust the intensity of light provided by LED sub-array 120. It is useful to adjust the intensity of light provided by LED sub-array 120 to adjust the amount of power used by lighting system 100f. In some embodiments, sense signal $S_{Sense1}$ is flowed through communication module 212a and antenna 210a as wireless signal $S_{Wireless1}$, wherein wireless signal $S_{Wireless1}$ includes information corresponding to the wavelength of light sensed by sensor 211a.

In the second mode of operation, sensor 211b is a as sensor which senses a type of gas proximate to lighting system 100f and, in response, provides sense signal $S_{Sense2}$ to LED controller 130. in some embodiments, the operation of LED driver circuit 141 is adjusted in response to LED controller 130 receiving sense signal $S_{Sense2}$. For example, the operation of LED driver circuit 141 is adjusted to adjust the wavelength of light provided by LED sub-array 121. In some embodiments, the operation of LED driver circuit 141 is adjusted to adjust the intensity of light provided by LED sub-array 121. It is useful to adjust the intensity of light provided by LED sub-array 121 to adjust the amount of power used by lighting system 100f. In some embodiments, sense signal $S_{Sense2}$ is flowed through communication module 212b and antenna 210c as wireless signal $S_{Wireless2}$, wherein wireless signal $S_{Wireless2}$ includes information corresponding to the type of gas sensed by sensor 211b.

In another embodiment, sensor 211b is a photosynthesis meter which senses the plant stress level of a plant proximate to lighting system 100 and, in response, provides sense signal $S_{Sense2}$ to LED controller 130. In some embodiments, the operation of LED driver circuit 141 is adjusted in response to LED controller 130 receiving sense signal $S_{Sense2}$. For example, the operation of LED driver circuit 141 is adjusted to adjust the wavelength of light provided by LED sub-array 121. In some embodiments, the operation of LED driver circuit 141 is adjusted to adjust the intensity of light provided by LED sub-array 121 it is useful to adjust the intensity of light provided by LED sub-array 121 to adjust the amount of power used by lighting system 100f. In some embodiments, sense signal $S_{Sense2}$ is flowed through communication module 212b and antenna 210b as wireless signal $S_{Wireless2}$, wherein wireless signal $S_{Wireless2}$ includes information corresponding to the plant stress level sensed by sensor 211b.

In another embodiment, sensor 211b is a gas analyzer which senses the type and/or amount of gas proximate to lighting system 100f and in response, provides sense signal $S_{Sense2}$ to LED controller 130. In some embodiments, the operation of LED driver circuit 141 is adjusted in response to LED controller 130 receiving sense signal $S_{Sense2}$. For example, the operation of LED driver circuit 141 is adjusted to adjust the wavelength of light provided by LED sub-array 121. In some embodiments, the operation of LED driver circuit 141 is adjusted to adjust the intensity of light provided by LED sub-array 121. it is useful to adjust the intensity of light provided by LED sub-array 121 to adjust the amount of power used by lighting system 100f. In some embodiments, sense signal $S_{Sense2}$ is flowed through communication module 212b and antenna 210b as wireless signal $S_{Wireless2}$, wherein wireless signal $S_{Wireless2}$ includes information corresponding to the type and/or amount of gas sensed by sensor 211b.

In a third mode of operation, wireless signal $S_{Wireless1}$ includes information corresponding to the growth season. Antenna 210a receives wireless signal $S_{Wireless1}$ and, in response, communication module 212a provides control signal $S_{Control1}$ to LED controller 130. The operation of LED driver circuit 140 is adjusted in response to LED controller 130 receiving control signal $S_{Control1}$. The operation of LED driver circuit 140 can be adjusted in many different ways, For example, in some situations, LED driver circuit 140 adjusts the wavelength of light provided by LED sub-array 120 in response to LED controller 130 receiving control signal $S_{Control1}$. In this way, the wavelength of light provided by LED sub-array 120 is adjusted in response to an indication of the growth season. In another embodiment, LED driver circuit 140 adjusts the intensity of light provide by LED sub-array 120 in response to LED controller 130 receiving control signal $S_{Control1}$. It is useful to adjust the intensity of light provided by LED sub-array 120 to adjust the amount of power used by lighting system 100f. In this way, the amount of power used by lighting system 100f is adjustable in response to the indication of the growth season. In another embodiment, the operation of the sensor, such as sensors 211a an/or 211b, is adjusted in response to LED controller 130 receiving control signal $S_{Control1}$. In this way, the operation of sensors 211a and/or 211b is adjusted in response to the indication of the growth season.

In the third mode of operation, wireless signal $S_{Wireless2}$ includes information corresponding to the growth season. Antenna 210b receives wireless signal $S_{Wireless2}$ and, in response, communication module 212b provides control signal $S_{Control2}$ to LED controller 130. The operation of LED driver circuit 141 is adjusted in response to LED controller 130 receiving control signal $S_{Control2}$. The operation of LED driver circuit 141 can be adjusted in many different ways. For example, in some situations, LED driver circuit 141 adjusts the wavelength of light provided by LED sub-array 121 in response to LED controller 130 receiving control signal $S_{Control2}$. In this way, the wavelength of light provided by LED sub-array 121 is adjusted in response to an indication of the growth season. In another embodiment, LED driver circuit 141 adjusts the intensity of light provide by LED sub-array 121 in response to LED controller 130 receiving control signal $S_{Control2}$. It is useful to adjust the intensity of light provided by LED sub-array 121 to adjust the amount of power used by lighting system 100f. In this way, the amount of power used by lighting system 100f is adjustable in response to the indication of the growth season. In another embodiment, the operation of the sensor, such as sensors 211a and/or 211b, is adjusted in response to LED controller 130 receiving control signal $S_{Control2}$. In this way, the operation of sensors 211a and/or 211b is adjusted in response to the indication of the growth season.

In a fourth mode of operation, wireless signal $S_{Wireless1}$ includes information corresponding to a type of plant positioned proximate to lighting system 100f. Antenna 210a receives wireless signal $S_{Wireless1}$ and, in response, communication module 212a provides control signal $S_{Control1}$ to LED controller 130. The operation of LED driver circuit 140 is adjusted in response to receiving control signal $S_{Control1}$. The operation of LED driver circuit 140 can be adjusted in may different ways. For example, in some situations, LED driver circuit 140 adjusts the wavelength of light provided by LED sub-array 120 in response to LED controller 130 receiving control signal $S_{Control1}$. In this way, the wavelength of light provided by LED sub-array 120 is adjusted in response to an indication of the type of plant positioned proximate to lighting system 100f. In another embodiment, the operation of the sensor, such as sensors 211a and/or 211b, is adjusted in response to LED controller 130 receiving control signal $S_{Control1}$. In this way, the operation of sensors 211a and/or 211b is adjusted in response to the indication of the type of plant positioned proximate to lighting system 100f.

In the fourth mode of operation, wireless signal $S_{Wireless2}$ includes information corresponding to a type of plant positioned proximate to lighting system 100f. Antenna 210b receives wireless signal $S_{Wireless2}$ and, in response, communication module 212b provides control signal $S_{Control2}$ to LED controller 130. The operation of LED driver circuit 141 is adjusted in response to receiving control signal $S_{Control2}$. The operation of LED driver circuit 141 can be adjusted in many different ways. For example, in sonic situations, LED driver circuit 141 adjusts the wavelength of light provided by LED sub-array 121 in response to LED controller 130 receiving control signal $S_{Control2}$. In this way, the wavelength of light provided by LED sub-array 121 is adjusted in response to an indication of the type of plant positioned proximate to lighting system 100f. In another embodiment, the operation of the sensor, such as sensors 211a and/or 211b, is adjusted in response to LED controller 130 receiving control signal $S_{Control2}$. In this way, the operation of sensors 211a and/or 211b is adjusted in response to the indication of the type of plant positioned proximate to lighting system 100f.

In a fifth mode of operation, wireless signals $S_{Wireless1}$ and $S_{Wireless2}$ include information regarding first and second wavelength spectrums. As mentioned above. LED sub-arrays 120 and 121 are capable of providing a desire wavelength spectrum, such as those shown in FIGS. 3a, 3b, 3c, 4a, 4b, 4c, 4d, 4e, 4f, 4g, 4h and 4i.

Antenna 210a receives wireless signal $S_{Wireless1}$ and, in response, communication module 212a provides control signal $S_{Control2}$ to LED controller 130. The operation of LED driver circuit 140 is adjusted in response to receiving control signal $S_{Control2}$. In this embodiment, LED driver circuit 140 adjusts the wavelength of light provided by LED sub-array 120 to match the first wavelength spectrum. In this way, the wavelength of light provided by LED sub-array 120 is adjusted in response to wireless signal $S_{Wireless1}$.

Antenna 210b receives wireless signal $S_{Wireless2}$ and, in response, communication module 212b provides control signal $S_{Control2}$ to LED controller 130. The operation of LED driver circuit 141 is adjusted in response m receiving control signal $S_{Control2}$. In this embodiment, LED driver circuit 141 adjusts the wavelength of light provided by LED sub-array 121 to match the first wavelength spectrum. In this way, the wavelength of light provided by LED sub-array 121 is adjusted in response to wireless signal $S_{Wireless2}$.

The wavelength spectrums of wireless signals and $S_{Wireless1}$ and $S_{Wireless2}$ can be adjusted with time. For example, during the first time period, LED sub-array 120 provides the first wavelength spectrum and LED sub-array 121 provides the second wavelength spectrum, During the second period of time, wireless signals $S_{Wireless1}$ and $S_{Wireless2}$ and include information regarding third and fourth wavelength spectrums. Hence, during the second time period, LED sub-array 120 provides the third wavelength spectrum and LED sub-array 121 provides the fourth wavelength spectrum. It should be noted that the wavelength spectrums can be adjusted over more time periods, if desired.

Figure 13A:
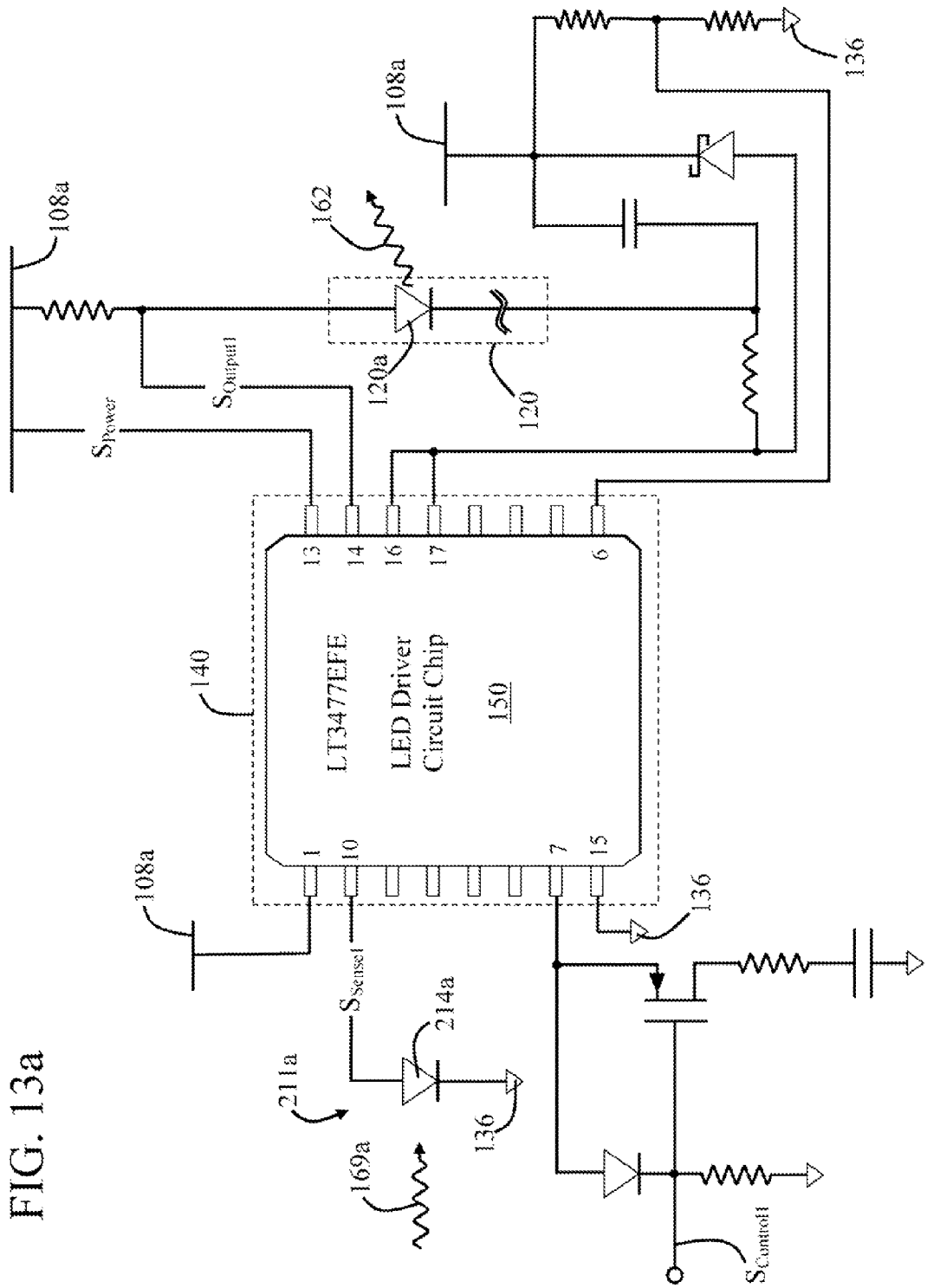

FIG. 13a is a schematic diagram of one embodiment of a portion of lighting system 100f of FIG. 12b. It should be noted that some of the components of FIG. 13a are also shown in FIG. 2a, and are described in more detail with FIG. 2a. In this embodiment, sensor 211a is embodied as a photodiode 214a, wherein one terminal of photodiode 214a is connected to current return 136 and another terminal of photodiode 214a is connected to terminal 10 of LED driver chip 150, wherein LED driver chip 150 is included with LED driver circuit 140. In this embodiment, LED driver chip 150 is embodied as the LT3477EFE chip manufactured by Linear Technology, Inc. of Milpitas, Calif. Photodiode 214a provides sense signal $S_{Sense1}$ to terminal 10 in response to receiving incident light 169a. Sense signal $S_{Sense1}$ is adjustable in response to adjusting a parameter of incident light 169a. The parameter of incident light 169a can be of many different types of parameters, such as the intensity and/or wavelength of the light.

As mentioned above, the LT3477EFE chip is connected to electrical components, such as a resistor, inductor, capacitor and a Schottky diode, so that it operates as an LED driver. More information regarding the LT3477EFE chip, and how it is connected to the electrical components to operate as an LED driver, can be found in a corresponding Data Sheet provided by Linear Technology, Inc.

In this embodiment, communication module 212a (FIG. 12b) is connected to terminal 7 of LED driver chip 150 through a circuit that includes a diode, transistor, capacitor and resistor, as shown in FIG. 13a. More information regarding the LT3477EFE chip, and how communication module 212a is connected to the LT3477EFE chip can be found in a corresponding Data Sheet provided by Linear Technology, Inc. In this embodiment, the operation of LED 120a is adjustable in response to adjusting control signal $S_{Control1}$.

In operation, photodiode 214a provides sense signal $S_{Sense1}$ to terminal 10 in response to receiving incident light 169a. The power of sense signal $S_{Sense1}$ is adjustable in response to adjusting a parameter of incident light 169a, such as its intensity and/or wavelength. For example, in one situation, LED driver circuit chip 150 adjusts the power of output signal $S_{Output1}$ in response to the power of sense signal $S_{Sense1}$ being adjusted, wherein the power of sense signal $S_{Sense1}$ is adjusted in response to adjusting the intensity and/or wavelength of incident light 169a. In this particular example, the intensity of blue light 162 emitted by LED 120a increases in response to the amount of power of sense signal $S_{Sense1}$ being increased by LED driver circuit chip 150. Further, the intensity of blue light 162 emitted by LED 120a decreases in response to the amount of power of sense signal $S_{Sense1}$ being decreased.

Figure 13B:
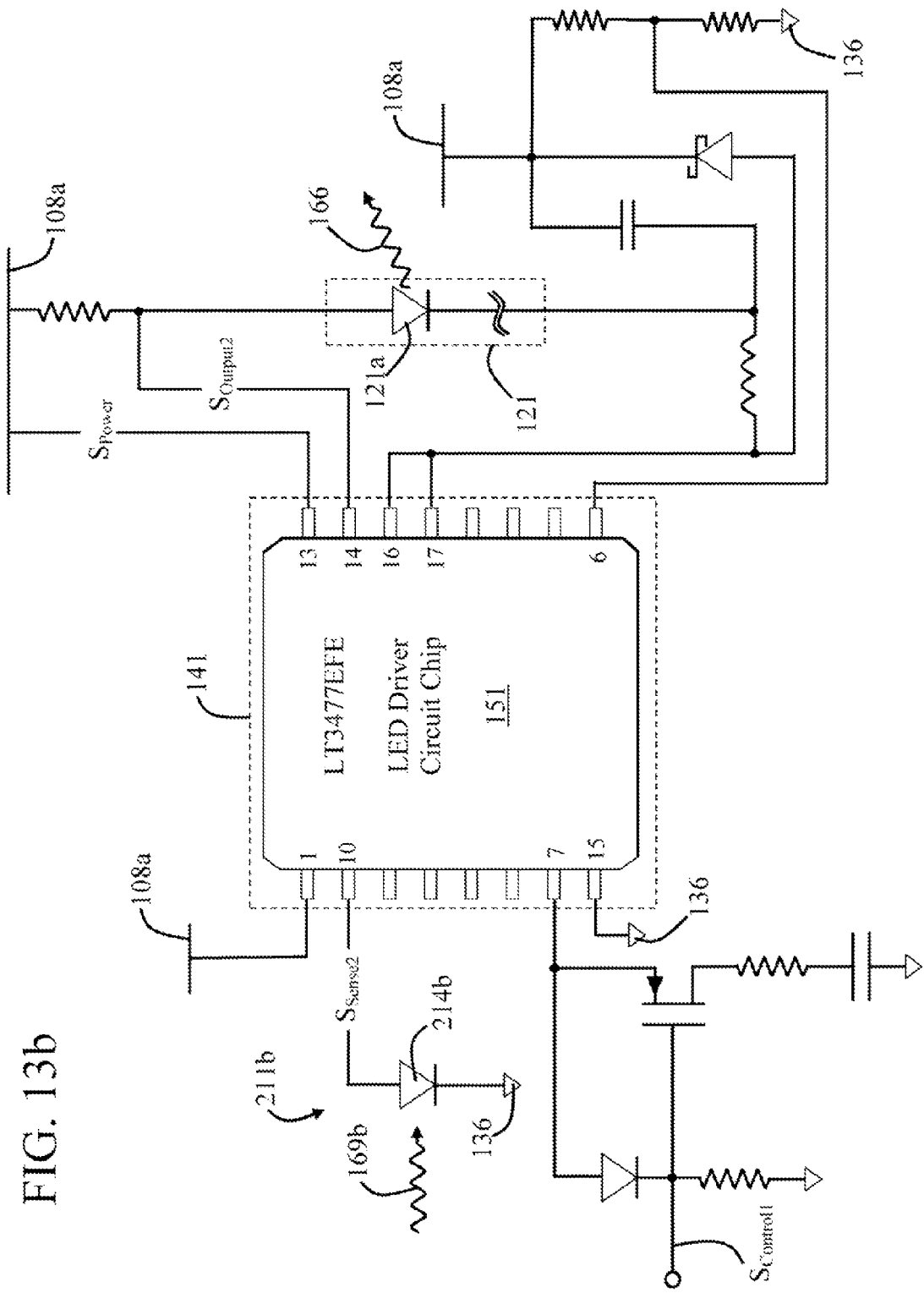
FIG. 13b is a schematic diagram of one embodiment of the lighting system of FIG. 12b.

FIG. 13b is a schematic diagram of one embodiment of another portion of lighting system 100f of FIG. 12b. It should be noted that some of the components of FIG. 13b are also shown in FIG. 2b, and are described in more detail with FIG. 2b. fir this embodiment, sensor 211b is embodied as a photodiode 214b, wherein one terminal of photodiode 214b is connected to current return 136 and another terminal of photodiode 214b is connected to terminal 10 of LED driver chip 151, wherein LED driver chip 151 is included with LED driver circuit 141. In this embodiment, LED driver chip 151 is embodied as the LT3477EFE chip manufactured by Linear Technology, Inc. of Milpitas, Calif. Photodiode 214b provides sense signal $S_{Sense2}$ to terminal 10 in response to receiving incident light 169b. Sense signal $S_{Sense2}$ is adjustable in response to adjusting a parameter of incident light 169b. The parameter of incident light 169b can be of many different types of parameters, such as the intensity and/or wavelength of the light.

As mentioned above, the LT3477EFE chip is connected to electrical components, such as a resistor, inductor, capacitor and a Schottky diode, so that it operates as an LED driver. More information regarding the LT3477EFE chip, and how it is connected to the electrical components to operate as an LED driver, can be found in a corresponding Data Sheet provided by Linear Technology, Inc.

In this embodiment, communication module 212b (FIG. 12b) is connected to terminal 7 of LED driver chip 151 through a circuit that includes a diode, transistor, capacitor and resistor, as shown in FIG. 13b. More information regarding the LT3477EFE chip, and how communication module 212b is connected to the UT3477EFE chip can be found in a corresponding Data Sheet provided by Linear Technology, Inc. In this embodiment, the operation of LED 121a is adjustable in response to adjusting control signal $S_{Control2}$.

In operation, photodiode 214b provides sense signal $S_{Sense2}$ to terminal 10 in response to receiving incident light 169b. The power of sense signal $S_{Sense2}$ is adjustable in response to adjusting a parameter of incident light 169b, such as its intensity and/or wavelength. For example, in one situation, LED driver circuit chip 151 adjusts the power of output signal $S_{Output2}$ in response to the power of sense signal $S_{Sense2}$ being adjusted, wherein the power of sense signal $S_{Sense2}$ is adjusted in response to adjusting the intensity and/or wavelength of incident light 169b. In this particular example, the intensity of red light 166 emitted by LED 121a increases in response to the amount of power of sense signal $S_{Sense2}$ being increased by LED driver circuit chip 151. Further, the intensity of red light 166 emitted by LED 121a decreases in response to the amount of power of sense signal $S_{Sense2}$ being decreased.

Figure 14A:
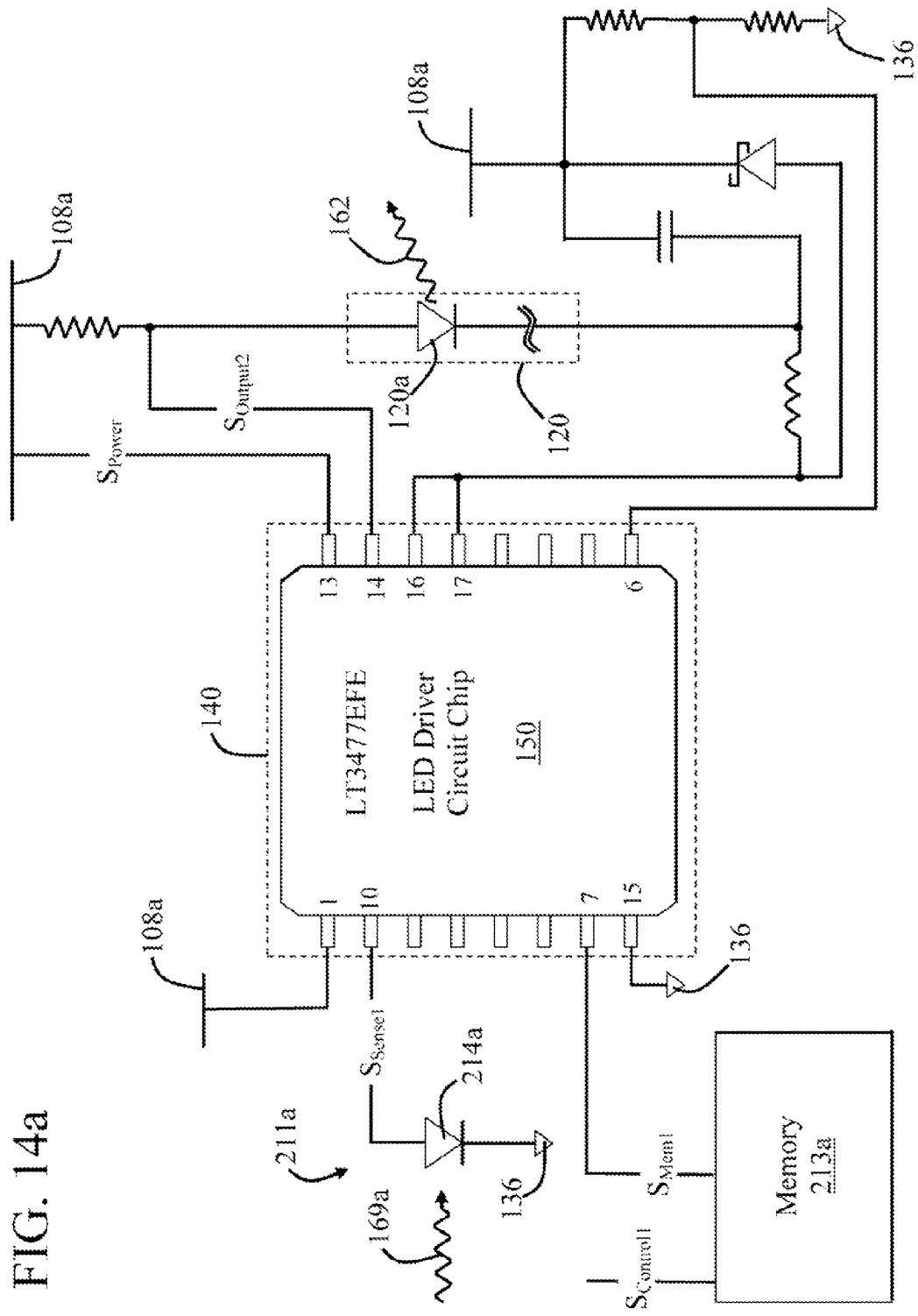
FIG. 14a is a schematic diagram of one embodiment of the lighting system of FIG. 12a, which includes a memory.

FIG. 14a is a schematic diagram of another embodiment of a portion of lighting system 100f of FIG. 12b. It should be noted that some of the components of FIG. 14a are also shown in FIG. 2a, and are described in more detail with FIG. 2a. In this embodiment, sensor 211a is embodied as photodiode 214a, wherein one terminal of photodiode 214a is connected to current return 136 and another terminal of photodiode 214a is connected to terminal 10 of LED driver chip 150, wherein LED driver chip 150 is included with LED driver circuit 140. In this embodiment, LED driver chip 150 is embodied as the LT3477EFE chip manufactured by Linear Technology, Inc. of Milpitas, Calif. Photodiode 214a provides sense signal $S_{Sense1}$ to terminal 10 in response to receiving incident light 169a. Sense signal $S_{Sense1}$ is adjustable in response to adjusting a parameter of incident light 169a. The parameter of incident light 169a can be of many different types of parameters, such as the intensity and/or wavelength of the light.

As mentioned above, the LT3477EFE chip is connected to electrical components, such as a resistor, inductor, capacitor and a Schottky diode, so that it operates as an LED driver. More information regarding the LT3477EFE chip, and how it is connected to the electrical components to operate as an LED driver, can be found in a corresponding Data Sheet provided by Linear Technology, Inc.

In this embodiment, a memory 213a is connected to terminal 7 of LED driver chip 150. Memory 213a provides a memory signal $S_{Mem1}$ to terminal 7 of LED driver chip 150. In this embodiment, memory 213a is a digital memory capable of storing digital information. The operation of LED 120a is adjustable in response to adjusting memory signal $S_{Mem1}$. In some embodiments, communication module 212a and antenna 212a (FIG. 12b) are in communication with memory 213a, In these embodiments, digital information memory 213a flows between memory 213a and communication module 212a in control signal $S_{Control1}$. As mentioned above, control signal $S_{Control1}$ corresponds to wireless signal $S_{Wireless1}$ so that the digital information can be flowed to and from memory 213a wirelessly.

The digital information can be of many different types. In some embodiments, the digital information corresponds to a recipe that determines the operation of LED sub-array 120. For example, the recipe can selectively turn on and off the LEDs of LED sub-array 120 as a function of time, wherein the time can be over many different durations, such as a day, week, month and year, for example. In this way, the recipe stored with memory 213a provides a light schedule, and determines the wavelength spectrums provided by the LEDs of LED sub-array 120. It should be noted that selectively turning on and off the LEDs of LED sub-array 120 includes turning them all on and turning them all off.

Being able to turn the LEDs of LED sub-array 120 on and off is useful to control greenhouse lighting. It should be noted that the lighting systems disclosed herein can be readily integrated with greenhouse control systems, such as Argus Controls, Wadsworth Control systems. Further, the recipe can selectively turn on and off the LEDs of LED sub-array 120 to provide a desired wavelength spectrum. Examples of desired wavelength spectrums are shown in FIGS. 3a, 3b, 3c, 4a, 4b, 4c, 4d, 4e, 4f, 4g, 4h and 4i. it is useful to turn off the LEDs of LED sub-array 120 when the accumulated light level for the day reaches a predetermined amount. Various plants need different amounts of light per day, and lighting system 100f will enable a user to set a threshold light level in response to the chosen plant type.

It should be noted that the recipe stored with memory 213a. can be replaced with a different recipe. The recipe stored with memory 213a can be replaced with a different recipe in many different ways, such as by adjusting control signal $S_{Control1}$. In some situations, the recipe stored with memory 213a is replaced by overwriting it another recipe. Further, in some situations, the recipe stored with memory 213a is erased. and replaced with another recipe. As mentioned above, control signal $S_{Control1}$ can be adjusted by adjusting wireless signal $S_{Wireless1}$. Hence, the recipe stored with memory 213a can be replaced by with a different recipe in response to flowing a wireless signal to lighting system 100f. It is useful to replace a recipe stored with memory 213a with a different recipe because the lighting conditions affect the ability of different types of plants to grow. Hence, the recipe stored with memory 213a can be chosen to provide desired growth conditions for the desired plant type. In this way, lighting system 100f can be used to effectively grow many different types of plants.

Figure 14B:
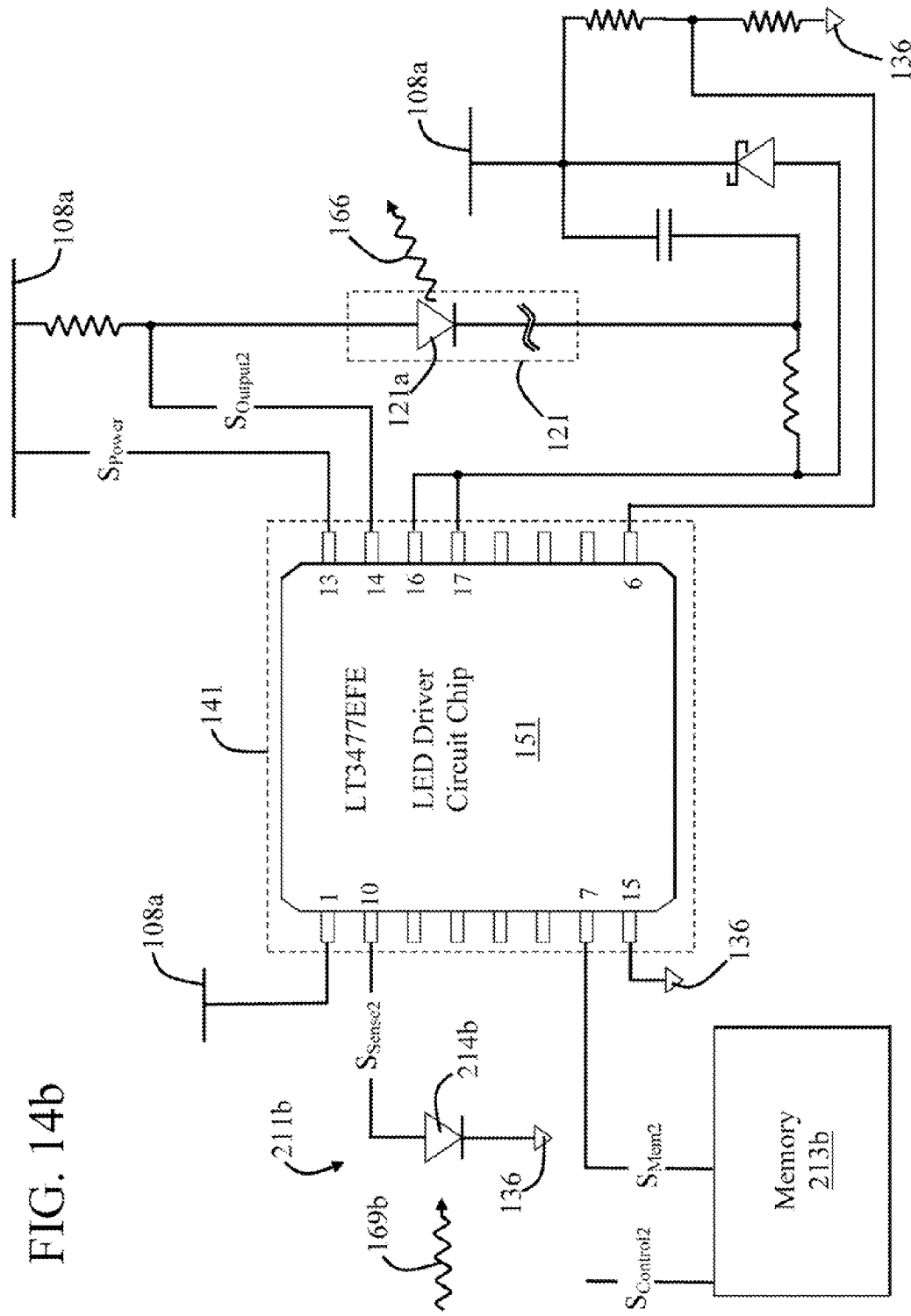
FIG. 14b is a schematic diagram of one embodiment of the lighting system of FIG. 12b, which includes a memory.

FIG. 14b is a schematic diagram of another embodiment of a portion of lighting system 100f of 12b. It should be noted that some of the components of FIG. 14b are also shown in FIG. 2b, and are described in more detail with FIG. 2b. In this embodiment, sensor 211b is embodied as photodiode 214b, wherein one terminal of photodiode 214b is connected to current return 136 and another terminal of photodiode 214b is connected to terminal 10 of LED driver chip 151, wherein LED driver chip 151 is included with LED driver circuit 141. In this embodiment, LED driver chip 151 is embodied as the LT3477EFE chip manufactured by Linear Technology, Inc. of Milpitas, Calif. Photodiode 214b provides sense signal $S_{Sense2}$ to terminal 10 in response to receiving incident light 169b. Sense signal $S_{Sense2}$ is adjustable in response to adjusting a parameter of incident light 169b. The parameter of incident light 169b can be of many different types of parameters, such as the intensity and/or wavelength of the light.

As mentioned above, the LT3477EFE chip is connected to electrical components, such as a resistor, inductor, capacitor and a Schottky diode, so that it operates as an LED driver. More information, regarding the LT3477EFE chip, and how it is connected to the electrical components to operate as an LED driver, can be found in a corresponding Data Sheet provided by Linear Technology, Inc.

In this embodiment, a memory 213b is connected to terminal 7 of LED driver chip 151. Memory 213b provides a memory signal $S_{Mem2}$ to terminal 7 of LED driver chip 151. In this embodiment, memory 213b is a digital memory capable of storing digital information. The operation of LED 121a is adjustable in response to adjusting memory signal $S_{Mem2}$. In some embodiments, communication module 212b and antenna 212b (FIG. 12b) are in communication with memory 213b. In these embodiments, digital information memory 213b flows between memory 213b and communication module 212b in control signal $S_{Control2}$. As mentioned above, control signal $S_{Control2}$ corresponds to wireless signal $S_{Wireless2}$ so that the digital information can be flowed to and from memory 213b wirelessly.

The digital information can be of many different types. In some embodiments, the digital information corresponds to a recipe that determines the operation of LED sub-array 121. For example, the recipe can selectively turn on and off the LEDs of LED sub-array 121 as a function of time, wherein the time can be over many different durations, such as a day, week, month and year, for example. in this way, the recipe stored with memory 213b provides a light schedule. It should be noted that selectively turning on and off the LEDs of LED sub-array 121 includes turning them all on and turning them all off.

Being able to turn the LEDs of LED sub-array 121 on and off is useful to control greenhouse lighting. Further, the recipe can selectively turn on and off the LEDs of LED sub-array 121 to provide a desired wavelength spectrum. Examples of desired wavelength spectrums are shown in FIGS. 3a, 3b, 3c, 4a, 4b, 4c, 4d, 4e, 4f, 4g, 4h and 4i. It is useful to turn off the LEDs of LED sub-array 121 when the accumulated light level for the day reaches a predetermined amount. Various plants need different amounts of light per day. and lighting system 100f will enable a user to set a threshold light level in response to the chosen plant type. It should be noted that LED arrays 420 and 121 can provide the same wavelength spectrum and different wavelength spectrums. Further the wavelengths spectrums provided by LED arrays 120 and 121 can be changed over time.

It should also be noted that the recipe stored with memory 213b can be replaced with a different recipe. The recipe stored with memory 213b can be replaced with a different recipe in many different ways, such as by adjusting control signal $S_{Control2}$. As mentioned above, control signal $S_{Control2}$ can be adjusted by adjusting wireless signal $S_{Wireless1}$. Hence, the recipe stored with memory 213b can be replaced by with a different recipe in response to flowing a wireless signal to lighting system 100f. In some situations, the recipe stored with memory 213b is replaced by overwriting it another recipe. Further, in some situations, the recipe stored with memory 213b is erased and replaced with another recipe it is useful to replace a recipe stored with memory 213b with a different recipe because the lighting conditions affect the ability of different types of plants to grow. Hence, the recipe stored with memory 213b can be chosen to provide desired growth conditions for the desired plant type. In this way, lighting system 100f can be used to effectively Wow many different types of plants, It should be noted that memories 213a and 213b can store the same recipes and different recipes. Further the recipes stored by memories 213a and 213b can be changed over time.

FIG. 15 is a block diagram of a portion of a ugh Wig system 100g, which can be included with the lighting systems discussed herein, such as lighting systems 100d, 100e and 100f. For example, the components of lighting system 100g can be included with the components of FIGS. 13a, 13b, 14a and 14b, if desired. Lighting system 100g includes an LED controller, such as LED controller 130, but this is not shown in FIG. 15 for simplicity. Further, Lighting system 100g includes an LED array, such as LED arrays 102 and 103, but this is not shown in FIG. 15 for simplicity.

In this embodiment, lighting system 100g includes a computer module 215 in communication with an antenna 210 through a communication module 212, so that computer module 215 receives a control signal $S_{Control}$. Computer module 215 can include programmable logic controller 133 of FIG. 10, and can be in communication with timer circuit 134, if desired. Computer module 215 is carried by a housing of lighting system 100g. such as lighting system housing 101.

It should be noted that control signal $S_{Control}$ can correspond to control signals $S_{Control1}$ and $S_{Control2}$ discussed above. It should also be noted that antenna 210 can be antennas 210a, 210b and 210c discussed above, and communication module 212 can be communication modules 212a, 212b and 212c discussed above. In this embodiment, computer module 215 is operatively coupled to an LED controller, such as LED controller 130 and provides control signal $S_{Control3}$ thereto through terminal 7 of the LT3477EFE LED driver chip. Hence, the LED controller can include LED controllers 130a and 130b discussed above.

Lighting system 100g, can include one or more sensors. In this embodiment, lighting system 100g includes sensor 211b operatively coupled to computer module 215 so that sense signal $S_{Sense2}$ flows between computer module 215 and sensor 211b. In this embodiment, lighting system 100g includes sensor 211a operatively coupled to computer module 215 through antenna 210 and communication module 212, so that sense signal $S_{Sense1}$ flows between computer module 215 and sensor 211b. It should be noted that, in this embodiment, sense signal $S_{Sense1}$ is a wireless signal which flows through a wireless link 217g, and sense signal $S_{Sense2}$ is a wired signal. It should be noted that sensors 211a and/or 211b can be positioned. proximate to computer module 215 or remotely from computer module 215.

In this embodiment, lighting system 100g includes a memory 213. Memory 213 can be memories 213a and 213b discussed above, if desired. Memory 213 stores information, such as information corresponding to a recipe.

Lighting system 100g can operate in many different ways. In one mode of operation, a first recipe is flowed to communication module 212 through antenna 210, wherein wireless signal $S_{Wireless}$ corresponds to information of the first recipe. The information of the first recipe is flowed to computer module 215 as control signal $S_{Control1}$. Computer module 215 can store the first recipe to memory by flowing control signal $S_{Control2}$ to memory 213. Further, computer module 215 can flow the information of first recipe LED controller 130 (not shown) as control signal $S_{Control3}$. The LED array (not shown) of lighting system 100g will be operated in accordance with the first recipe.

In another mode of operation, a second recipe is flowed to communication module 212 through antenna 210, wherein wireless signal $S_{Wireless}$ corresponds to information of the second recipe. The information of the second recipe is flowed to computer module 215 as control signal $S_{Control1}$. Computer module 215 can store the second recipe to memory by flowing control signal $S_{Control2}$ to memory 213. Further, computer module 215 can flow the information of second recipe LED controller 130 (not shown) as control signal $S_{Control3}$. The LED array (not shown) of lighting system 100g will be operated in accordance with the second recipe.

In some of these modes of operation, the first and second recipes are stored with memory 213, so that computer module 215 can selectively choose one of the first and second recipes. The LED array is then operated in accordance with the chosen recipe.

In other of these modes of operations, the first recipe is replaced by the second recipe. In one example, the first recipe can be overwritten by the second recipe so that the second recipe is stored with memory 213 and the first recipe is not. In another example, the first recipe is erased in response to a signal from computer module 215, and then the second recipe is stored with memory 213.

Figure 16:
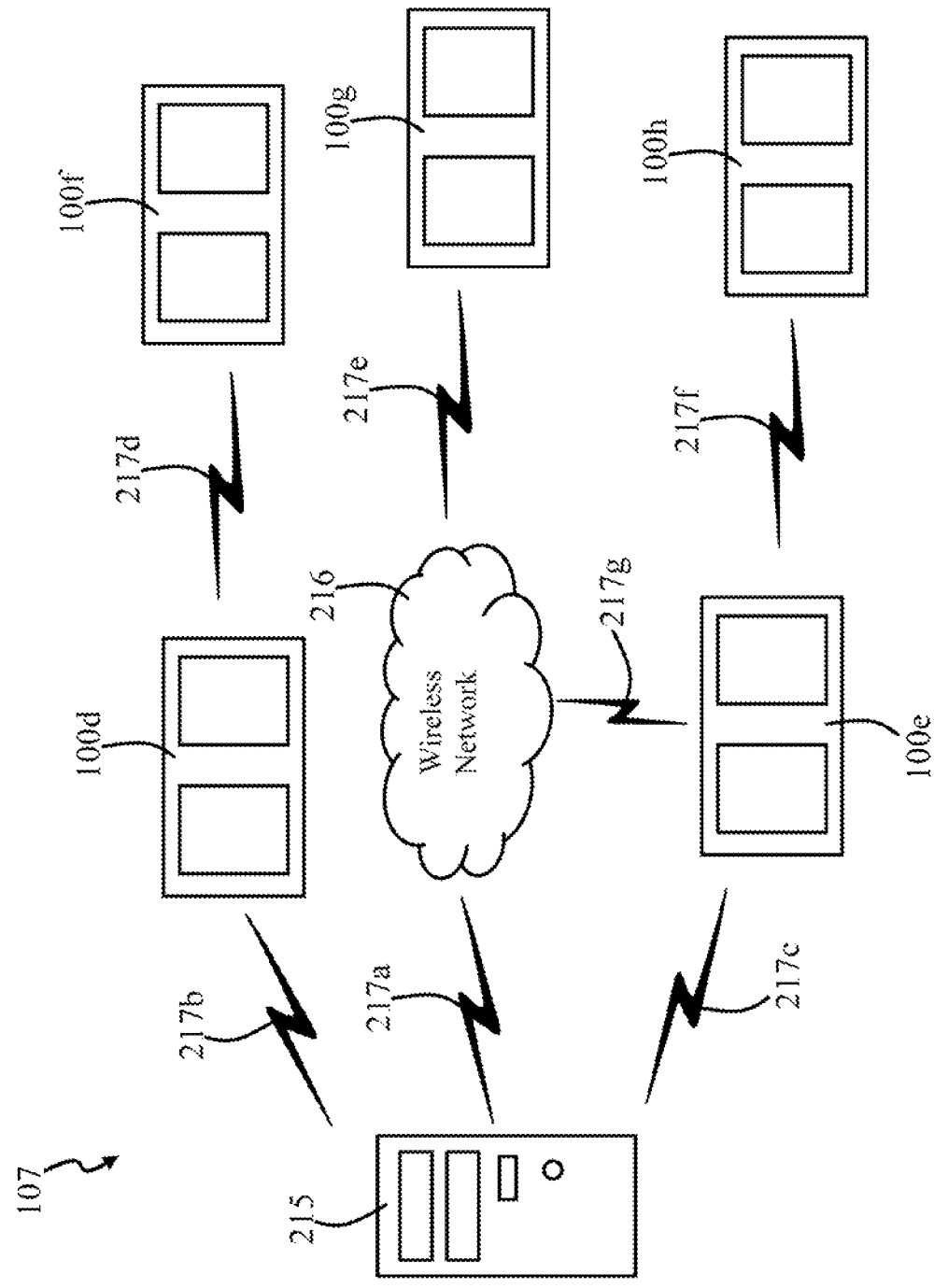
FIG. 16 is a diagram of a lighting system network, which includes a plurality of networked lighting systems.

FIG. 16 is a diagram of a lighting system network 107. It should be noted that lighting system 107 can include the lighting systems discussed in more detail above. In this embodiment, lighting system 107 includes a computer 215. Computer 215 can be of many different types, such as a laptop computer and desktop computer, which operates in response to a program. Computer 215 can provide useful information regarding the operation of lighting system 107. For example computer 215 can determine the power usage of lighting system 107, and computer 215 can provide power management and usage analysis. Usage analysis involves many different parameters, such as keeping track of how much light is provided by lighting system 107, as well as the wavelength spectrum of the light provided.

Computer 215 is capable of establishing a network connection, wherein the network connection allows the flow of information. The network connection can be of many different types, such as a wired network connection. In this embodiment, computer 215 is capable of establishing a wireless network connection 217b with a wireless network 216. The network connection can be established in many different ways, such as by using an Ethernet card. Wireless network 216 can be of many different types, such as a Wi-Fi wireless network. It should be noted that wireless network 216 can include a portion of the Internet, if desired.

In this embodiment, lighting system 107 includes lighting system 100d, which is discussed m more detail above with FIGS. 11a-11e. A network connection 217b is established, between computer 215 and lighting system 100d. Network connection 217b can be established between computer 215 and lighting system 100d in many different ways. In this embodiment, network connection 217b is established by flowing a wireless signal between computer 215 and an antenna of lighting system 100d.

In this embodiment, lighting system 107 includes fighting system 100e, which is discussed in more detail above with FIG. 12a. A network connection 217e is established between computer 215 and lighting system 100e. Network connection 217c can be established between computer 215 and lighting system 100e in many different ways, in this embodiment, network connection 217c is established by flowing wireless signal $S_{Wireless1}$ and $S_{Wireless2}$ between computer 215 and antenna 2100 of lighting system 100e.

In this embodiment, lighting system 107 includes lighting system 100f, which is discussed in more detail above with FIG. 12d. A network connection 217d is established between lighting system 100d and lighting system 100e. Network connection 217d can be established between lighting system 100d and lighting system 100c in many different ways. In this embodiment, network connection 217d is established by flowing wireless signals $S_{Wireless1}$ and $S_{Wireless2}$ and between lighting system 100d and antenna 210c of lighting system 100e. It should be noted that lighting system 100f can be in communication with computer 215 through lighting system 100d and network connections 217b and 217d. In this way, computer 215 can control the operation of lighting systems 100d and 100f.

In this embodiment, lighting system 107 includes a lighting system 100g, wherein lighting system 100g includes a communication module and antenna, such as communication module 212 and antenna 210. A network connection 217e is established between wireless network 216 and lighting system 100g. Network connection 217e can be established between wireless network 216 and lighting system 100g in many different ways. In this embodiment, network connection 217e is established by flowing a wireless signal between wireless network 216 and the communication module and antenna of lighting system 100g. It should be noted that, in this embodiment, lighting system 100g can be in communication with computer 215 through wireless network 216, if desired. In this way, computer 215 can control the operation of lighting system 100g. It should also be noted that lighting system 100g can be in communication with another lighting system through wireless network 216. For example, in this embodiment, lighting systems 100e and 100g are in communication with each other through wireless network 216 and a network connection 217g, wherein network connection 217g is established between wireless network 216 and lighting system 100e.

In this embodiment, lighting system 107 includes a lighting system 100*h*, wherein lighting system 100*h* includes a communication module and antenna, such as communication module 212 and antenna 210. A network connection 217*f* is established between lighting system 100*e* and lighting system 100*h*. Network connection 217*f* can be established between lighting system 100*e* and lighting system 100*g* in many different ways. In this embodiment, network connection 217*f* is established by flowing a wireless signal between lighting system 100*e* and the communication module and antenna of lighting system 100*h*. It should be noted that lighting, system 100*h* can be in communication with computer 215 through lighting system 100*e* and network connections 217*c* and 217*f*. In this way, computer 215 can control the operation of lighting systems 100*e* and 100*h*.

Lighting system 107 can operate in many different ways, such as those discussed in more detail above with lighting systems 100*d*, 100*e* and 100*f*. In one mode of operation, lighting systems 100*d*, 100*e*, 100*f*, 100*g* and 100*h* include memory, and computer 215 flows a recipe to each memory. The recipe can be stored with computer 215 and selected using a program implemented by computer 215. The recipe can be the same for each lighting module and the recipe can be different. Further, it should be noted that the recipe flowed by computer 215 can change as a function of time, if desired. The time can be a day, week, month and year, if desired. In this way, the recipe can be changed as desired by the user of computer 215. In one embodiment, lighting systems 100*d*, 100*e*, 100*f*, 100*g* and 100*h* each have the same recipe stored in the corresponding memory. In another embodiment, lighting systems 100*d* and 100*f* have a first recipe stored in memory, and lighting systems 100*e*, 100*g* and 100*h* have a second recipe stored in memory. The recipes are typically chosen based on the type of plant it is desired to grow. In this way, the recipes are chosen to provide a desired spectral balance of one or more lighting systems to adjust the light balance for a desired type of plant. It is useful to be able to adjust the recipes stored by lighting systems 100*d*, 100*e*, 100*f*, 100*g* and 100*h* so that lighting system 107 can be used to illuminate different zones of a greenhouse.

Disclosed herein are various embodiments of a lighting system which provides many useful functions. The lighting system allows the use of an external light sensor to provide light level data, the intensity of the light provided by the lighting system in a greenhouse can be adjusted to maintain desired light levels. For example, lights can be turned on when a cloud passes overhead, as sensed by a sensor, and turned off as soon as the sunlight has returned.

Various embodiments of the lighting systems allow photoperiod control, which is used to schedule greenhouse crops such as chrysanthums, poinsettia, and other plants that respond to the day length factors. The software which runs on a computer that operates the lighting systems will simplify the planning and application of such light treatments.

The lighting systems disclosed herein can alter plant morphology and regulate how plants grow through manipulation of the light spectrum. For example, by altering the levels of blue light versus red light in conjunction with a reduced Red/Far Red light ratio, more compact plant growth (shorter intermodal lengths) can be achieved. This can produce an effect to plant growth regulators (PGR's) without the actual application of the chemical PGR's. PGR's are hormones, and it is undesirable by some people to have hormones in plants because of certain perceived risks associated with human health.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

The invention claimed is:

1. A lighting system network, comprising:
    first and second lighting systems in communication with each other, wherein the first lighting system includes
    an LED controller;
    a first antenna in communication with the LED controller;
    an LED array which includes first and second LED sub-arrays, wherein the LED array is operatively coupled to the LED controller;
    wherein first and second wavelength spectrums of light provided by the first and second LED sub-arrays, respectively, are adjustable in response to adjusting an input signal provided to the first antenna.

2. The network of claim 1, wherein the second lighting system includes a second antenna which provides communication with the first lighting system.

3. The network of claim 1, further including a computer, wherein the first antenna provides communication with the computer.

4. The network of claim 3, wherein the intensities of the first and second wavelength spectrums are adjustable relative to each other in response to a wireless signal provided by the computer.

5. The network of claim 4, wherein the second LED sub-array includes third and fourth LED sub-arrays which emit third and fourth wavelength spectrums of light, respectively.

6. The network of claim 5, wherein the intensities of the third and fourth wavelength spectrums of light are adjustable relative to each other in response to the wireless signal provided by the computer.

7. A lighting system network, comprising:
    first and second lighting systems in communication with each other, wherein the first lighting system includes
    a first LED controller;
    a first LED array which includes first and second LED sub-arrays, wherein the first LED array is operatively coupled to the first LED controller;
    a first memory in communication with the first controller;
    wherein first and second wavelength spectrums provided by the first and second LED sub-arrays, respectively, are determined by a first recipe stored with the first memory.

8. The network of claim 7, further including a computer, wherein the first lighting system includes a first antenna which provides communication with the computer.

9. The network of claim 8, wherein a first recipe is stored with the first memory in response to the first antenna receiving a first signal from the computer.

10. The network of claim 9, wherein the first LED array is operated in response to the first recipe stored with the first memory.

11. The network of claim 8, wherein the first memory stores first and second recipes, wherein one of the first and second recipes is chosen in response to an indication from the computer.

12. The network of claim 7, wherein the second lighting system includes
    a second LED controller;
    a second LED array which includes third and fourth LED sub-arrays, wherein the second LED array is operatively coupled to the second LED controller;
    a second memory in communication with the second LED controller;

wherein third and fourth wavelength spectrums provided by the third and fourth LED sub-arrays, respectively, are determined by a second recipe stored with the second memory.

13. The network of claim 12, further including a computer, wherein the first and second recipes are flowed to the first and second memories, respectively, by the computer.

14. A method, comprising:
providing a desired amount of a first color of light;
providing a desired amount of a second color of light;
providing a desired amount of a third color of light; and
adjusting the intensities of the first and second colors of light relative to each other, in response to adjusting an input signal provided to a lighting system, to drive the wavelength spectrums of the first and second colors of light to match the action spectrum of the physiological activity of a plant.

15. The method or claim 14, wherein the desired amounts of the first, second and third colors of light are provided in response to adjusting the operation of an LED sub-array which includes first, second and third light emitting diodes.

16. The method of claim 15, Wherein the first, second and third light emitting diodes provide the first, second and third colors of light, respectively.

17. The method of claim 14, wherein the input signal is a wireless signal.

18. The method of claim 14, wherein the first and second colors of light consist essentially of red light and blue light, respectively.

19. The method of claim 14, wherein the third color of light consisting essentially of light having a wavelength between about 750 nanometers to about 2500 nanometers.

* * * * *